United States Patent
Milne et al.

(10) Patent No.: US 7,321,640 B2
(45) Date of Patent: Jan. 22, 2008

(54) ACTIVE POLYPHASE INVERTER FILTER FOR QUADRATURE SIGNAL GENERATION

(75) Inventors: Gregory L Milne, Winter Springs, FL (US); Michael W Rawlins, Lake Mary, FL (US); Gregory S Rawlins, Heathrow, FL (US)

(73) Assignee: ParkerVision, Inc., Jacksonville, FL (US)

( * ) Notice: Subject to any disclaimer, the term of this patent is extended or adjusted under 35 U.S.C. 154(b) by 805 days.

(21) Appl. No.: 10/453,622

(22) Filed: Jun. 4, 2003

(65) Prior Publication Data
US 2003/0227983 A1    Dec. 11, 2003

Related U.S. Application Data

(60) Provisional application No. 60/386,484, filed on Jun. 7, 2002.

(51) Int. Cl.
*H03D 3/22* (2006.01)
(52) U.S. Cl. .................................... 375/330; 375/302
(58) Field of Classification Search ................ 375/302, 375/269, 375, 371, 372, 373, 376, 330; 327/156
See application file for complete search history.

(56) References Cited

U.S. PATENT DOCUMENTS

| | | | |
|---|---|---|---|
| 2,057,613 A | 10/1936 | Gardner | |
| 2,241,078 A | 5/1941 | Vreeland | |
| 2,270,385 A | 1/1942 | Skillman | |
| 2,283,575 A | 5/1942 | Roberts | |
| 2,358,152 A | 9/1944 | Earp | |
| 2,410,350 A | 10/1946 | Labin et al. | |
| 2,451,430 A | 10/1948 | Barone | |
| 2,462,069 A | 2/1949 | Chatterjea et al. | |
| 2,462,181 A | 2/1949 | Grosselfinger | |
| 2,472,798 A | 6/1949 | Fredendall | |

(Continued)

FOREIGN PATENT DOCUMENTS

DE    1936252    1/1971

(Continued)

OTHER PUBLICATIONS

Salous; IF digital generation of FMSC waveforms for wideband channel characterization; IEEE Proceedings-I, vol. 139, No. 3, Jun. 1992; pp. 281-288.*

(Continued)

*Primary Examiner*—Emmanuel Bayard
(74) *Attorney, Agent, or Firm*—Sterne, Kessler, Goldstein & Fox P.L.L.C.

(57) ABSTRACT

A quadrature signal generator receives a differential input signal and generates quadrature output signals that are 90 degrees out-of-phase with each other. The quadrature generator includes a coarse stage and a plurality of refinement stages. The coarse stage generates quadrature signals that may have some phase error, and the refinement stages process the quadrature signals to reduce any phase error. The refinement stages receive quadrature signals from the output of the coarse stage, and processes the quadrature signals to reduce the phase errors. The coarse stage and the refinement stages are configured using delay circuits that can be implemented with inverter circuits, such as, for example, CMOS inverter circuits. In the refinement stages, corresponding outputs of the delay stages are averaged together to reduce the quadrature phase error.

22 Claims, 16 Drawing Sheets

U.S. PATENT DOCUMENTS

| | | |
|---|---|---|
| 2,497,859 A | 2/1950 | Boughtwood et al. |
| 2,499,279 A | 2/1950 | Peterson |
| 2,530,824 A | 11/1950 | King |
| 2,802,208 A | 8/1957 | Hobbs |
| 2,985,875 A | 5/1961 | Grisdale et al. |
| 3,023,309 A | 2/1962 | Foulkes |
| 3,069,679 A | 12/1962 | Sweeney et al. |
| 3,104,393 A | 9/1963 | Vogelman |
| 3,114,106 A | 12/1963 | McManus |
| 3,118,117 A | 1/1964 | King et al. |
| 3,226,643 A | 12/1965 | McNair |
| 3,246,084 A | 4/1966 | Kryter |
| 3,258,694 A | 6/1966 | Shepherd |
| 3,383,598 A | 5/1968 | Sanders |
| 3,384,822 A | 5/1968 | Miyagi |
| 3,454,718 A | 7/1969 | Perreault |
| 3,523,291 A | 8/1970 | Pierret |
| 3,548,342 A | 12/1970 | Maxey |
| 3,555,428 A | 1/1971 | Perreault |
| 3,614,627 A | 10/1971 | Runyan et al. |
| 3,614,630 A | 10/1971 | Rorden |
| 3,617,892 A | 11/1971 | Hawley et al. |
| 3,617,898 A | 11/1971 | Janning, Jr. |
| 3,621,402 A | 11/1971 | Gardner |
| 3,622,885 A | 11/1971 | Oberdorf et al. |
| 3,623,160 A | 11/1971 | Giles et al. |
| 3,626,417 A | 12/1971 | Gilbert |
| 3,629,696 A | 12/1971 | Bartelink |
| 3,641,442 A | 2/1972 | Boucher |
| 3,662,268 A | 5/1972 | Gans et al. |
| 3,689,841 A | 9/1972 | Bello et al. |
| 3,694,754 A | 9/1972 | Baltzer |
| 3,702,440 A | 11/1972 | Moore |
| 3,714,577 A | 1/1973 | Hayes |
| 3,716,730 A | 2/1973 | Cerny, Jr. |
| 3,717,844 A | 2/1973 | Barret et al. |
| 3,719,903 A | 3/1973 | Goodson |
| 3,736,513 A | 5/1973 | Wilson |
| 3,737,778 A | 6/1973 | Van Gerwen et al. |
| 3,739,282 A | 6/1973 | Bruch et al. |
| 3,764,921 A | 10/1973 | Huard |
| 3,767,984 A | 10/1973 | Shinoda et al. |
| 3,852,530 A | 12/1974 | Shen |
| 3,940,697 A | 2/1976 | Morgan |
| 4,013,966 A | 3/1977 | Campbell |
| 4,016,366 A | 4/1977 | Kurata |
| 4,017,798 A | 4/1977 | Gordy et al. |
| 4,019,140 A | 4/1977 | Swerdlow |
| 4,032,847 A | 6/1977 | Unkauf |
| 4,035,732 A | 7/1977 | Lohrmann |
| 4,045,740 A | 8/1977 | Baker |
| 4,047,121 A | 9/1977 | Campbell |
| 4,051,475 A | 9/1977 | Campbell |
| 4,066,841 A | 1/1978 | Young |
| 4,066,919 A | 1/1978 | Huntington |
| 4,080,573 A | 3/1978 | Howell |
| 4,081,748 A | 3/1978 | Batz |
| 4,115,737 A | 9/1978 | Hongu et al. |
| 4,130,765 A | 12/1978 | Arakelian et al. |
| 4,130,806 A | 12/1978 | Van Gerwen et al. |
| 4,132,952 A | 1/1979 | Hongu et al. |
| 4,142,155 A | 2/1979 | Adachi |
| 4,143,322 A | 3/1979 | Shimamura |
| 4,158,149 A | 6/1979 | Otofuji |
| 4,170,764 A | 10/1979 | Salz et al. |
| 4,204,171 A | 5/1980 | Sutphin, Jr. |
| 4,210,872 A | 7/1980 | Gregorian |
| 4,220,977 A | 9/1980 | Yamanaka |
| 4,241,451 A | 12/1980 | Maixner et al. |
| 4,245,355 A | 1/1981 | Pascoe et al. |
| 4,250,458 A | 2/1981 | Richmond et al. |
| 4,253,066 A | 2/1981 | Fisher et al. |
| 4,253,067 A | 2/1981 | Caples et al. |
| 4,253,069 A | 2/1981 | Nossek |
| 4,286,283 A | 8/1981 | Clemens |
| 4,308,614 A | 12/1981 | Fisher et al. |
| 4,320,361 A | 3/1982 | Kikkert |
| 4,320,536 A | 3/1982 | Dietrich |
| 4,334,324 A | 6/1982 | Hoover |
| 4,346,477 A | 8/1982 | Gordy |
| 4,355,401 A | 10/1982 | Ikoma et al. |
| 4,356,558 A | 10/1982 | Owen et al. |
| 4,360,867 A | 11/1982 | Gonda |
| 4,363,132 A | 12/1982 | Collin |
| 4,365,217 A | 12/1982 | Berger et al. |
| 4,369,522 A | 1/1983 | Cerny, Jr. et al. |
| 4,370,572 A | 1/1983 | Cosand et al. |
| 4,380,828 A | 4/1983 | Moon |
| 4,384,357 A | 5/1983 | deBuda et al. |
| 4,389,579 A | 6/1983 | Stein |
| 4,392,255 A | 7/1983 | Del Giudice |
| 4,393,395 A | 7/1983 | Hacke et al. |
| 4,430,629 A | 2/1984 | Betzl et al. |
| 4,439,787 A | 3/1984 | Mogi et al. |
| 4,441,080 A | 4/1984 | Saari |
| 4,446,438 A | 5/1984 | Chang et al. |
| 4,456,990 A | 6/1984 | Fisher et al. |
| 4,470,145 A | 9/1984 | Williams |
| 4,472,785 A | 9/1984 | Kasuga |
| 4,479,226 A | 10/1984 | Prabhu et al. |
| 4,481,490 A | 11/1984 | Huntley |
| 4,481,642 A | 11/1984 | Hanson |
| 4,483,017 A | 11/1984 | Hampel et al. |
| 4,484,143 A | 11/1984 | French et al. |
| 4,485,488 A | 11/1984 | Houdart |
| 4,488,119 A | 12/1984 | Marshall |
| 4,504,803 A | 3/1985 | Lee et al. |
| 4,510,467 A | 4/1985 | Chang et al. |
| 4,517,519 A | 5/1985 | Mukaiyama |
| 4,517,520 A | 5/1985 | Ogawa |
| 4,518,935 A | 5/1985 | van Roermund |
| 4,521,892 A | 6/1985 | Vance et al. |
| 4,562,414 A | 12/1985 | Linder et al. |
| 4,563,773 A | 1/1986 | Dixon, Jr. et al. |
| 4,577,157 A | 3/1986 | Reed |
| 4,583,239 A | 4/1986 | Vance |
| 4,591,736 A | 5/1986 | Hirao et al. |
| 4,591,930 A | 5/1986 | Baumeister |
| 4,602,220 A | 7/1986 | Kurihara |
| 4,603,300 A | 7/1986 | Welles, II et al. |
| 4,612,464 A | 9/1986 | Ishikawa et al. |
| 4,612,518 A | 9/1986 | Gans et al. |
| 4,616,191 A | 10/1986 | Galani et al. |
| 4,621,217 A | 11/1986 | Saxe et al. |
| 4,628,517 A | 12/1986 | Schwarz et al. |
| 4,633,510 A | 12/1986 | Suzuki et al. |
| 4,634,998 A | 1/1987 | Crawford |
| 4,648,021 A | 3/1987 | Alberkrack |
| 4,651,034 A | 3/1987 | Sato |
| 4,653,117 A | 3/1987 | Heck |
| 4,660,164 A | 4/1987 | Leibowitz |
| 4,675,882 A | 6/1987 | Lillie et al. |
| 4,688,253 A | 8/1987 | Gumm |
| 4,716,376 A | 12/1987 | Daudelin |
| 4,716,388 A | 12/1987 | Jacobs |
| 4,718,113 A | 1/1988 | Rother et al. |
| 4,726,041 A | 2/1988 | Prohaska et al. |
| 4,733,403 A | 3/1988 | Simone |
| 4,734,591 A | 3/1988 | Ichitsubo |
| 4,737,969 A | 4/1988 | Steel et al. |
| 4,740,675 A | 4/1988 | Brosnan et al. |
| 4,740,792 A | 4/1988 | Sagey et al. |
| 4,743,858 A | 5/1988 | Everard |
| 4,745,463 A | 5/1988 | Lu |

| | | | | | | |
|---|---|---|---|---|---|---|
| 4,751,468 A | 6/1988 | Agoston | | 5,083,050 A | 1/1992 | Vasile |
| 4,757,538 A | 7/1988 | Zink | | 5,091,921 A | 2/1992 | Minami |
| 4,761,798 A | 8/1988 | Griswold, Jr. et al. | | 5,095,533 A | 3/1992 | Loper et al. |
| 4,768,187 A | 8/1988 | Marshall | | 5,095,536 A | 3/1992 | Loper |
| 4,769,612 A | 9/1988 | Tamakoshi et al. | | 5,111,152 A | 5/1992 | Makino |
| 4,772,853 A | 9/1988 | Hart | | 5,113,094 A | 5/1992 | Grace et al. |
| 4,785,463 A | 11/1988 | Janc et al. | | 5,113,129 A | 5/1992 | Hughes |
| 4,789,837 A | 12/1988 | Ridgers | | 5,115,409 A | 5/1992 | Stepp |
| 4,791,584 A | 12/1988 | Greivenkamp, Jr. | | 5,122,765 A | 6/1992 | Pataut |
| 4,801,823 A | 1/1989 | Yokoyama | | 5,124,592 A | 6/1992 | Hagino |
| 4,806,790 A | 2/1989 | Sone | | 5,126,682 A | 6/1992 | Weinberg et al. |
| 4,810,904 A | 3/1989 | Crawford | | 5,131,014 A | 7/1992 | White |
| 4,810,976 A | 3/1989 | Cowley et al. | | 5,136,267 A | 8/1992 | Cabot |
| 4,811,362 A | 3/1989 | Yester, Jr. et al. | | 5,140,699 A | 8/1992 | Kozak |
| 4,811,422 A | 3/1989 | Kahn | | 5,140,705 A | 8/1992 | Kosuga |
| 4,814,649 A | 3/1989 | Young | | 5,150,124 A | 9/1992 | Moore et al. |
| 4,816,704 A | 3/1989 | Fiori, Jr. | | 5,151,661 A | 9/1992 | Caldwell et al. |
| 4,819,252 A | 4/1989 | Christopher | | 5,157,687 A | 10/1992 | Tymes |
| 4,833,445 A | 5/1989 | Buchele | | 5,159,710 A | 10/1992 | Cusdin |
| 4,841,265 A | 6/1989 | Watanabe et al. | | 5,164,985 A | 11/1992 | Nysen et al. |
| 4,845,389 A | 7/1989 | Pyndiah et al. | | 5,170,414 A | 12/1992 | Silvian |
| 4,855,894 A | 8/1989 | Asahi et al. | | 5,172,019 A | 12/1992 | Naylor et al. |
| 4,857,928 A | 8/1989 | Gailus et al. | | 5,172,070 A | 12/1992 | Hiraiwa et al. |
| 4,862,121 A | 8/1989 | Hochschild et al. | | 5,179,731 A | 1/1993 | Trankle et al. |
| 4,866,441 A | 9/1989 | Conway et al. | | 5,191,459 A | 3/1993 | Thompson et al. |
| 4,868,654 A | 9/1989 | Juri et al. | | 5,196,806 A | 3/1993 | Ichihara |
| 4,870,659 A | 9/1989 | Oishi et al. | | 5,204,642 A | 4/1993 | Ashgar et al. |
| 4,871,987 A | 10/1989 | Kawase | | 5,212,827 A | 5/1993 | Meszko et al. |
| 4,873,492 A | 10/1989 | Myer | | 5,214,787 A | 5/1993 | Karkota, Jr. |
| 4,885,587 A | 12/1989 | Wiegand et al. | | 5,218,562 A | 6/1993 | Basehore et al. |
| 4,885,671 A | 12/1989 | Peil | | 5,220,583 A | 6/1993 | Solomon |
| 4,885,756 A | 12/1989 | Fontanes et al. | | 5,220,680 A | 6/1993 | Lee |
| 4,888,557 A | 12/1989 | Puckette, IV et al. | | 5,222,144 A | 6/1993 | Whikehart |
| 4,890,302 A | 12/1989 | Muilwijk | | 5,230,097 A | 7/1993 | Currie et al. |
| 4,893,316 A | 1/1990 | Janc et al. | | 5,239,496 A | 8/1993 | Vancraeynest |
| 4,893,341 A | 1/1990 | Gehring | | 5,239,686 A | 8/1993 | Downey |
| 4,894,766 A | 1/1990 | De Agro | | 5,239,687 A | 8/1993 | Chen |
| 4,896,152 A | 1/1990 | Tiemann | | 5,241,561 A | 8/1993 | Barnard |
| 4,902,979 A | 2/1990 | Puckette, IV | | 5,249,203 A | 9/1993 | Loper |
| 4,908,579 A | 3/1990 | Tawfik et al. | | 5,251,218 A | 10/1993 | Stone et al. |
| 4,910,752 A | 3/1990 | Yester, Jr. et al. | | 5,251,232 A | 10/1993 | Nonami |
| 4,914,405 A | 4/1990 | Wells | | 5,260,970 A | 11/1993 | Henry et al. |
| 4,920,510 A | 4/1990 | Senderowicz et al. | | 5,260,973 A | 11/1993 | Watanabe |
| 4,922,452 A | 5/1990 | Larsen et al. | | 5,263,194 A | 11/1993 | Ragan |
| 4,931,716 A | 6/1990 | Jovanovic et al. | | 5,263,196 A | 11/1993 | Jasper |
| 4,931,921 A | 6/1990 | Anderson | | 5,263,198 A | 11/1993 | Geddes et al. |
| 4,943,974 A | 7/1990 | Motamedi | | 5,267,023 A | 11/1993 | Kawasaki |
| 4,944,025 A | 7/1990 | Gehring et al. | | 5,278,826 A | 1/1994 | Murphy et al. |
| 4,955,079 A | 9/1990 | Connerney et al. | | 5,282,023 A | 1/1994 | Scarpa |
| 4,965,467 A | 10/1990 | Bilterijst | | 5,282,222 A | 1/1994 | Fattouche et al. |
| 4,967,160 A | 10/1990 | Quievy et al. | | 5,287,516 A | 2/1994 | Schaub |
| 4,970,703 A | 11/1990 | Hariharan et al. | | 5,293,398 A | 3/1994 | Hamao et al. |
| 4,972,436 A | 11/1990 | Halim et al. | | 5,303,417 A | 4/1994 | Laws |
| 4,982,353 A | 1/1991 | Jacob et al. | | 5,307,517 A | 4/1994 | Rich |
| 4,984,077 A | 1/1991 | Uchida | | 5,315,583 A | 5/1994 | Murphy et al. |
| 4,995,055 A | 2/1991 | Weinberger et al. | | 5,319,799 A | 6/1994 | Morita |
| 5,003,621 A | 3/1991 | Gailus | | 5,321,852 A | 6/1994 | Seong |
| 5,005,169 A | 4/1991 | Bronder et al. | | 5,325,204 A | 6/1994 | Scarpa |
| 5,006,810 A | 4/1991 | Popescu | | 5,337,014 A | 8/1994 | Najle et al. |
| 5,010,585 A | 4/1991 | Garcia | | 5,339,054 A | 8/1994 | Taguchi |
| 5,012,245 A | 4/1991 | Scott et al. | | 5,339,459 A | 8/1994 | Schiltz et al. |
| 5,014,130 A | 5/1991 | Heister et al. | | 5,345,239 A | 9/1994 | Madni et al. |
| 5,014,304 A | 5/1991 | Nicollini et al. | | 5,353,306 A | 10/1994 | Yamamoto |
| 5,015,963 A | 5/1991 | Sutton | | 5,355,114 A | 10/1994 | Sutterlin et al. |
| 5,016,242 A | 5/1991 | Tang | | 5,361,408 A | 11/1994 | Watanabe et al. |
| 5,017,924 A | 5/1991 | Guiberteau et al. | | 5,369,404 A | 11/1994 | Galton |
| 5,020,149 A | 5/1991 | Hemmie | | 5,369,789 A | 11/1994 | Kosugi et al. |
| 5,020,154 A | 5/1991 | Zierhut | | 5,369,800 A | 11/1994 | Takagi et al. |
| 5,052,050 A | 9/1991 | Collier et al. | | 5,375,146 A | 12/1994 | Chalmers |
| 5,058,107 A | 10/1991 | Stone et al. | | 5,379,040 A | 1/1995 | Mizomoto et al. |
| 5,062,122 A | 10/1991 | Pham et al. | | 5,379,141 A | 1/1995 | Thompson et al. |
| 5,063,387 A | 11/1991 | Mower | | 5,388,063 A | 2/1995 | Takatori et al. |
| 5,065,409 A | 11/1991 | Hughes et al. | | 5,389,839 A | 2/1995 | Heck |

| | | | | | |
|---|---|---|---|---|---|
| 5,390,215 A | 2/1995 | Anita et al. | 5,584,068 A | 12/1996 | Mohindra |
| 5,390,364 A | 2/1995 | Webster et al. | 5,589,793 A | 12/1996 | Kassapian |
| 5,400,084 A | 3/1995 | Scarpa | 5,592,131 A | 1/1997 | Labreche et al. |
| 5,404,127 A | 4/1995 | Lee et al. | 5,600,680 A | 2/1997 | Mishima et al. |
| 5,410,195 A | 4/1995 | Ichihara | 5,602,847 A | 2/1997 | Pagano et al. |
| 5,410,270 A | 4/1995 | Rybicki et al. | 5,602,868 A | 2/1997 | Wilson |
| 5,410,541 A | 4/1995 | Hotto | 5,604,592 A | 2/1997 | Kotidis et al. |
| 5,410,743 A | 4/1995 | Seely et al. | 5,604,732 A | 2/1997 | Kim et al. |
| 5,412,352 A | 5/1995 | Graham | 5,606,731 A | 2/1997 | Pace et al. |
| 5,416,449 A | 5/1995 | Joshi | 5,608,531 A | 3/1997 | Honda et al. |
| 5,416,803 A | 5/1995 | Janer | 5,610,946 A | 3/1997 | Tanaka et al. |
| 5,422,909 A | 6/1995 | Love et al. | RE35,494 E | 4/1997 | Nicollini |
| 5,422,913 A | 6/1995 | Wilkinson | 5,617,451 A | 4/1997 | Mimura et al. |
| 5,423,082 A | 6/1995 | Cygan et al. | 5,619,538 A | 4/1997 | Sempel et al. |
| 5,428,638 A | 6/1995 | Cioffi et al. | 5,621,455 A | 4/1997 | Rogers et al. |
| 5,428,640 A | 6/1995 | Townley | 5,628,055 A | 5/1997 | Stein |
| 5,434,546 A | 7/1995 | Palmer | 5,630,227 A | 5/1997 | Bella et al. |
| 5,438,329 A | 8/1995 | Gastouniotis et al. | 5,633,610 A | 5/1997 | Maekawa et al. |
| 5,438,692 A | 8/1995 | Mohindra | 5,633,815 A | 5/1997 | Young |
| 5,440,311 A | 8/1995 | Gallagher et al. | 5,634,207 A | 5/1997 | Yamaji et al. |
| 5,444,415 A | 8/1995 | Dent et al. | 5,636,140 A | 6/1997 | Lee et al. |
| 5,444,416 A | 8/1995 | Ishikawa et al. | 5,638,396 A | 6/1997 | Klimek |
| 5,444,865 A | 8/1995 | Heck et al. | 5,640,415 A | 6/1997 | Pandula |
| 5,446,421 A | 8/1995 | Kechkaylo | 5,640,424 A | 6/1997 | Banavong et al. |
| 5,446,422 A | 8/1995 | Mattila et al. | 5,640,428 A | 6/1997 | Abe et al. |
| 5,448,602 A | 9/1995 | Ohmori et al. | 5,640,698 A | 6/1997 | Shen et al. |
| 5,451,899 A | 9/1995 | Lawton | 5,642,071 A | 6/1997 | Sevenhans et al. |
| 5,454,007 A | 9/1995 | Dutta | 5,648,985 A | 7/1997 | Bjerede et al. |
| 5,454,009 A | 9/1995 | Fruit et al. | 5,650,785 A | 7/1997 | Rodal |
| 5,463,356 A | 10/1995 | Palmer | 5,661,424 A | 8/1997 | Tang |
| 5,463,357 A | 10/1995 | Hobden | 5,663,878 A | 9/1997 | Walker |
| 5,465,071 A | 11/1995 | Kobayashi et al. | 5,663,986 A | 9/1997 | Striffler |
| 5,465,410 A | 11/1995 | Hiben et al. | 5,668,836 A | 9/1997 | Smith et al. |
| 5,465,415 A | 11/1995 | Bien | 5,675,392 A | 10/1997 | Nayebi et al. |
| 5,465,418 A | 11/1995 | Zhou et al. | 5,678,220 A | 10/1997 | Fournier |
| 5,471,162 A | 11/1995 | McEwan | 5,678,226 A | 10/1997 | Li et al. |
| 5,471,665 A | 11/1995 | Pace et al. | 5,680,078 A | 10/1997 | Ariie |
| 5,479,120 A | 12/1995 | McEwan | 5,680,418 A | 10/1997 | Croft et al. |
| 5,479,447 A | 12/1995 | Chow et al. | 5,682,099 A | 10/1997 | Thompson et al. |
| 5,481,570 A | 1/1996 | Winters | 5,689,413 A | 11/1997 | Jaramillo et al. |
| 5,483,193 A | 1/1996 | Kennedy et al. | 5,694,096 A | 12/1997 | Ushiroku et al. |
| 5,483,549 A | 1/1996 | Weinberg et al. | 5,697,074 A | 12/1997 | Makikallio et al. |
| 5,483,600 A | 1/1996 | Werrbach | 5,699,006 A | 12/1997 | Zele et al. |
| 5,483,691 A | 1/1996 | Heck et al. | 5,703,584 A | 12/1997 | Hill |
| 5,483,695 A | 1/1996 | Pardoen | 5,705,949 A | 1/1998 | Alelyunas et al. |
| 5,490,173 A | 2/1996 | Whikehart et al. | 5,705,955 A | 1/1998 | Freeburg et al. |
| 5,490,176 A | 2/1996 | Peltier | 5,710,992 A | 1/1998 | Sawada et al. |
| 5,493,581 A | 2/1996 | Young et al. | 5,710,998 A | 1/1998 | Opas |
| 5,493,721 A | 2/1996 | Reis | 5,714,910 A | 2/1998 | Skoczen et al. |
| 5,495,200 A | 2/1996 | Kwan et al. | 5,715,281 A | 2/1998 | Bly et al. |
| 5,495,202 A | 2/1996 | Hsu | 5,721,514 A | 2/1998 | Crockett et al. |
| 5,495,500 A | 2/1996 | Jovanovich et al. | 5,724,002 A | 3/1998 | Hulick |
| 5,499,267 A | 3/1996 | Ohe et al. | 5,724,653 A | 3/1998 | Baker et al. |
| 5,500,758 A | 3/1996 | Thompson et al. | 5,729,577 A | 3/1998 | Chen |
| 5,513,389 A | 4/1996 | Reeser et al. | 5,729,829 A | 3/1998 | Talwar et al. |
| 5,515,014 A | 5/1996 | Troutman | 5,732,333 A | 3/1998 | Cox et al. |
| 5,517,688 A | 5/1996 | Fajen et al. | 5,734,683 A | 3/1998 | Hulkko et al. |
| 5,519,890 A | 5/1996 | Pinckley | 5,736,895 A | 4/1998 | Yu et al. |
| 5,523,719 A | 6/1996 | Longo et al. | 5,737,035 A | 4/1998 | Rotzoll |
| 5,523,726 A | 6/1996 | Kroeger et al. | 5,742,189 A | 4/1998 | Yoshida et al. |
| 5,523,760 A | 6/1996 | McEwan | 5,745,846 A | 4/1998 | Myer et al. |
| 5,535,402 A | 7/1996 | Leibowitz et al. | 5,748,683 A | 5/1998 | Smith et al. |
| 5,539,770 A | 7/1996 | Ishigaki | 5,751,154 A | 5/1998 | Tsugai |
| 5,551,076 A | 8/1996 | Bonn | 5,757,858 A | 5/1998 | Black et al. |
| 5,552,789 A | 9/1996 | Schuermann | 5,757,870 A | 5/1998 | Miya et al. |
| 5,555,453 A | 9/1996 | Kajimoto et al. | RE35,829 E | 6/1998 | Sanderford, Jr. |
| 5,557,641 A | 9/1996 | Weinberg | 5,760,629 A | 6/1998 | Urabe et al. |
| 5,557,642 A | 9/1996 | Williams | 5,760,632 A | 6/1998 | Kawakami et al. |
| 5,563,550 A | 10/1996 | Toth | 5,760,645 A | 6/1998 | Comte et al. |
| 5,564,097 A | 10/1996 | Swanke | 5,764,087 A | 6/1998 | Clark |
| 5,574,755 A | 11/1996 | Persico | 5,767,726 A | 6/1998 | Wang |
| 5,579,341 A | 11/1996 | Smith et al. | 5,768,118 A | 6/1998 | Faulk et al. |
| 5,579,347 A | 11/1996 | Lindquist et al. | 5,768,323 A | 6/1998 | Kroeger et al. |

| | | | | | | |
|---|---|---|---|---|---|---|
| 5,770,985 | A | 6/1998 | Ushiroku et al. | 5,926,065 | A | 7/1999 | Wakai et al. |
| 5,771,442 | A | 6/1998 | Wang et al. | 5,926,513 | A | 7/1999 | Suominen et al. |
| 5,777,692 | A | 7/1998 | Ghosh | 5,933,467 | A | 8/1999 | Sehier et al. |
| 5,777,771 | A | 7/1998 | Smith | 5,937,013 | A | 8/1999 | Lam et al. |
| 5,778,022 | A | 7/1998 | Walley | 5,943,370 | A | 8/1999 | Smith |
| 5,784,689 | A | 7/1998 | Kobayashi | 5,945,660 | A | 8/1999 | Nakasuji et al. |
| 5,786,844 | A | 7/1998 | Rogers et al. | 5,949,827 | A | 9/1999 | DeLuca et al. |
| 5,787,125 | A | 7/1998 | Mittel | 5,952,895 | A | 9/1999 | McCune, Jr. et al. |
| 5,790,587 | A | 8/1998 | Smith et al. | 5,953,642 | A | 9/1999 | Feldtkeller et al. |
| 5,793,801 | A | 8/1998 | Fertner | 5,955,992 | A | 9/1999 | Shattil |
| 5,793,817 | A | 8/1998 | Wilson | 5,959,850 | A | 9/1999 | Lim |
| 5,793,818 | A | 8/1998 | Claydon et al. | 5,960,033 | A | 9/1999 | Shibano et al. |
| 5,801,654 | A | 9/1998 | Traylor | 5,970,053 | A | 10/1999 | Schick et al. |
| 5,802,463 | A | 9/1998 | Zuckerman | 5,982,315 | A | 11/1999 | Bazarjani et al. |
| 5,805,460 | A | 9/1998 | Greene et al. | 5,982,329 | A | 11/1999 | Pittman et al. |
| 5,809,060 | A | 9/1998 | Cafarella et al. | 5,986,600 | A | 11/1999 | McEwan |
| 5,812,546 | A | 9/1998 | Zhou et al. | 5,994,689 | A | 11/1999 | Charrier |
| 5,818,582 | A | 10/1998 | Fernandez et al. | 5,995,030 | A | 11/1999 | Cabler |
| 5,818,869 | A | 10/1998 | Miya et al. | 5,999,561 | A | 12/1999 | Naden et al. |
| 5,825,254 | A | 10/1998 | Lee | 6,005,506 | A | 12/1999 | Bazarjani et al. |
| 5,825,257 | A | 10/1998 | Klymyshyn et al. | 6,005,903 | A | 12/1999 | Mendelovicz |
| 5,834,979 | A | 11/1998 | Yatsuka | 6,011,435 | A | 1/2000 | Takeyabu et al. |
| 5,834,985 | A | 11/1998 | Sundegård | 6,014,176 | A | 1/2000 | Nayebi et al. |
| 5,834,987 | A | 11/1998 | Dent | 6,014,551 | A | 1/2000 | Pesola et al. |
| 5,841,324 | A | 11/1998 | Williams | 6,018,262 | A | 1/2000 | Noro et al. |
| 5,841,811 | A | 11/1998 | Song | 6,018,553 | A | 1/2000 | Sanielevici et al. |
| 5,844,449 | A | 12/1998 | Abeno et al. | 6,026,286 | A | 2/2000 | Long |
| 5,844,868 | A | 12/1998 | Takahashi et al. | 6,028,887 | A | 2/2000 | Harrison et al. |
| 5,847,594 | A | 12/1998 | Mizuno | 6,031,217 | A | 2/2000 | Aswell et al. |
| 5,859,878 | A | 1/1999 | Phillips et al. | 6,034,566 | A | 3/2000 | Ohe |
| 5,864,754 | A | 1/1999 | Hotto | 6,041,073 | A | 3/2000 | Davidovici et al. |
| 5,870,670 | A | 2/1999 | Ripley et al. | 6,047,026 | A | 4/2000 | Chao et al. |
| 5,872,446 | A | 2/1999 | Cranford, Jr. et al. | 6,049,573 | A | 4/2000 | Song |
| 5,878,088 | A | 3/1999 | Knutson et al. | 6,049,706 | A | 4/2000 | Cook et al. |
| 5,881,375 | A | 3/1999 | Bonds | 6,054,889 | A | 4/2000 | Kobayashi |
| 5,883,548 | A | 3/1999 | Assard et al. | 6,057,714 | A | 5/2000 | Andrys et al. |
| 5,884,154 | A | 3/1999 | Sano et al. | 6,061,551 | A | 5/2000 | Sorrells et al. |
| 5,887,001 | A | 3/1999 | Russell | 6,061,555 | A | 5/2000 | Bultman et al. |
| 5,892,380 | A | 4/1999 | Quist | 6,064,054 | A | 5/2000 | Waczynski et al. |
| 5,894,239 | A | 4/1999 | Bonaccio et al. | 6,067,329 | A | 5/2000 | Kato et al. |
| 5,894,496 | A | 4/1999 | Jones | 6,073,001 | A | 6/2000 | Sokoler |
| 5,896,304 | A | 4/1999 | Tiemann et al. | 6,076,015 | A | 6/2000 | Hartley et al. |
| 5,896,347 | A * | 4/1999 | Tomita et al. ............ 365/233 | 6,078,630 | A | 6/2000 | Prasanna |
| 5,896,562 | A | 4/1999 | Heinonen | 6,081,691 | A | 6/2000 | Renard et al. |
| 5,898,912 | A | 4/1999 | Heck et al. | 6,084,465 | A | 7/2000 | Dasgupta |
| 5,900,746 | A | 5/1999 | Sheahan | 6,084,922 | A | 7/2000 | Zhou et al. |
| 5,900,747 | A | 5/1999 | Brauns | 6,085,073 | A | 7/2000 | Palermo et al. |
| 5,901,054 | A | 5/1999 | Leu et al. | 6,091,289 | A | 7/2000 | Song et al. |
| 5,901,187 | A | 5/1999 | Iinuma | 6,091,939 | A | 7/2000 | Banh |
| 5,901,344 | A | 5/1999 | Opas | 6,091,940 | A | 7/2000 | Sorrells et al. |
| 5,901,347 | A | 5/1999 | Chambers et al. | 6,091,941 | A | 7/2000 | Moriyama et al. |
| 5,901,348 | A | 5/1999 | Bang et al. | 6,094,084 | A | 7/2000 | Abou-Allam et al. |
| 5,901,349 | A | 5/1999 | Guegnaud et al. | 6,098,046 | A | 8/2000 | Cooper et al. |
| 5,903,178 | A | 5/1999 | Miyatsuji et al. | 6,098,886 | A | 8/2000 | Swift et al. |
| 5,903,187 | A | 5/1999 | Claverie et al. | 6,121,819 | A | 9/2000 | Traylor |
| 5,903,196 | A | 5/1999 | Salvi et al. | 6,125,271 | A | 9/2000 | Rowland et al. |
| 5,903,421 | A | 5/1999 | Furutani et al. | 6,144,236 | A | 11/2000 | Vice et al. |
| 5,903,553 | A | 5/1999 | Sakamoto et al. | 6,144,331 | A | 11/2000 | Jiang |
| 5,903,595 | A | 5/1999 | Suzuki | 6,144,846 | A | 11/2000 | Durec |
| 5,903,609 | A | 5/1999 | Kool et al. | 6,147,340 | A | 11/2000 | Levy |
| 5,903,827 | A | 5/1999 | Kennan et al. | 6,147,763 | A | 11/2000 | Steinlechner |
| 5,903,854 | A | 5/1999 | Abe et al. | 6,150,890 | A | 11/2000 | Damgaard et al. |
| 5,905,433 | A | 5/1999 | Wortham | 6,151,354 | A | 11/2000 | Abbey |
| 5,905,449 | A | 5/1999 | Tsubouchi et al. | 6,160,280 | A | 12/2000 | Bonn et al. |
| 5,907,149 | A | 5/1999 | Marckini | 6,169,733 | B1 | 1/2001 | Lee |
| 5,907,197 | A | 5/1999 | Faulk | 6,175,728 | B1 | 1/2001 | Mitama |
| 5,909,447 | A | 6/1999 | Cox et al. | 6,178,319 | B1 | 1/2001 | Kashima |
| 5,911,116 | A | 6/1999 | Nosswitz | 6,182,011 | B1 | 1/2001 | Ward |
| 5,911,123 | A | 6/1999 | Shaffer et al. | 6,204,789 | B1 | 3/2001 | Nagata |
| 5,914,622 | A | 6/1999 | Inoue | 6,208,636 | B1 | 3/2001 | Tawil et al. |
| 5,915,278 | A | 6/1999 | Mallick | RE37,138 | E | 4/2001 | Dent |
| 5,918,167 | A | 6/1999 | Tiller et al. | 6,211,718 | B1 | 4/2001 | Souetinov |
| 5,920,199 | A | 7/1999 | Sauer | 6,212,369 | B1 | 4/2001 | Avasarala |

| | | | | | |
|---|---|---|---|---|---|
| 6,215,475 B1 | 4/2001 | Meyerson et al. | 6,853,690 B1 | 2/2005 | Sorrells et al. |
| 6,215,828 B1 | 4/2001 | Signell et al. | 6,865,399 B2 | 3/2005 | Fujioka et al. |
| 6,225,848 B1 | 5/2001 | Tilley et al. | 6,873,836 B1 | 3/2005 | Sorrells et al. |
| 6,230,000 B1 | 5/2001 | Tayloe | 6,879,817 B1 | 4/2005 | Sorrells et al. |
| 6,246,695 B1 | 6/2001 | Seazholtz et al. | 6,882,194 B2 | 4/2005 | Belot et al. |
| 6,259,293 B1 * | 7/2001 | Hayase et al. .............. 327/276 | 6,892,057 B2 | 5/2005 | Nilsson |
| 6,266,518 B1 | 7/2001 | Sorrells et al. | 6,892,062 B2 | 5/2005 | Lee et al. |
| 6,298,065 B1 | 10/2001 | Dombkowski et al. | 6,909,739 B1 | 6/2005 | Eerola et al. |
| 6,307,894 B2 | 10/2001 | Eidson et al. | 6,910,015 B2 | 6/2005 | Kawai |
| 6,308,058 B1 | 10/2001 | Souetinov et al. | 6,917,796 B2 | 7/2005 | Setty et al. |
| 6,313,685 B1 | 11/2001 | Rabii | 6,920,311 B2 | 7/2005 | Rofougaran et al. |
| 6,313,700 B1 | 11/2001 | Nishijima et al. | 6,959,178 B2 | 10/2005 | Macedo et al. |
| 6,314,279 B1 | 11/2001 | Mohindra | 6,963,626 B1 | 11/2005 | Shaeffer et al. |
| 6,317,589 B1 | 11/2001 | Nash | 6,963,734 B2 | 11/2005 | Sorrells et al. |
| 6,321,073 B1 | 11/2001 | Luz et al. | 6,973,476 B1 | 12/2005 | Naden et al. |
| 6,327,313 B1 | 12/2001 | Traylor et al. | 6,975,848 B2 | 12/2005 | Rawlins et al. |
| 6,330,244 B1 | 12/2001 | Swartz et al. | 6,999,747 B2 | 2/2006 | Su |
| 6,335,656 B1 | 1/2002 | Goldfarb et al. | 7,006,805 B1 | 2/2006 | Sorrells et al. |
| 6,353,735 B1 | 3/2002 | Sorrells et al. | 7,010,286 B2 | 3/2006 | Sorrells et al. |
| 6,363,262 B1 | 3/2002 | McNicol | 7,010,559 B2 | 3/2006 | Rawlins et al. |
| 6,366,622 B1 | 4/2002 | Brown et al. | 7,016,663 B2 | 3/2006 | Sorrells et al. |
| 6,370,371 B1 | 4/2002 | Sorrells et al. | 7,027,786 B1 | 4/2006 | Smith et al. |
| 6,385,439 B1 | 5/2002 | Hellberg | 7,039,372 B1 | 5/2006 | Sorrells et al. |
| 6,393,070 B1 | 5/2002 | Reber | 7,050,058 B2 | 5/2006 | Sorrells et al. |
| 6,400,963 B1 | 6/2002 | Glöckler et al. | 7,054,296 B1 | 5/2006 | Sorrells et al. |
| 6,404,758 B1 | 6/2002 | Wang | 7,065,162 B1 | 6/2006 | Sorrells et al. |
| 6,404,823 B1 | 6/2002 | Grange et al. | 7,072,390 B1 | 7/2006 | Sorrells et al. |
| 6,421,534 B1 | 7/2002 | Cook et al. | 7,072,427 B2 | 7/2006 | Rawlins et al. |
| 6,437,639 B1 | 8/2002 | Nguyen et al. | 7,072,433 B2 * | 7/2006 | Bell .......................... 375/376 |
| 6,438,366 B1 | 8/2002 | Lindfors et al. | 7,076,011 B2 | 7/2006 | Cook et al. |
| 6,441,659 B1 * | 8/2002 | Demone .................... 327/156 | 7,082,171 B1 | 7/2006 | Johnson et al. |
| 6,441,694 B1 | 8/2002 | Turcotte et al. | 7,085,335 B2 | 8/2006 | Rawlins et al. |
| 6,445,726 B1 | 9/2002 | Gharpurey | 7,107,028 B2 | 9/2006 | Sorrells et al. |
| 6,459,721 B1 | 10/2002 | Mochizuki et al. | 7,110,435 B1 | 9/2006 | Sorrells et al. |
| 6,509,777 B2 | 1/2003 | Razavi et al. | 7,110,444 B1 | 9/2006 | Sorrells et al. |
| 6,512,544 B1 | 1/2003 | Merrill et al. | 7,190,941 B2 | 3/2007 | Sorrells et al. |
| 6,512,785 B1 | 1/2003 | Zhou et al. | 7,194,246 B2 | 3/2007 | Sorrells et al. |
| 6,516,185 B1 | 2/2003 | MacNally | 7,209,725 B1 | 4/2007 | Sorrells et al. |
| 6,531,979 B1 | 3/2003 | Hynes | 7,218,899 B2 | 5/2007 | Sorrells et al. |
| 6,542,722 B1 | 4/2003 | Sorrells et al. | 7,218,907 B2 | 5/2007 | Sorrells et al. |
| 6,560,301 B1 | 5/2003 | Cook et al. | 7,224,749 B2 | 5/2007 | Sorrells et al. |
| 6,560,451 B1 | 5/2003 | Somayajula | 2001/0015673 A1 | 8/2001 | Yamashita et al. |
| 6,567,483 B1 | 5/2003 | Dent et al. | 2001/0036818 A1 | 11/2001 | Dobrovolny |
| 6,580,902 B1 | 6/2003 | Sorrells et al. | 2002/0037706 A1 | 3/2002 | Ichihara |
| 6,591,310 B1 | 7/2003 | Johnson | 2002/0080728 A1 | 6/2002 | Sugar et al. |
| 6,597,240 B1 | 7/2003 | Walburger et al. | 2002/0132642 A1 | 9/2002 | Hines et al. |
| 6,600,795 B1 | 7/2003 | Ohta et al. | 2002/0163921 A1 | 11/2002 | Ethridge et al. |
| 6,600,911 B1 | 7/2003 | Morishige et al. | 2003/0045263 A1 | 3/2003 | Wakayama et al. |
| 6,608,647 B1 | 8/2003 | King | 2003/0081781 A1 | 5/2003 | Jensen et al. |
| 6,611,569 B1 | 8/2003 | Schier et al. | 2003/0149579 A1 | 8/2003 | Begemann et al. |
| 6,618,579 B1 | 9/2003 | Smith et al. | 2004/0125879 A1 | 7/2004 | Jaussi et al. |
| 6,628,328 B1 | 9/2003 | Yokouchi et al. | 2006/0039449 A1 | 2/2006 | Fontana et al. |
| 6,633,194 B2 | 10/2003 | Arnborg et al. | | | |
| 6,634,555 B1 | 10/2003 | Sorrells et al. | FOREIGN PATENT DOCUMENTS | | |
| 6,639,939 B1 | 10/2003 | Naden et al. | DE | 35 41 031 A1 | 5/1986 |
| 6,647,250 B1 | 11/2003 | Bultman et al. | DE | 42 37 692 C1 | 3/1994 |
| 6,647,270 B1 | 11/2003 | Himmelstein | DE | 196 27 640 A1 | 1/1997 |
| 6,686,879 B2 | 2/2004 | Shattil | DE | 692 21 098 T2 | 1/1998 |
| 6,687,493 B1 | 2/2004 | Sorrells et al. | DE | 196 48 915 A1 | 6/1998 |
| 6,690,232 B2 | 2/2004 | Ueno et al. | DE | 197 35 798 C1 | 7/1998 |
| 6,694,128 B1 | 2/2004 | Sorrells et al. | EP | 0 035 166 A1 | 9/1981 |
| 6,697,603 B1 | 2/2004 | Lovinggood et al. | EP | 0 087 336 A1 | 8/1983 |
| 6,704,549 B1 | 3/2004 | Sorrells et al. | EP | 0 099 265 A1 | 1/1984 |
| 6,704,558 B1 | 3/2004 | Sorrells et al. | EP | 0 087 336 B1 | 7/1986 |
| 6,741,139 B2 | 5/2004 | Pleasant et al. | EP | 0 254 844 A2 | 2/1988 |
| 6,741,650 B1 | 5/2004 | Painchaud et al. | EP | 0 276 130 A2 | 7/1988 |
| 6,775,684 B1 | 8/2004 | Toyoyama et al. | EP | 0 276 130 A3 | 7/1988 |
| 6,798,351 B1 | 9/2004 | Sorrells et al. | EP | 0 193 899 B1 | 6/1990 |
| 6,801,253 B1 | 10/2004 | Yonemoto et al. | EP | 0 380 351 A2 | 8/1990 |
| 6,813,485 B2 | 11/2004 | Sorrells et al. | EP | 0 380 351 A3 | 2/1991 |
| 6,823,178 B2 | 11/2004 | Pleasant et al. | EP | 0 411 840 A2 | 2/1991 |
| 6,836,650 B2 | 12/2004 | Sorrells et al. | EP | 0 423 718 A2 | 4/1991 |
| 6,850,742 B2 | 2/2005 | Fayyaz | | | |

| | | |
|---|---|---|
| EP | 0 411 840 A3 | 7/1991 |
| EP | 0 486 095 A1 | 5/1992 |
| EP | 0 423 718 A3 | 8/1992 |
| EP | 0 512 748 A2 | 11/1992 |
| EP | 0 529 836 A1 | 3/1993 |
| EP | 0 548 542 A1 | 6/1993 |
| EP | 0 512 748 A3 | 7/1993 |
| EP | 0 560 228 A1 | 9/1993 |
| EP | 0 632 577 A1 | 1/1995 |
| EP | 0 643 477 A2 | 3/1995 |
| EP | 0 643 477 A3 | 3/1995 |
| EP | 0 411 840 B1 | 10/1995 |
| EP | 0 732 803 A1 | 9/1996 |
| EP | 0 486 095 B1 | 2/1997 |
| EP | 0 785 635 A1 | 7/1997 |
| EP | 0 789 449 A2 | 8/1997 |
| EP | 0 789 449 A3 | 8/1997 |
| EP | 0 795 955 A2 | 9/1997 |
| EP | 0 795 955 A3 | 9/1997 |
| EP | 0 795 978 A2 | 9/1997 |
| EP | 0 817 369 A2 | 1/1998 |
| EP | 0 817 369 A3 | 1/1998 |
| EP | 0 837 565 A1 | 4/1998 |
| EP | 0 862 274 A1 | 9/1998 |
| EP | 0 874 499 A2 | 10/1998 |
| EP | 0 512 748 B1 | 11/1998 |
| EP | 0 877 476 A1 | 11/1998 |
| EP | 0 977 351 A1 | 2/2000 |
| FR | 2 245 130 | 4/1975 |
| FR | 2 669 787 A1 | 5/1992 |
| FR | 2 743 231 A1 | 7/1997 |
| GB | 2 161 344 A | 1/1986 |
| GB | 2 215 945 A | 9/1989 |
| GB | 2 324 919 A | 11/1998 |
| JP | 47-2314 | 2/1972 |
| JP | 55-66057 | 5/1980 |
| JP | 56-114451 | 9/1981 |
| JP | 58-7903 | 1/1983 |
| JP | 58-133004 | 8/1983 |
| JP | 59-144249 | 8/1984 |
| JP | 60-58705 | 4/1985 |
| JP | 60-130203 | 7/1985 |
| JP | 61-30821 | 2/1986 |
| JP | 61-232706 | 10/1986 |
| JP | 62-12381 | 1/1987 |
| JP | 63-54002 | 3/1988 |
| JP | 63-65587 | 3/1988 |
| JP | 63-153691 | 6/1988 |
| JP | 2-39632 | 2/1990 |
| JP | 2-131629 | 5/1990 |
| JP | 2-276351 | 11/1990 |
| JP | 4-123614 | 4/1992 |
| JP | 4-127601 | 4/1992 |
| JP | 4-154227 | 5/1992 |
| JP | 5-175730 | 7/1993 |
| JP | 5-175734 | 7/1993 |
| JP | 5-327356 | 12/1993 |
| JP | 6-237276 | 8/1994 |
| JP | 6-284038 | 10/1994 |
| JP | 7-154344 | 6/1995 |
| JP | 7-307620 | 11/1995 |
| JP | 8-23359 | 1/1996 |
| JP | 8-32556 | 2/1996 |
| JP | 8-139524 | 5/1996 |
| JP | 9-36664 | 2/1997 |
| JP | 9-171399 | 6/1997 |
| JP | 10-41860 | 2/1998 |
| JP | 10-96778 | 4/1998 |
| JP | 10-173563 | 6/1998 |
| JP | 11-98205 | 4/1999 |
| WO | WO80/01633 A1 | 8/1980 |
| WO | WO91/18445 A1 | 11/1991 |
| WO | WO94/05087 A1 | 3/1994 |
| WO | WO95/01006 A1 | 1/1995 |
| WO | WO96/02977 A1 | 2/1996 |
| WO | WO96/08078 A1 | 3/1996 |
| WO | WO96/39750 A1 | 12/1996 |
| WO | WO97/08839 A2 | 3/1997 |
| WO | WO97/08839 A3 | 3/1997 |
| WO | WO97/38490 A1 | 10/1997 |
| WO | WO98/00953 A1 | 1/1998 |
| WO | WO98/24201 A1 | 6/1998 |
| WO | WO98/40968 A2 | 9/1998 |
| WO | WO98/40968 A3 | 9/1998 |
| WO | WO98/53556 A2 | 11/1998 |
| WO | WO99/23755 A1 | 5/1999 |
| WO | WO 00/31659 A1 | 6/2000 |

OTHER PUBLICATIONS

Gaudiosi, J., "Retailers will bundle Microsoft's Xbox with games and peripherals," *Video Store Magazine*, vol. 23, Issue 36, p. 8, 2 pages (Sep. 2-8, 2001).
English-language Translation of German Patent Publication No. DT 1936252, translation provided by Transperfect Translations, 12 pages (Jan. 28, 1971—Date of publication of application).
English-language Abstract of Japanese Patent Publication No. JP 62-12381, data supplied by the espacenet, 1 page (Jan. 21, 1987—Date of publication of application).
English-language Abstract of Japanese Patent Publication No. JP 4-154227, data supplied by the espacenet, 1 page (May 27, 1992—Date of publication of application).
English-language Abstract of Japanese Patent Publication No. JP 6-284038, data supplied by the espacenet, 1 page (Oct. 7, 1994—Date of publication of application).
English-language Abstract of Japanese Patent Publication No. JP 10-96778, data supplied by the espacenet, 1 page (Apr. 14, 1998—Date of publication of application).
English-language Abstract of Japanese Patent Publication No. JP 11-98205, data supplied by the espacenet, 1 page (Apr. 9, 1999—Date of publication of application).
Deboo, Gordon J., *Integrated Circuits and Semiconductor Devices*, 2nd Edition, McGraw-Hill, Inc., pp. 41-45 (1977).
Hellwarth, G.A. and Jones, G.D, "Automatic Conditioning of Speech Signals," *IEEE Transactions on Audio and Electroacoustics*, vol. AU-16, No. 2, pp. 169-179 (Jun. 1968).
English Abstract for German Patent No. DE 692 21 098 T2, 1 page, data supplied from the espacenet.
Aghvami, H. et al., "Land Mobile Satellites Using the Highly Elliptic Orbits- The UK T-SAT Mobile Payload," *Fourth International Conference on Satellite Systems for Mobile Communications and Navigation*, IEE, pp. 147-153 (Oct. 17-19, 1988).
Akers, N.P. et al., "RF Sampling Gates: a Brief Review," *IEE Proceedings*, IEE, vol. 133, Part A, No. 1, pp. 45-49 (Jan. 1986).
Al-Ahmad, H.A.M. et al., "Doppler Frequency Correction for a Non-Geostationary Communications Satellite. Techniques for CERS and T-SAT," *Electronics Division Colloquium on Low Noise Oscillators and Synthesizers*, IEE, pp. 4/1-4/5 (Jan. 23, 1986).
Ali, I. et al., "Doppler Characterization for LEO Satellites," *IEEE Transactions on Communications*, IEEE, vol. 46, No. 3, pp. 309-313 (Mar. 1998).
Allan, D.W., "Statistics of Atomic Frequency Standards," *Proceedings Of The IEEE Special Issue on Frequency Stability*, IEEE, pp. 221-230 (Feb. 1966).
Allstot, D.J. et al., "MOS Switched Capacitor Ladder Filters," *IEEE Journal of Solid-State Circuits*, IEEE, vol. SC-13, No. 6, pp. 806-814 (Dec. 1978).
Allstot, D.J. and Black Jr. W.C., "Technological Design Considerations for Monolithic MOS Switched-Capacitor Filtering Systems," *Proceedings of the IEEE*, IEEE, vol. 71, No. 8, pp. 967-986 (Aug. 1983).
Alouini, M. et al., "Channel Characterization and Modeling for Ka-Band Very Small Aperture Terminals," *Proceedings Of the IEEE*, IEEE, vol. 85, No. 6, pp. 981-997 (Jun. 1997).
Andreyev, G.A. and Ogarev, S.A., "Phase Distortions of Keyed Millimeter-Wave Signals in the Case of Propagation in a Turbulent Atmosphere," *Telecommunications and Radio Engineering*, Scripta Technica, vol. 43, No. 12, pp. 87-90 (Dec. 1988).

Antonetti, A. et al., "Optoelectronic Sampling in the Picosecond Range," *Optics Communications*, North-Holland Publishing Company, vol. 21, No. 2, pp. 211-214 (May 1977).

Austin, J. et al., "Doppler Correction of the Telecommunication Payload Oscillators in the UK T-SAT," *18th European Microwave Conference*, Microwave Exhibitions and Publishers Ltd., pp. 851-857 (Sep. 12-15, 1988).

Auston, D.H., "Picosecond optoelectronic switching and gating in silicon," *Applied Physics Letters*, American Institute of Physics, vol. 26, No. 3, pp. 101-103 (Feb. 1, 1975).

Baher, H., "Transfer Functions for Switched-Capacitor and Wave Digital Filters," *IEEE Transactions on Circuits and Systems*, IEEE Circuits and Systems Society, vol. CAS-33, No. 11, pp. 1138-1142 (Nov. 1986).

Baines, R., "The DSP Bottleneck," *IEEE Communications Magazine*, IEEE Communications Society, pp. 46-54 (May 1995).

Banjo, O.P. and Vilar, E., "Binary Error Probabilities on Earth-Space Links Subject to Scintillation Fading," *Electronics Letters*, IEE, vol. 21, No. 7, pp. 296-297 (Mar. 28, 1985).

Banjo, O.P. and Vilar, E., "The Dependence of Slant Path Amplitude Scintillations on Various Meteorological Parameters," *Fifth International Conference on Antennas and Propagation (ICAP 87) Part 2: Propagation*, IEE, pp. 277-280 (Mar. 30-Apr. 2, 1987).

Banjo, O.P. and Vilar, E. "Measurement and Modeling of Amplitude Scintillations on Low-Elevation Earth-Space Paths and Impact on Communication Systems," *IEEE Transactions on Communications*; IEEE Communications Society, vol. COM-34, No. 8, pp. 774-780 (Aug. 1986).

Banjo, O.P. et al., "Tropospheric Amplitude Spectra Due to Absorption and Scattering in Earth-Space Paths," *Fourth International Conference on Antennas and Propagation (ICAP 85)*, IEE, pp. 77-82 (Apr. 16-19, 1985).

Basili,P. et al., "Case Study of Intense Scintillation Events on the OTS Path," *IEEE Transactions on Antennas and Propagation*, IEEE, vol. 38, No. 1, pp. 107-113 (Jan. 1990).

Basili, P. et al., "Observation of High $C^2$ and Turbulent Path Length on OTS Space-Earth Link," *Electronics Letters*, IEE, vol. 24, No. 17, pp. 1114-1116 (Aug. 18, 1988).

Catalan, C. and Vilar, E., "Approach for satellite slant path remote sensing," *Electronics Letters*, IEE, vol. 34, No. 12, pp. 1238-1240 (Jun. 11, 1998).

Chan, P. et al., "A Highly Linear 1-GHz CMOS Downconversion Mixer," *European Solid State Circuits Conference*, IEEE Communication Society, pp. 210-213 (Sep. 22-24, 1993).

Declaration of Michael J. Bultman filed in U.S. Appl. No. 09/176,022, which is directed to related subject matter, 2 pages.

Declaration of Robert W. Cook filed in U.S. Appl. No. 09/176,022, which is directed to related subject matter, 2 pages.

Declaration of Alex Holtz filed in U.S. Appl. No. 09/176,022, which is directed to related subject matter, 3 pages.

Declaration of Richard C. Looke filed in U.S. Appl. No. 09/176,022, which is directed to related subject matter, 2 pages.

Declaration of Charley D. Moses, Jr. filed in U.S. Appl. No. 09/176,022, which is directed to related subject matter, 2 pages.

Declaration of Jeffrey L. Parker and David F. Sorrells, with attachment Exhibit 1, filed in U.S. Appl. No. 09/176,022, which is directed to related subject matter, 130 pages.

Dewey, R.J. and Collier, C.J., "Multi-Mode Radio Receiver," *Electronics Division Colloquium on Digitally Implemented Radios*, IEE, pp. 3/1-3/5 (Oct. 18, 1985).

DIALOG File 347 (JAPIO) English Language Patent Abstract for JP 2-276351, 1 page (Nov. 13, 1990—Date of publication of application).

DIALOG File 347 (JAPIO) English Language Patent Abstract for JP 2-131629, 1 page (May 21, 1990—Date of publication of application).

DIALOG File 347 (JAPIO) English Language Patent Abstract for JP 2-39632, 1 page (Feb. 8, 1990—Date of publication of application).

DIALOG File 348 (European Patents) English Language Patent Abstract for EP 0 785 635 A1, 3 pages (Dec. 26, 1996—Date of publication of application).

DIALOG File 348 (European Patents) English Language Patent Abstract for EP 35166 A1, 2 pages (Feb. 18, 1981—Date of publication of application).

"DSO takes sampling rate to 1 Ghz," *Electronic Engineering*, Morgan Grampian Publishers, vol. 59, No. 723, pp. 77 and 79 (Mar. 1987).

Erdi, G. and Henneuse, P.R., "A Precision FET-Less Sample-and-Hold with High Charge-to-Droop Current Ratio," *IEEE Journal of Solid-State Circuits*, IEEE, vol. SC-13, No. 6, pp. 864-873 (Dec. 1978).

Faulkner, N.D. and Vilar, E., "Subharmonic Sampling for the Measurement of Short Term Stability of Microwave Oscillators," *IEEE Transactions on Instrumentation and Measurement*, IEEE, vol. IM-32, No. 1, pp. 208-213 (Mar. 1983).

Faulkner, N.D. et al., "Sub-Harmonic Sampling for the Accurate Measurement of Frequency Stability of Microwave Oscillators," *CPEM 82 Digest: Conference on Precision Electromagnetic Measurements*, IEEE, pp. M-10 and M-11 (1982).

Faulkner, N.D. and Vilar, E., "Time Domain Analysis of Frequency Stability Using Non-Zero Dead-Time Counter Techniques," *CPEM 84 Digest Conference on Precision Electromagnetic Measurements*, IEEE, pp. 81-82 (1984).

Filip, M. and Vilar, E., "Optimum Utilization of the Channel Capacity of a Satellite Link in the Presence of Amplitude Scintillations and Rain Attenuation," *IEEE Transactions on Communications*, IEEE Communications Society, vol. 38, No. 11, pp. 1958-1965 (Nov. 1990).

Fukahori, K., "A CMOS Narrow-Band Signaling Filter with Q Reduction," *IEEE Journal of Solid-State Circuits*, IEEE, vol. SC-19, No. 6, pp. 926-932 (Dec. 1984).

Fukuchi, H. and Otsu, Y., "Available time statistics of rain attenuation on earth-space path," *IEE Proceedings-H: Microwaves, Antennas and Propagation*, IEE, vol. 135, Pt. H, No. 6, pp. 387-390 (Dec. 1988).

Gibbins, C.J. and Chadha, R., "Millimetre-wave propagation through hydrocarbon flame," *IEE Proceedings*, IEE, vol. 134, Pt. H, No. 2 , pp. 169-173 (Apr. 1987).

Gilchrist, B. et al., "Sampling hikes performance of frequency synthesizers," *Microwaves & RF*, Hayden Publishing, vol. 23, No. 1, pp. 93-94 and 110 (Jan. 1984).

Gossard, E.E., "Clear weather meteorological effects on propagation at frequencies above 1 Ghz," *Radio Science*, American Geophysical Union, vol. 16, No. 5, pp. 589-608 (Sep.-Oct. 1981).

Gregorian, R. et al., "Switched-Capacitor Circuit Design," *Proceedings of the IEEE*, IEEE, vol. 71, No. 8, pp. 941-966 (Aug. 1983).

Groshong et al., "Undersampling Techniques Simplify Digital Radio," *Electronic Design*, Penton Publishing, pp. 67-68, 70, 73-75 and 78 (May 23, 1991).

Grove, W.M., "Sampling for Oscilloscopes and Other RF Systems: Dc through X-Band," *IEEE Transactions on Microwave Theory and Techniques*, IEEE, pp. 629-635 (Dec. 1966).

Haddon, J. et al., "Measurement of Microwave Scintillations on a Satellite Down-Link at X-Band," *Antennas and Propagation*, IEE, pp. 113-117 (1981).

Haddon, J. and Vilar, E., "Scattering Induced Microwave Scintillations from Clear Air and Rain on Earth Space Paths and the Influence of Antenna Aperture," *IEEE Transactions on Antennas and Propagation*, IEEE, vol. AP-34, No. 5, pp. 646-657 (May 1986).

Hafdallah, H. et al., "2-4 Ghz MESFET Sampler," *Electronic Letters*, IEE, vol. 24, No. 3, pp. 151-153 (Feb. 4, 1988).

Herben, M.H.A.J., "Amplitude and Phase Scintillation Measurements on 8-2 km Line-Of-Sight Path at 30 Ghz," *Electronic Letters*, IEE, vol. 18, No. 7, pp. 287-289 (Apr. 1, 1982).

Hewitt, A. et al., "An 18 Ghz Wideband LOS Multipath Experiment," *International Conference on Measurements for Telecommunication Transmission Systems—MTTS 85*, IEE, pp. 112-116 (Nov. 27-28, 1985).

Hewitt, A. et al., "An Autoregressive Approach to the Identification of Multipath Ray Parameters from Field Measurements," *IEEE Transactions on Communications*, IEEE Communications Society, vol. 37, No. 11, pp. 1136-1143 (Nov. 1989).

Hewitt, A. and Vilar, E., "Selective fading on LOS Microwave Links: Classical and Spread-Spectrum Measurements Techniques," *IEEE Transactions on Communications*, IEEE Communications Society, vol. 36, No. 7, pp. 789-796 (Jul. 1988).

Hospitalier, E., "Instruments for Recording and Observing Rapidly Varying Phenomena," *Science Abstracts*, IEE, vol. VII, pp. 22-23 (1904).

Howard, I.M. and Swansson, N.S., "Demodulating High Frequency Resonance Signals for Bearing Fault Detection," *The Institution of Engineers Australia Vibration and Noise Conference*, Institution of Engineers, Australia, pp. 115-121 (Sep. 18-20, 1990).

Hu, X., *A Switched-Current Sample-and-Hold Amplifier for FM Demodulation*, Thesis for Master of Applied Science, Dept. of Electrical and Computer Engineering, University of Toronto, UMI Dissertation Services, pp. 1-64 (1995).

Hung, H-L. A. et al., "Characterization of Microwave Integrated Circuits Using An Optical Phase-Locking and Sampling System," *IEEE MTT-S Digest*, IEEE, pp. 507-510 (1991).

Hurst, P.J., "Shifting the Frequency Response of Switched-Capacitor Filters by Nonuniform Sampling," *IEEE Transactions on Circuits and Systems*, IEEE Circuits and Systems Society, vol. 38, No. 1, pp. 12-19 (Jan. 1991).

Itakura, T., "Effects of the sampling pulse width on the frequency characteristics of a sample-and-hold circuit," *IEE Proceedings Circuits, Devices and Systems*, IEE, vol. 141, No. 4, pp. 328-336 (Aug. 1994).

Janssen, J.M.L., "An Experimental 'Stroboscopic' Oscilloscope for Frequencies up to about 50 Mc/s: I. Fundamentals," *Philips Technical Review*, Philips Research Laboratories, vol. 12, No. 2, pp. 52-59 (Aug. 1950).

Janssen, J.M.L. and Michels, A.J., "An Experimental 'Stroboscopic' Oscilloscope for Frequencies up to about 50 Mc/s: II. Electrical Build-Up," *Philips Technical Review*, Philips Research Laboratories, vol. 12, No. 3, pp. 73-82 (Sep. 1950).

Jondral, V.F. et al., "Doppler Profiles for Communication Satellites," *Frequenz*, Herausberger, pp. 111-116 (May-Jun. 1996).

Kaleh, G.K., "A Frequency Diversity Spread Spectrum System for Communication in the Presence of In-band Interference," *1995 IEEE Globecom*, IEEE Communications Society, pp. 66-70 (1995).

Karasawa, Y. et al., "A New Prediction Method for Tropospheric Scintillation on Earth-Space Paths," *IEEE Transactions on Antennas and Propagation*, IEEE Antennas and Propagation Society, vol. 36, No. 11, pp. 1608-1614 (Nov. 1988).

Kirsten, J. and Fleming, J., "Undersampling reduces data-acquisition costs for select applications," *EDN*, Cahners Publishing, vol. 35, No. 13, pp. 217-222, 224, 226-228 (Jun. 21, 1990).

Lam, W.K. et al., "Measurement of the Phase Noise Characteristics of an Unlocked Communications Channel Identifier," *Proceedings Of the 1993 IEEE International Frequency Control Symposium*, IEEE, pp. 283-288 (Jun. 2-4, 1993).

Lam, W.K. et al., "Wideband sounding of 11.6 Ghz transhorizon channel," *Electronic Letters*, IEE, vol. 30, No. 9, pp. 738-739 (Apr. 28, 1994).

Larkin, K.G., "Efficient demodulator for bandpass sampled AM signals," *Electronic Letters*, IEE, vol. 32, No. 2, pp. 101-102 (Jan. 18, 1996).

Lau, W.H. et al., "Analysis of the Time Variant Structure of Microwave Line-of-sight Multipath Phenomena," *IEEE Global Telecommunications Conference & Exhibition*, IEEE, pp. 1707-1711 (Nov. 28-Dec. 1, 1988).

Lau, W.H. et al., "Improved Prony Algorithm to Identify Multipath Components," *Electronic Letters*, IEE, vol. 23, No. 20, pp. 1059-1060 (Sep. 24, 1987).

Lesage, P. and Audoin, C., "Effect of Dead-Time on the Estimation of the Two-Sample Variance," *IEEE Transactions on Instrumentation and Measurement*, IEEE Instrumentation and Measurement Society, vol. IM-28, No. 1, pp. 6-10 (Mar. 1979).

Liechti, C.A., "Performance of Dual-gate GaAs MESFET's as Gain-Controlled Low-Noise Amplifiers and High-Speed Modulators," *IEEE Transactions on Microwave Theory and Techniques*, IEEE Microwave Theory and Techniques Society, vol. MTT-23, No. 6, pp. 461-469 (Jun. 1975).

Linnenbrink, T.E. et al., "A One Gigasample Per Second Transient Recorder," *IEEE Transactions on Nuclear Science*, IEEE Nuclear and Plasma Sciences Society, vol. NS-26, No. 4, pp. 4443-4449 (Aug. 1979).

Liou, M.L., "A Tutorial on Computer-Aided Analysis of Switched-Capacitor Circuits," *Proceedings of the IEEE*, IEEE, vol. 71, No. 8, pp. 987-1005 (Aug. 1983).

Lo, P. et al., "Coherent Automatic Gain Control," *IEE Colloquium on Phase Locked Techniques*, IEE, pp. 2/1-2/6 (Mar. 26, 1980).

Lo, P. et al., "Computation of Rain Induced Scintillations on Satellite Down-Links at Microwave Frequencies," *Third International Conference on Antennas and Propagation (ICAP 83)*, pp. 127-131 (Apr. 12-15, 1983).

Lo, P.S.L.O. et al., "Observations of Amplitude Scintillations on a Low-Elevation Earth-Space Path," *Electronics Letters*, IEE, vol. 20, No. 7, pp. 307-308 (Mar. 29, 1984).

Madani, K. and Aithison, C.S., "A 20 Ghz Microwave Sampler," *IEEE Transactions on Microwave Theory and Techniques*, IEEE Microwave Theory and Techniques Society, vol. 40, No. 10, pp. 1960-1963 (Oct. 1992).

Marsland, R.A. et al., "130 Ghz GaAs monolithic integrated circuit sampling head," *Appl. Phys. Lett.*, American Institute of Physics, vol. 55, No. 6, pp. 592-594 (Aug. 7, 1989).

Martin, K. and Sedra, A.S., "Switched-Capacitor Building Blocks for Adaptive Systems," *IEEE Transactions on Circuits and Systems*, IEEE Circuits and Systems Society, vol. CAS-28, No. 6, pp. 576-584 (Jun. 1981).

Marzano, F.S. and d'Auria, G., "Model-based Prediction of Amplitude Scintillation variance due to Clear-Air Tropospheric Turbulence on Earth-Satellite Microwave Links," *IEEE Transactions on Antennas and Propagation*, IEEE Antennas and Propagation Society, vol. 46, No. 10, pp. 1506-1518 (Oct. 1998).

Matricciani, E., "Prediction of fade durations due to rain in satellite communication systems," *Radio Science*, American Geophysical Union, vol. 32, No. 3, pp. 935-941 (May-Jun. 1997).

McQueen, J.G., "The Monitoring of High-Speed Waveforms," *Electronic Engineering*, Morgan Brothers Limited, vol. XXIV, No. 296, pp. 436-441 (Oct. 1952).

Merkelo, J. and Hall, R.D., "Broad-Band Thin-Film Signal Sampler," *IEEE Journal of Solid-State Circuits*, IEEE, vol. SC-7, No. 1, pp. 50-54 (Feb. 1972).

Merlo, U. et al., "Amplitude Scintillation Cycles in a Sirio Satellite-Earth Link," *Electronics Letters*, IEE, vol. 21, No. 23, pp. 1094-1096 (Nov. 7, 1985).

Morris, D., "Radio-holographic reflector measurement of the 30-m millimeter radio telescope at 22 Ghz with a cosmic signal source," *Astronomy and Astrophysics*, Springer-Verlag, vol. 203, No. 2, pp. 399-406 (Sep. 11, 1988).

Moulsley, T.J. et al., "The efficient acquisition and processing of propagation statistics," *Journal of the Institution of Electronic and Radio Engineers*, IERE, vol. 55, No. 3, pp. 97-103 (Mar. 1985).

Ndzi, D. et al., "Wide-Band Statistical Characterization of an Over-the Sea Experimental Transhorizon Link," *IEE Colloquium on Radio Communications at Microwave and Millimetre Wave Frequencies*, IEE, pp. 1/1-1/6 (Dec. 16, 1996).

Ndzi, D. et al., "Wideband Statistics of Signal Levels and Doppler Spread on an Over-The-Sea Transhorizon Link," *IEE Colloquium on Propagation Characteristics and Related System Techniques for Beyond Line-of-Sight Radio*, IEE, pp. 9/1-9/6 (Nov. 24, 1997).

"New zero IF chipset from Philips," *Electronic Engineering*, United News & Media, vol. 67, No. 825, p. 10 (Sep. 1995).

Ohara, H. et al., "First monolithic PCM filter cuts cost of telecomm systems," *Electronic Design*, Hayden Publishing Company, vol. 27, No. 8, pp. 130-135 (Apr. 12, 1979).

Oppenheim, A.V. et al., *Signals and Systems*, Prentice-Hall, pp. 527-531 and 561-562 (1983).

Ortgies, G., "Experimental Parameters Affecting Amplitude Scintillation Measurements on Satellite Links," *Electronic Letters*, IEE, vol. 21, No. 17, pp. 771-772 (Aug. 15, 1985).

Pärssinen et al., "A 2-GHz Subharmonic Sampler for Signal Downconversion," *IEEE Transactions on Microwave Theory and Techniques*, IEEE, vol. 45, No. 12, 7 pages (Dec. 1997).

Peeters, G. et al., "Evaluation of Statistical Models for Clear-Air Scintillation Prediction Using Olympus Satellite Measurements," *International Journal of Satellite Communications*, John Wiley and Sons, vol. 15, No. 2, pp. 73-88 (Mar.-Apr. 1997).

Perrey, A.G. and Schoenwetter, H.K., *NBS Technical Note 1121: A Schottky Diode Bridge Sampling Gate*, U.S. Dept. of Commerce, pp. 1-14 (May 1980).

Poulton, K. et al., "A 1-Ghz 6-bit ADC System," *IEEE Journal of Solid-State Circuits*, IEEE, vol. SC-22, No. 6, pp. 962-969 (Dec. 1987).

Press Release, "Parkervision, Inc. Announces Fiscal 1993 Results," Lippert/Heilshorn and Associates, 2 Pages (Apr. 6, 1994).

Press Release, "Parkervision, Inc. Announces the Appointment of Michael Baker to the New Position of National Sales Manager," Lippert/Heilshorn and Associates, 1 Page (Apr. 7, 1994).

Press Release, "Parkervision's Cameraman Well-Received By Distance Learning Market," Lippert/Heilshorn and Associates, 2 Pages (Apr. 8, 1994).

Press Release, "Parkervision, Inc. Announces First Quarter Financial Results," Lippert/Heilshorn and Associates, 2 Pages (Apr. 26, 1994).

Press Release, "Parkervision, Inc. Announces The Retirement of William H. Fletcher, Chief Financial Officer," Lippert/Heilshorn and Associates, 1 Page (May 11, 1994).

Press Release, "Parkervision, Inc. Announces New Cameraman System II™ At Infocomm Trade Show," Lippert/Heilshorn and Associates, 3 Pages (Jun. 9, 1994).

Press Release, "Parkervision, Inc. Announces Appointments to its National Sales Force," Lippert/Heilshorn and Associates, 2 Pages (Jun. 17, 1994).

Press Release, "Parkervision, Inc. Announces Second Quarter and Six Months Financial Results," Lippert/Heilshorn and Associates, 3 Pages (Aug. 9, 1994).

Press Release, "Parkervision, Inc. Announces Third Quarter and Nine Months Financial Results," Lippert/Heilshorn and Associates, 3 Pages (Oct. 28, 1994).

Press Release, "Parkervision, Inc. Announces First Significant Dealer Sale of Its *Cameraman®* System II," Lippert/Heilshorn and Associates, 2 Pages (Nov. 7, 1994).

Press Release, "Parkervision, Inc. Announces Fourth Quarter and Year End Results," Lippert/Heilshorn and Associates, 2 Pages (Mar. 1, 1995).

Press Release, "Parkervision, Inc. Announces Joint Product Developments With VTEL," Lippert/Heilshorn and Associates, 2 Pages (Mar. 21, 1995).

Press Release, "Parkervision, Inc. Announces First Quarter Financial Results," Lippert/Heilshorn and Associates, 3 Pages (Apr. 28, 1995).

Press Release, "Parkervision Wins Top 100 Product Districts' Choice Award," Parkervision Marketing and Manufacturing Headquarters, 1 Page (Jun. 29, 1995).

Press Release, "Parkervision National Sales Manager Next President of USDLA," Parkervision Marketing and Manufacturing Headquarters, 1 Page (Jul. 6, 1995).

Press Release, "Parkervision Granted New Patent," Parkervision Marketing and Manufacturing Headquarters, 1 Page (Jul. 21, 1995).

Press Release, "Parkervision, Inc. Announces Second Quarter and Six Months Financial Results," Parkervision Marketing and Manufacturing Headquarters, 2 Pages (Jul. 31, 1995).

Press Release, "Parkervision, Inc. Expands Its Cameraman System II Product Line," Parkervision Marketing and Manufacturing Headquarters, 2 Pages (Sep. 22, 1995).

Press Release, "Parkervision Announces New Camera Control Technology," Parkervision Marketing and Manufacturing Headquarters, 2 Pages (Oct. 25, 1995).

Press Release, "Parkervision, Inc. Announces Completion of VTEL/Parkervision Joint Product Line," Parkervision Marketing and Manufacturing Headquarters, 2 Pages (Oct. 30, 1995).

Press Release, "Parkervision, Inc. Announces Third Quarter and Nine Months Financial Results," Parkervision Marketing and Manufacturing Headquarters, 2 Pages (Oct. 30, 1995).

Press Release, "Parkervision's Cameraman Personal Locator Camera System Wins Telecon XV Award," Parkervision Marketing and Manufacturing Headquarters, 2 Pages (Nov. 1, 1995).

Press Release, "Parkervision, Inc. Announces Purchase Commitment From VTEL Corporation," Parkervision Marketing and Manufacturing Headquarters, 1 Page (Feb. 26, 1996).

Press Release, "ParkerVision, Inc. Announces Fourth Quarter and Year End Results," Parkervision Marketing and Manufacturing Headquarters, 2 Pages (Feb. 27, 1996).

Press Release, "ParkerVision, Inc. Expands its Product Line," Parkervision Marketing and Manufacturing Headquarters, 2 Pages (Mar. 7, 1996).

Press Release, "ParkerVision Files Patents for its Research of Wireless Technology," Parkervision Marketing and Manufacturing Headquarters, 1 Page (Mar. 28, 1996).

Press Release, "Parkervision, Inc. Announces First Significant Sale of its Cameraman® Three-Chip System," Parkervision Marketing and Manufacturing Headquarters, 2 pages (Apr. 12, 1996).

Press Release, "Parkervision, Inc. Introduces New Product Line For Studio Production Market," Parkervision Marketing and Manufacturing Headquarters, 2 Pages (Apr. 15, 1996).

Press Release, "Parkervision, Inc. Announces Private Placement of 800,000 Shares," Parkervision Marketing and Manufacturing Headquarters, 1 Page (Apr. 15, 1996).

Press Release, "Parkervision, Inc. Announces First Quarter Financial Results," Parkervision Marketing and Manufacturing Headquarters, 3 Pages (Apr. 30, 1996).

Press Release, "ParkerVision's New Studio Product Wins Award," Parkervision Marketing and Manufacturing Headquarters, 2 Pages (Jun. 5, 1996).

Press Release, "Parkervision, Inc. Announces Second Quarter and Six Months Financial Results," Parkervision Marketing and Manufacturing Headquarters, 3 Pages (Aug. 1, 1996).

Press Release, "Parkervision, Inc. Announces Third Quarter and Nine Months Financial Results," Parkervision Marketing and Manufacturing Headquarters, 2 Pages (Oct. 29, 1996).

Press Release, "PictureTel and ParkerVision Sign Reseller Agreement," Parkervision Marketing and Manufacturing Headquarters, 2 Pages (Oct. 30, 1996).

Press Release, "CLI and ParkerVision Bring Enhanced Ease-of-Use to Videoconferencing," CLI/Parkervision, 2 Pages (Jan. 20, 1997).

Press Release, "Parkervision, Inc. Announces Fourth Quarter and Year End Results," Parkervision Marketing and Manufacturing Headquarters, 3 Pages (Feb. 27, 1997).

Press Release, "Parkervision, Inc. Announces First Quarter Financial Results," Parkervision Marketing and Manufacturing Headquarters, 3 Pages (Apr. 29, 1997).

Press Release, "NEC and Parkervision Make Distance Learning Closer," NEC America, 2 Pages (Jun. 18, 1997).

Press Release, "Parkervision Supplies JPL with Robotic Cameras, Cameraman Shot Director for Mars Mission," Parkervision Marketing and Manufacturing Headquarters, 2 pages (Jul. 8, 1997).

Press Release, "ParkerVision and IBM Join Forces to Create Wireless Computer Peripherals," Parkervision Marketing and Manufacturing Headquarters, 2 Pages (Jul. 23, 1997).

Press Release, "ParkerVision, Inc. Announces Second Quarter and Six Months Financial Results," Parkervision Marketing and Manufacturing Headquarters, 3 Pages (Jul. 31, 1997).

Press Release, "Parkervision, Inc. Announces Private Placement of 990,000 Shares," Parkervision Marketing and Manufacturing Headquarters, 2 Pages (Sep. 8, 1997).

Press Release, "Wal-Mart Chooses Parkervision for Broadcast Production," Parkervision Marketing and Manufacturing Headquarters, 2 Pages (Oct. 24, 1997).

Press Release, "Parkervision, Inc. Announces Third Quarter Financial Results," Parkervision Marketing and Manufacturing Headquarters, 3 Pages (Oct. 30, 1997).

Press Release, "ParkerVision Announces Breakthrough in Wireless Radio Frequency Technology," Parkervision Marketing and Manufacturing Headquarters, 3 Pages (Dec. 10, 1997).

Press Release, "Parkervision, Inc. Announces the Appointment of Joseph F. Skovron to the Position of Vice President, Licensing—Wireless Technologies," Parkervision Marketing and Manufacturing Headquarters, 2 Pages (Jan. 9, 1998).
Press Release, "Parkervision Announces Existing Agreement with IBM Terminates—Company Continues with Strategic Focus Announced in December," Parkervision Marketing and Manufacturing Headquarters, 2 Pages (Jan. 27, 1998).
Press Release, "Laboratory Tests Verify Parkervision Wireless Technology," Parkervision Marketing and Manufacturing Headquarters, 2 Pages (Mar. 3, 1998).
Press Release, "Parkervision, Inc. Announces Fourth Quarter and Year End Financial Results," Parkervision Marketing and Manufacturing Headquarters, 3 Pages (Mar. 5, 1998).
Press Release, "Parkervision Awarded Editors' Pick of Show for NAB 98," Parkervision Marketing and Manufacturing Headquarters, 2 Pages (Apr. 15, 1998).
Press Release, "Parkervision Announces First Quarter Financial Results," Parkervision Marketing and Manufacturing Headquarters, 3 Pages (May 4, 1998).
Press Release, "Parkervision 'DIRECT2DATA' Introduced in Response to Market Demand," Parkervision Marketing and Manufacturing Headquarters, 3 Pages (Jul. 9, 1998).
Press Release, "Parkervision Expands Senior Management Team," Parkervision Marketing and Manufacturing Headquarters, 2 Pages (Jul. 29, 1998).
Press Release, "Parkervision Announces Second Quarter and Six Month Financial Results," Parkervision Marketing and Manufacturing Headquarters, 4 Pages (Jul. 30, 1998).
Press Release, "Parkervision Announces Third Quarter and Nine Month Financial Results," Parkervision Marketing and Manufacturing Headquarters, 3 Pages (Oct. 30, 1998).
Press Release, "Questar Infocomm, Inc. Invests $5 Million in Parkervision Common Stock," Parkervision Marketing and Manufacturing Headquarters, 3 Pages (Dec. 2, 1998).
Press Release, "Parkervision Adds Two New Directors," Parkervision Marketing and Manufacturing Headquarters, 2 Pages (Mar. 5, 1999).
Press Release, "Parkervision Announces Fourth Quarter and Year End Financial Results," Parkervision Marketing and Manufacturing Headquarters, 3 Pages (Mar. 5, 1999).
Press Release, "Joint Marketing Agreement Offers New Automated Production Solution," Parkervision Marketing and Manufacturing Headquarters, 2 Pages (Apr. 13, 1999).
"Project COST 205: Scintillations in Earth-satellite links," *Alta Frequenza: Scientific Review in Electronics*, AEI, vol. LIV, No. 3, pp. 209-211 (May-Jun. 1985).
Razavi, B., *RF Microelectronics*, Prentice-Hall, pp. 147-149 (1998).
Reeves, R.J.D., "The Recording and Collocation of Waveforms (Part 1)," *Electronic Engineering*, Morgan Brothers Limited, vol. 31, No. 373, pp. 130-137 (Mar. 1959).
Reeves, R.J.D., "The Recording and Collocation of Waveforms (Part 2)," *Electronic Engineering*, Morgan Brothers Limited, vol. 31, No. 374, pp. 204-212 (Apr. 1959).
Rein, H.M. and Zahn, M., "Subnanosecond-Pulse Generator with Variable Pulsewidth Using Avalanche Transistors," *Electronics Letters*, IEE, vol. 11, No. 1, pp. 21-23 (Jan. 9, 1975).
Riad, S.M. and Nahman, N.S., "Modeling of the Feed-through Wideband (DC to 12.4 Ghz) Sampling-Head," *IEEE MTT-S International Microwave Symposium Digest*, IEEE, pp. 267-269 (Jun. 27-29, 1978).
Rizzoli, V. et al., "Computer-Aided Noise Analysis of MESFET and HEMT Mixers," *IEEE Transactions on Microwave Theory and Techniques*, IEEE, vol. 37, No. 9, pp. 1401-1410 (Sep. 1989).
Rowe, H.E., *Signals and Noise in Communication Systems*, D. Van Nostrand Company, Inc., Princeton, New Jersey, including, for example, Chapter V, Pulse Modulation Systems (1965).
Rücker, F. and Dintelmann, F., "Effect of Antenna Size on OTS Signal Scintillations and Their Seasonal Dependence," *Electronic Letters*, IEE, vol. 19, No. 24, pp. 1032-1034 (Nov. 24, 1983).
Russell, R. and Hoare, L., "Millimeter Wave Phase Locked Oscillators," *Military Microwaves '78 Conference Proceedings*, Microwave Exhibitions and Publishers, pp. 238-242 (Oct. 25-27, 1978).
Sabel, L.P., "A DSP Implementation of a Robust Flexible Receiver/Demultiplexer for Broadcast Data Satellite Communications," *The Institution of Engineers Australia Communications Conference*, Institution of Engineers, Australia, pp. 218-223 (Oct. 16-18, 1990).
Salous, S., "IF digital generation of FMCW waveforms for wideband channel characterization," *IEE Proceedings-I*, IEE, vol. 139, No. 3, pp. 281-288 (Jun. 1992).
"Sampling Loops Lock Sources to 23 Ghz," *Microwaves & RF*, Penton Publishing, p. 212 (Sep. 1990).
Sasikumar, M. et al., "Active Compensation in the Switches-Capacitor Biquad," *Proceedings of the IEEE*, IEEE, vol. 71, No. 8, pp. 1008-1009 (Aug. 1983).
Saul, P.H., "A GaAs MESFET Sample and Hold Switch," *Fifth European Solid State Circuits Conference-ESSCIRC 79*, IEE, pp. 5-7 (1979).
Shen, D.H. et al., "A 900-MHZ RF Front-End with Integrated Discrete-Time Filtering," *IEEE Journal of Solid-State Circuits*, IEEE Solid-State Circuits Council, vol. 31, No. 12, pp. 1945-1954 (Dec. 1996).
Shen, X.D. and Vilar, E., "Anomalous transhorizon propagation and meteorological processes of a multilink path," *Radio Science*, American Geophysical Union, vol. 30, No. 5, pp. 1467-1479 (Sep.-Oct. 1995).
Shen, X. and Tawfik, A.N., "Dynamic Behaviour of Radio Channels Due to Trans-Horizon Propagation Mechanisms," *Electronics Letters*, IEE, vol. 29, No. 17, pp. 1582-1583 (Aug. 19, 1993).
Shen, X. et al., "Modeling Enhanced Spherical Diffraction and Troposcattering on a Transhorizon Path with aid of the parabolic Equation and Ray Tracing Methods," *IEE Colloquium on Common modeling techniques for electromagnetic wave and acoustic wave propagation*, IEE, pp. 4/1-4/7 (Mar. 8, 1996).
Shen, X. and Vilar, E., "Path loss statistics and mechanisms of transhorizon propagation over a sea path," *Electronics Letters*, IEE, vol. 32, No. 3, pp. 259-261 (Feb. 1, 1996).
Shen, D. et al., "A 900 MHZ Integrated Discrete-Time Filtering RF Front-End," *IEEE International Solid State Circuits Conference*, IEEE, vol. 39, pp. 54-55 and 417 (Feb. 1996).
Spillard, C. et al., "X-Band Tropospheric Transhorizon Propagation Under Differing Meteorological Conditions," *Sixth International Conference on Antennas and Propagation (ICAP 89) Part 2: Propagation*, IEE, pp. 451-455 (Apr. 4-7, 1989).
Stafford, K.R. et al., "A Complete Monolithic Sample/Hold Amplifier," *IEEE Journal of Solid-State Circuits*, IEEE, vol. SC-9, No. 6, pp. 381-387 (Dec. 1974).
Staruk, W. Jr. et al., "Pushing HF Data Rates," *Defense Electronics*, EW Communications, vol. 17, No. 5, pp. 211, 213, 215, 217, 220 and 222 (May 1985).
Stephenson, A.G., "Digitizing multiple RF signals requires an optimum sampling rate," *Electronics*, McGraw-Hill, pp. 106-110 (Mar. 27, 1972).
Sugarman, R., "Sampling Oscilloscope for Statistically Varying Pulses," *The Review of Scientific Instruments*, American Institute of Physics, vol. 28, No. 11, pp. 933-938 (Nov. 1957).
Sylvain, M., "Experimental probing of multipath microwave channels," *Radio Science*, American Geophysical Union, vol. 24, No. 2, pp. 160-178 (Mar.-Apr. 1989).
Takano, T., "NOVEL GaAs Pet Phase Detector Operable To Ka Band," *IEEE MT-S Digest*, IEEE, pp. 381-383 (1984).
Tan, M.A., "Biquadratic Transconductance Switched-Capacitor Filters," *IEEE Transactions on Circuits and Systems- I: Fundamental Theory and Applications*, IEEE Circuits and Systems Society, vol. 40, No. 4, pp. 272-275 (Apr. 1993).
Tanaka, K. et al., "Single Chip Multisystem AM Stereo Decoder IC," *IEEE Transactions on Consumer Electronics*, IEEE Consumer Electronics Society, vol. CE-32, No. 3, pp. 482-496 (Aug. 1986).
Tawfik, A.N., "Amplitude, Duration and Predictability of Long Hop Trans-Horizon X-band Signals Over the Sea," *Electronics Letters*, IEE, vol. 28, No. 6, pp. 571-572 (Mar. 12, 1992).
Tawfik, A.N. and Vilar, E., "Correlation of Transhorizon Signal Level Strength with Localized Surface Meteorological Parameters," *Eighth International Conference on Antennas and Propagation*, Electronics Division of the IEE, pp. 335-339 (Mar. 30-Apr. 2, 1993).

Tawfik, A.N. and Vilar, E., "Dynamic Structure of a Transhorizon Signal at X-band Over a Sea Path," *Sixth International Conference on Antennas and Propagation (ICAP 89) Part 2: Propagation*, IEE, pp. 446-450 (Apr. 4-7, 1989).

Tawfik, A.N. and Vilar, E., "Statistics of Duration and Intensity of Path Loss in a Microwave Transhorizon Sea-Path," *Electronics Letters*, IEE, vol. 26, No. 7, pp. 474-476 (Mar. 29, 1990).

Tawfik, A.N. and Vilar, E., "X-Band Transhorizon Measurements of CW Transmissions Over the Sea- Part 1:Path Loss, Duration of Events, and Their Modeling," *IEEE Transactions on Antennas and Propagation*, IEEE Antennas and Propagation Society, vol. 41, No. 11, pp. 1491-1500 (Nov. 1993).

Temes, G.C. and Tsividis, T., "The Special Section on Switched-Capacitor Circuits," *Proceedings of the IEEE*, IEEE, vol. 71, No. 8, pp. 915-916 (Aug. 1983).

Thomas, G.B., *Calculus and Analytic Geometry*, Third Edition, Addison-Wesley Publishing, pp. 119-133 (1960).

Tomassetti, Q., "An Unusual Microwave Mixer," *16th European Microwave Conference*, Microwave Exhibitions and Publishers, pp. 754-759 (Sep. 8-12, 1986).

Tortoli, P. et al., "Bidirectional Doppler Signal Analysis Based on a Single RF Sampling Channel," *IEEE Transactions on Ultrasonics, Ferroelectrics, and Frequency Control*, IEEE Ultrasonics, Ferroelectrics, and Frequency Control Society, vol. 41, No. 1, pp. 1-3 (Jan. 1984).

Tsividis, Y. and Antognetti, P. (Ed.), *Design of MOS VLSI Circuits for Telecommunications*, Prentice-Hall, p. 304 (1985).

Tsividis, Y., "Principles of Operation and Analysis of Switched-Capacitor Circuits," *Proceedings of the IEEE*, IEEE, vol. 71, No. 8, pp. 926-940 (Aug. 1983).

Tsurumi, H. and Maeda, T., "Design Study on a Direct Conversion Receiver Front-End for 280 MHZ, 900 MHZ, and 2.6 Ghz Band Radio Communication Systems," *41st IEEE Vehicular Technology Conference*, IEEE Vehicular Technology Society, pp. 457-462 (May 19-22, 1991).

Valdmanis, J.A. et al., "Picosecond and Subpicosend Optoelectronics for Measurements of Future High Speed Electronic Devices," *IEDM Technical Digest*, IEEE, pp. 597-600 (Dec. 5-7, 1983).

van de Kamp, M.M.J.L., "Asymmetric signal level distribution due to tropospheric scintillation," *Electronics Letters*, IEE, vol. 34, No. 11, pp. 1145-1146 (May 28, 1998).

Vasseur, H. and Vanhoenacker, D., "Characterization of tropospheric turbulent layers from radiosonde data," *Electronic Letters*, IEE, vol. 34, No. 4, pp. 318-319 (Feb. 19, 1998).

Verdone, R., "Outage Probability Analysis for Short-Range Communication Systems at 60 Ghz in ATT Urban Enrivonments," *IEEE Transactions on Vehicular Technology*, IEEE Vehicular Technology Society, vol. 46, No. 4, pp. 1027-1039 (Nov. 1997).

Vierira-Ribeiro, S.A., *Single-IF DECT Receiver Architecture using a Quadrature Sub-Sampling Band-Pass Sigma-Delta Modulator*, Thesis for Degree of Master's of Engineering, Carleton University, UMI Dissertation Services, pp. 1-180 (Apr. 1995).

Vilar, E. et al., "A Comprehensive/Selective MM-Wave Satellite Downlink Experiment on Fade Dynamics," *Tenth International Conference on Antennas and Propagation*, Electronics Division of the IEE, pp. 2.98-2.101 (Apr. 14-17, 1997).

Vilar, E. et al., "A System to Measure LOS Atmospheric Transmittance at 19 Ghz," *AGARD Conference Proceedings No. 346: Characteristics of the Lower Atmosphere Influencing Radio Wave Propagation*, AGARD, pp. 8-1-8-16 (Oct. 4-7, 1983).

Vilar, E. and Smith, H., "A Theoretical and Experimental Study of Angular Scintillations in Earth Space Paths," *IEEE Transactions on Antennas and Propagation*, IEEE, vol. AP-34, No.1, pp. 2-10 (Jan. 1986).

Vilar, E. et al., "A Wide Band Transhorizon Experiment at 11.6 Ghz," *Eighth International Conference on Antennas and Propagation*, Electronics Division of the IEE, pp. 441-445 (Mar. 30-Apr. 2, 1993).

Vilar, E. and Matthews, P.A., "Amplitude Dependence of Frequency in Oscillators," *Electronics Letters*, IEE, vol. 8, No. 20, pp. 509-511 (Oct. 5, 1972).

Vilar, E. et al., "An experimental mm-wave receiver system for measuring phase noise due to atmospheric turbulence," *Proceedings of the 25th European Microwave Conference*, Nexus House, pp. 114-119 (1995).

Vilar, E. and Burgueño, A., "Analysis and Modeling of Time Intervals Between Rain Rate Exceedances in the Context of Fade Dynamics," *IEEE Transactions on Communications*, IEEE Communications Society, vol. 39, No. 9, pp. 1306-1312 (Sep. 1991).

Vilar, E. et al., "Angle of Arrival Fluctuations in High and Low Elevation Earth Space Paths," *Fourth International Conference on Antennas and Propagation (ICAP 85)*, Electronics Division of the IEE, pp. 83-88 (Apr. 16-19, 1985).

Vilar, E., "Antennas and Propagation: A Telecommunications Systems Subject," *Electronics Division Colloquium on Teaching Antennas and Propagation to Undergraduates*, IEE, pp. 7/1-7/6 (Mar. 8, 1988).

Vilar, E. et al., "CERS". Millimetre-Wave Beacon Package and Related Payload Doppler Correction Strategies, *Electronics Division Colloquium on CERS- Communications Engineering Research Satellite*, IEE, pp. 10/1-10/10 (Apr. 10, 1984).

Vilar, E. and Moulsley, T.J., "Comment and Reply: Probability Density Function of Amplitude Scintillations," *Electronics Letters*, IEE, vol. 21, No. 14, pp. 620-622 (Jul. 4, 1985).

Vilar, E. et al., "Comparison of Rainfall Rate Duration Distributions for ILE-IFE and Barcelona," *Electronics Letters*, IEE, vol. 28, No. 20, pp. 1922-1924 (Sep. 24, 1992).

Vilar, E., "Depolarization and Field Transmittances in Indoor Communications," *Electronics Letters*, IEE, vol. 27, No. 9, pp. 732-733 (Apr. 25, 1991).

Vilar, E. and Larsen, J.R., "Elevation Dependence of Amplitude Scintillations on Low Elevation Earth Space Paths," *Sixth International Conference on Antennas and Propagation (ICAP 89) Part 2: Propagation*, IEE, pp. 150-154 (Apr. 4-7, 1989).

Vilar, E. et al., "Experimental System and Measurements of Transhorizon Signal Levels at 11 Ghz," *18th European Microwave Conference*, Microwave Exhibitions and Publishers Ltd., pp. 429-435 (Sep. 12-15, 1988).

Vilar, E. and Matthews, P.A., "Importance of Amplitude Scintillations in Millimetric Radio Links," *Proceedings of the 4th European Microwave Conference*, Microwave Exhibitions and Publishers, pp. 202-206 (Sep. 10-13, 1974).

Vilar, E. and Haddon, J., "Measurement and Modeling of Scintillation Intensity to Estimate Turbulence Parameters in an Earth-Space Path," *IEEE Transactions on Antennas and Propagation*, IEEE Antennas and Propagation Society, vol. AP-32, No. 4, pp. 340-346 (Apr. 1984).

Vilar, E. and Matthews, P.A., "Measurement of Phase Fluctuations on Millimetric Radiowave Propagation," *Electronics Letters*, IEE, vol. 7, No. 18, pp. 566-568 (Sep. 9, 1971).

Vilar, E. and Wan, K.W., "Narrow and Wide Band Estimates of Field Strength for Indoor Communications in the Millimetre Band," *Electronics Division Colloquium on Radiocommunications in the Range 30-60 Ghz*, IEE, pp. 5/1-5/8 (Jan. 17, 1991).

Vilar, E. and Faulkner, N.D., "Phase Noise and Frequency Stability Measurements, Numerical Technicals and Limitations," *Electronics Division Colloquium on Low Noise Oscillators and Synthesizer*, IEE, 5 pages (Jan. 23, 1986).

Vilar, E. and Senin, S., "Propagation phase noise identified using 40 Ghz satellite downlink," *Electronics Letters*, IEE, vol. 33, No. 22, pp. 1901-1902 (Oct. 23, 1997).

Vilar, E. et al., "Scattering and Extinction: Dependence Upon Raindrop Size Distribution in Temperate (Barcelona) and Tropical (Belem) Regions," *Tenth International Conference on Antennas and Propagation*, Electronics Division of the IEE, pp. 2.230-2.233 (Apr. 14-17, 1997).

Vilar, E. and Haddon, J., "Scintillation Modeling and Measurement—A Tool for Remote-Sensing Slant Paths," *AGARD Conference Proceedings No. 332: Propagation Aspects of Frequency Sharing, Interference And System Diversity*, AGARD, pp. 27-1-27-13 (Oct. 18-22, 1982).

Vilar, E., "Some Limitations on Digital Transmission Through Turbulent Atmosphere," *International Conference on Satellite Communication Systems Technology*, Electronics Division of the IEE, pp. 169-187 (Apr. 7-10, 1975).

Vilar, E. and Matthews, P.A., "Summary of Scintillation Observations in a 36 Ghz Link Across London," *International Conference on Antennas and Propagation Part 2: Propagation*, IEE, pp. 36-40 (Nov. 28-30, 1978).

Vilar, E. et al., "Wideband Characterization of Scattering Channels," *Tenth International Conference on Antennas and Propagation*, Electronics Division of the IEE, pp. 2.353-2.358 (Apr. 14-17, 1997).

Vollmer, A., "Complete GPS Receiver Fits on Two Chips," *Electronic Design*, Penton Publishing, pp. 50, 52, 54 and 56 (Jul. 6, 1998).

*Voltage and Time Resolution in Digitizing Oscilloscopes: Application Note 348*, Hewlett Packard, pp. 1-11 (Nov. 1986).

Wan, K.W. et al., "A Novel Approach to the Simultaneous Measurement of Phase and Amplitude Noises in Oscillator," *Proceedings of the 19th European Microwave Conference*, Microwave Exhibitions and Publishers Ltd., pp. 809-913 (Sep. 4-7, 1989).

Wan, K.W. et al., "Extended Variances and Autoregressive/Moving Average Algorithm for the Measurement and Synthesis of Oscillator Phase Noise," *Proceedings Of the 43rd Annual Symposium on Frequency Control*, IEEE, pp. 331-335 (1989).

Wan, K.W. et al., "Wideband Transhorizon Channel Sounder at 11 Ghz," *Electronics Division Colloquium on High Bit Rate UHF/SHF Channel Sounders—Technology and Measurement*, IEE, pp. 3/1-3/5 (Dec. 3, 1993).

Wang, H., "A 1-V Multigigahertz RF Mixer Core in 0.5—μm CMOS," *IEEE Journal of Solid-State Circuits*, IEEE Solid-State Circuits Society, vol. 33, No. 12, pp. 2265-2267 (Dec. 1998).

Watson, A.W.D. et al., "Digital Conversion and Signal Processing for High Performance Communications Receivers," *Digital Processing of Signals in Communications*, Institution of Electronic and Radio Engineers, pp. 367-373 (Apr. 22-26, 1985).

Weast, R.C. et al. (Ed.), *Handbook of Mathematical Tables*, Second Edition, The Chemical Rubber Co., pp. 480-485 (1964).

Wiley, R.G., "Approximate FM Demodulation Using Zero Crossings," *IEEE Transactions on Communications*, IEEE, vol. COM-29, No. 7, pp. 1061-1065 (Jul. 1981).

Worthman, W., "Convergence . . . Again," *RF Design*, Primedia, p. 102 (Mar. 1999).

Young, I.A. and Hodges, D.A., "MOS Switched-Capacitor Analog Sampled-Data Direct-Form Recursive Filters," *IEEE Journal of Solid-State Circuits*, IEEE, vol. SC-14, No. 6, pp. 1020-1033 (Dec. 1979).

Translation of Specification and Claims of FR Patent No. 2245130, 3 pages (Apr. 18, 1975- Date of publication of application).

Fest, Jean-Pierre, "Le Convertisseur A/N Revolutionne Le Recepteur Radio," *Electronique*, JMJ (Publisher), No. 54, pp. 40-42 (Dec. 1995).

Translation of DE Patent No. 35 41 031 A1, 22 pages (May 22, 1986- Date of publication of application).

Translation of EP Patent No. 0 732 803 A1, 9 pages (Sep. 18, 1996- Date of publication of application).

Fest, Jean-Pierre, "The A/D Converter Revolutionizes the Radio Receiver," *Electronique*, JMJ (Publisher), No. 54, 3 pages (Dec. 1995). (Translation of Doc. AQ50).

Translation of German Patent No. DE 197 35 798 C1, 8 pages (Jul. 16, 1998- Date of publication of application).

Miki, S. and Nagahama, R., *Modulation System II*, Common Edition 7, Kyoritsu Publishing Co., Ltd., pp. 146-154 (Apr. 30, 1956).

Miki, S. and Nagahama, R., *Modulation System II*, Common Edition 7, Kyoritsu Publishing Co., Ltd., pp. 146-149 (Apr. 30, 1956). (Partial Translation of Doc. AQ51).

Rabiner, L.R. and Gold, B., *Theory And Application Of Digital Signal Processing*, Prentice-Hall, Inc., pp. v-xii and 40-46 (1975).

English-language Abstract of Japanese Patent Publication No. 08-032556, from http://www1.ipdl.jpo.go.jp, 2 Pages (Feb. 2, 1996—Date of publication of application).

English-language Abstract of Japanese Patent Publication No. 08-139524, from http://www1.ipdl.jpo.go.jp, 2 Pages (May 31, 1996—Date of publication of application).

English-language Abstract of Japanese Patent Publication No. 59-144249, from http://www1.ipdl.jpo.go.jp, 2 Pages (Aug. 18, 1984—Date of publication of application).

English-language Abstract of Japanese Patent Publication No. 63-054002, from http://www1.ipdl.jpo.go.jp, 2 Pages (Mar. 8, 1988—Date of publication of application).

English-language Abstract of Japanese Patent Publication No. 06-237276, from http://www1.ipdl.jpo.go.jp, 2 Pages (Aug. 23, 1994—Date of publication of application).

English-language Abstract of Japanese Patent Publication No. 08-023359, from http://www1.ipdl.jpo.go.jp, 2 Pages (Jan. 23, 1996—Date of publication of application).

Translation of Japanese Patent Publication No. 47-2314, 7 pages (Feb. 4, 1972- Date of publication of application).

Partial Translation of Japanese Patent Publication No. 58-7903, 3 pages (Jan. 17, 1983- Date of publication of application).

English-language Abstract of Japanese Patent Publication No. 58-133004, from http://www1.ipdl.jpo.go.jp, 2 Pages (Aug. 8, 1993—Date of publication of application).

English-language Abstract of Japanese Patent Publication No. 60-058705, from http://www1.ipdl.jpo.go.jp, 2 Pages (Apr. 4, 1985—Date of publication of application).

English-language Abstract of Japanese Patent Publication No. 04-123614, from http://www1.ipdl.jpo.go.jp, 2 Pages (Apr. 23, 1992—Date of publication of application).

English-language Abstract of Japanese Patent Publication No. 04-127601, from http://www1.ipdl.jpo.go.jp, 2 Pages (Apr. 28, 1992—Date of publication of application).

English-language Abstract of Japanese Patent Publication No. 05-175730, from http://www1.ipdl.jpo.go.jp, 2 Pages (Jul. 13, 1993—Date of publication of application).

English-language Abstract of Japanese Patent Publication No. 05-175734, from http://www1.ipdl.jpo.go.jp, 2 Pages (Jul. 13, 1993—Date of publication of application).

English-language Abstract of Japanese Patent Publication No. 07-154344, from http://www1.ipdl.jpo.go.jp, 2 Pages (Jun. 16, 1995—Date of publication of application).

English-language Abstract of Japanese Patent Publication No. 07-307620, from http://www1.ipdl.jpo.go.jp, 2 Pages (Nov. 21, 1995—Date of publication of application).

Oppenheim, A.V. and Schafer, R.W., *Digital Signal Processing*, Prentice-Hall, pp. vii-x, 6-35, 45-78, 87-121 and 136-165 (1975).

English-language Abstract of Japanese Patent Publication No. 55-066057, from http://www1.ipdl.jpo.go.jp, 2 Pages (May 19, 1980—Date of publication of application).

English-language Abstract of Japanese Patent Publication No. 63-065587, from http://www1.ipdl.jpo.go.jp, 2 Pages (Mar. 24, 1988—Date of publication of application).

English-language Abstract of Japanese Patent Publication No. 63-153691, from http://www1.ipdl.jpo.go.jp, 2 Pages (Jun. 27, 1988—Date of publication of application).

Translation of Japanese Patent Publication No. 60-130203, 3 pages (Jul. 11, 1985- Date of publication of application).

Razavi, B., "A 900-MHz/1.8-Ghz CMOS Transmitter for Dual-Band Applications," *Symposium on VLSI Circuits Digest of Technical Papers*, IEEE, pp. 128-131 (1998).

Ritter, G.M., "SDA, A New Solution for Transceivers," *16th European Microwave Conference*, Microwave Exhibitions and Publishers, pp. 729-733 (Sep. 8, 1986).

DIALOG File 351 (Derwent WPI) English Language Patent Abstract for FR 2 669 787, 1 page (May 29, 1992- Date of publication of application).

Akos, D.M. et al., "Direct Bandpass Sampling of Multiple Distinct RF Signals," *IEEE Transactions on Communications*, IEEE, vol. 47, No. 7, pp. 983-988 (Jul. 1999).

Patel, M. et al., "Bandpass Sampling for Software Radio Receivers, and the Effect of Oversampling on Aperture Jitter," *VTC 2002*, IEEE, pp. 1901-1905 (2002).

English-language Abstract of Japanese Patent Publication No. 61-030821, from http://www1.ipdl.jpo.go.jp, 2 Pages (Feb. 13, 1986- Date of publication of application).

English-language Abstract of Japanese Patent Publication No. 05-327356, from http://www1.ipdl.jpo.go.jp, 2 Pages (Dec. 10, 1993—Date of publication of application).

Tayloe, D., "A Low-noise, High-performance Zero IF Quadrature Detector/Preamplifier," *RF Design*, Primedia Business Magazines & Media, Inc., pp. 58, 60, 62 and 69 (Mar. 2003).

Dines, J.A.B., "Smart Pixel Optoelectronic Receiver Based on a Charge Sensitive Amplifier Design," *IEEE Journal of Selected Topics in Quantum Electronics*, IEEE, vol. 2, No.1, pp. 117-120 (Apr. 1996).

Simoni, A. et al., "A Digital Camera for Machine Vision," *20th International Conference on Industrial Electronics, Control and Instrumentation*, IEEE, pp. 879-883 (Sep. 1994).

Stewart, R.W. and Pfann, E., "Oversampling and sigma-delta strategies for data conversion," *Electronics & Communication Engineering Journal*, IEEE, pp. 37-47 (Feb. 1998).

Rudell, J.C. et al., "A 1.9-Ghz Wide-Band IF Double Conversion CMOS Receiver for Cordless Telephone Applications," *IEEE Journal of Solid-State Circuits*, IEEE, vol. 32, No. 12, pp.2071-2088 (Dec. 1997).

English-language Abstract of Japanese Patent Publication No. 09-036664, from http://www1.ipdl.jpo.go.jp, 2 Pages (Feb. 7, 1997—Date of publication of application).

Simoni, A. et al., "A Single-Chip Optical Sensor with Analog Memory for Motion Detection," *IEEE Journal of Solid-State Circuits,* IEEE, vol. 30, No. 7, pp. 800-806 (Jul. 1995).

English Translation of German Patent Publication No. DE 196 48 915 A1, 10 pages.

English-language Computer Translation of Japanese Patent Publication No. JP 10-41860, provided by the JPO, 10 pages (Jun. 26, 1998 - Date of publication of application) and cited in U.S. Appl. No. 10/305,299, directed to related subject matter.

*What is I/Q Data?*, printed Sep. 16, 2006, from http://zone.ni.com, 8 pages (Copyright 2003).

English-language Abstract of Japanese Patent Publication No. JP 61-232706, data supplied by the espacenet, 1 page (Oct. 17, 1986 - Date of publication of application).

English-language Abstract of Japanese Patent Publication No. JP 9-171399, data supplied by the espacenet, 1 page (Jun. 30, 1997 - Date of publication of application).

English-language Abstract of Japanese Patent Publication No. JP 10-41860, data supplied by the espacenet, 1 page (Feb. 13, 1998 - Date of publication of application).

\* cited by examiner

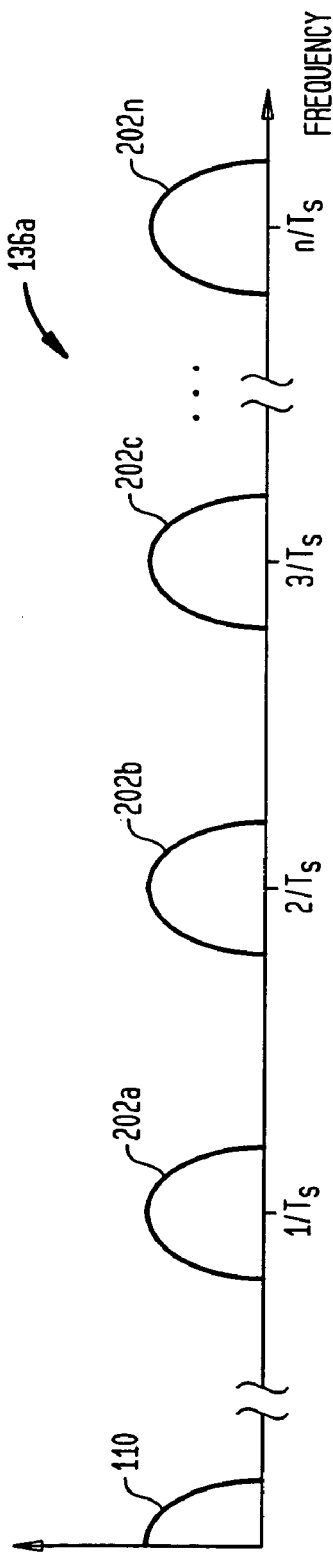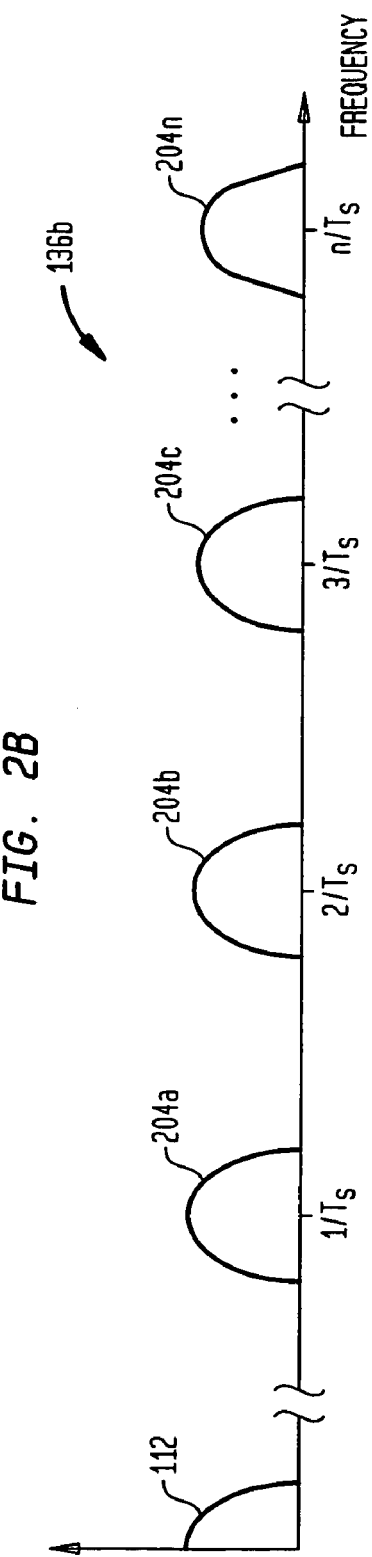

ACTIVE POLYPHASE INVERTER FILTER FOR QUADRATURE SIGNAL GENERATION

The present application claims the benefit of U.S. Provisional Patent Application No. 60/386,484, filed on Jun. 7, 2002, which is incorporated herein by reference in its entirety.

BACKGROUND OF THE INVENTION

1. Field of the Invention

The present invention generally relates to signal generation, and more specifically to quadrature signal generation using an active polyphase inverter filter.

2. Background Art

In electronic communications, it is often useful to send and receive information using two or more signals that have a quadrature relationship. For instance, one information signal is designated the in-phase signal (I), and the other information signal is designated the quadrature signal (Q), where the Q signal is 90 degrees out of phase with the I signal. More specifically, the Q signal is delayed (or advanced) relative to the I signal (in-time) by 90 degrees.

Quadrature amplitude modulation (QAM) and quadrature phase shift keying (QPSK) are two well known specific examples of quadrature modulation.

The advantage of the quadrature signal transmission is that the bandwidth of a transmission medium is effectively doubled. In other words, if a particular transmission medium has a bandwidth of B (Hz), then quadrature modulation permits 2B (Hz) of information to be effectively transmitted through the medium without signal interference. This occurs because the I and Q signals occupy the transmission medium simultaneously, but are phase shifted with respect to each. At the receiver, the I and Q information can be discerned from each other by sampling the I and Q signals at the proper time based on the known 90 degree phase delay. However, the I and Q sampling times must be properly timed. Any error in sampling time will cause signal distortion and/or interference between the I and Q channels.

What is needed is a circuit and method to generate control signals that have precise timing to control sampling of I and Q signals. Furthermore, the circuit that generates the control signals should be able to be integrated on an integrated circuit.

BRIEF SUMMARY OF THE INVENTION

The present invention is related to a quadrature signal generator that receives a differential input signal and generates quadrature output signals that are 90 degrees out-of-phase with each other. The quadrature signal generator is an open-loop architecture that utilizes active inverters for delay elements. The invention is also related to subcomponents and methods related to the same.

The quadrature signal generator includes a coarse stage and a plurality of refinement stages. The coarse stage receives a differential input signal and generates a plurality of quadrature signals that are substantially phase-shifted by 90 degrees with respect to each other, but which may have some phase errors. The refinement stages receive quadrature signals from the output of the coarse stage, and process the quadrature signals to reduce the phase error between the quadrature signals. Any number of refinement stages can be utilized. The greater the number of refinement stages, the more the phase error is reduced, but subject to a point of diminishing returns.

Each coarse stage includes a pair of 90/180 delay circuits that delay the differential signal, and generate quadrature output signals that may have some phase error.

Each refinement stage includes a plurality of 0/180 delay circuits that each receive a corresponding quadrature output signal from the coarse stage generator, and have a 0-degree output and a 180-degree output. The 0-degree output of a first 0/180 delay circuit is averaged with a 180 degree output of a second 0/180 delay circuit. Likewise, a 0-degree output of a third 0/180 delay circuit is averaged with a 180 degree output of a fourth 0/180 delay circuit. The averaging of the delay circuit outputs has the effect of reducing the phase error. Furthermore, the refinement stage also includes a plurality of 90/180 delay circuits having inputs coupled to corresponding 0-degree outputs of the 0/180 delay circuits. The 90-degree output of a first 90/180 delay circuit is averaged with a 180 degree output of a second 90/180 delay circuit. Likewise, the 90-degree output of a third 90/180 delay circuit is coupled to a 180 degree output of a fourth 90/180 delay circuit.

Each delay circuit 0/180 includes a first series of inverters and a second series of inverters, where the second series of inverters has an approximate total delay of 180 degrees relative to said first series of inverters. Each delay circuit 90/180 includes a third series of inverters and a fourth series of inverters, where the fourth series of inverters has a delay of 90 degrees relative to the third series of inverters.

An advantage of the quadrature generator described herein is that it is an open loop architecture that is not prone to oscillation because there is no feedback signal to cause an unwanted oscillation. Whereas, the conventional closed-loop architectures utilize at least one feedback signal that can result in unwanted signal oscillation. Furthermore, the delay circuits are implemented using active inverter circuits, which can be implemented in standard semiconductor processes, such as CMOS. CMOS inverters on a common substrate have similar semiconductor characteristics that are repeatable from inverter-to-inverter, which improves the phase accuracy of the quadrature output signals. Furthermore, CMOS inverters are more area efficient than passive capacitors and passive resistors. Therefore, the entire quadrature generator is more area efficient than a conventional phase generator, which increases overall chip-yield.

Further features and advantages of the invention, as well as the structure and operation of various embodiments of the invention, are described in detail below with reference to the accompanying drawings.

BRIEF DESCRIPTION OF THE DRAWINGS/FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 2A illustrates an exemplary frequency spectrum for an I harmonically rich signal.

FIG. 2B illustrates an exemplary frequency spectrum for a Q harmonically rich signal.

DETAILED DESCRIPTION OF THE INVENTION

1. Example Transmitter Application

Before describing the invention in detail, it is useful to describe an example transmitter environment for the invention. The polyphase filter invention is not limited to the transmitter environment that is described here, as the polyphase filter invention is applicable to other transmitter and non-transmitter applications as will be understood to those skilled in the relevant arts based on the discussions given herein.

Figure 1:
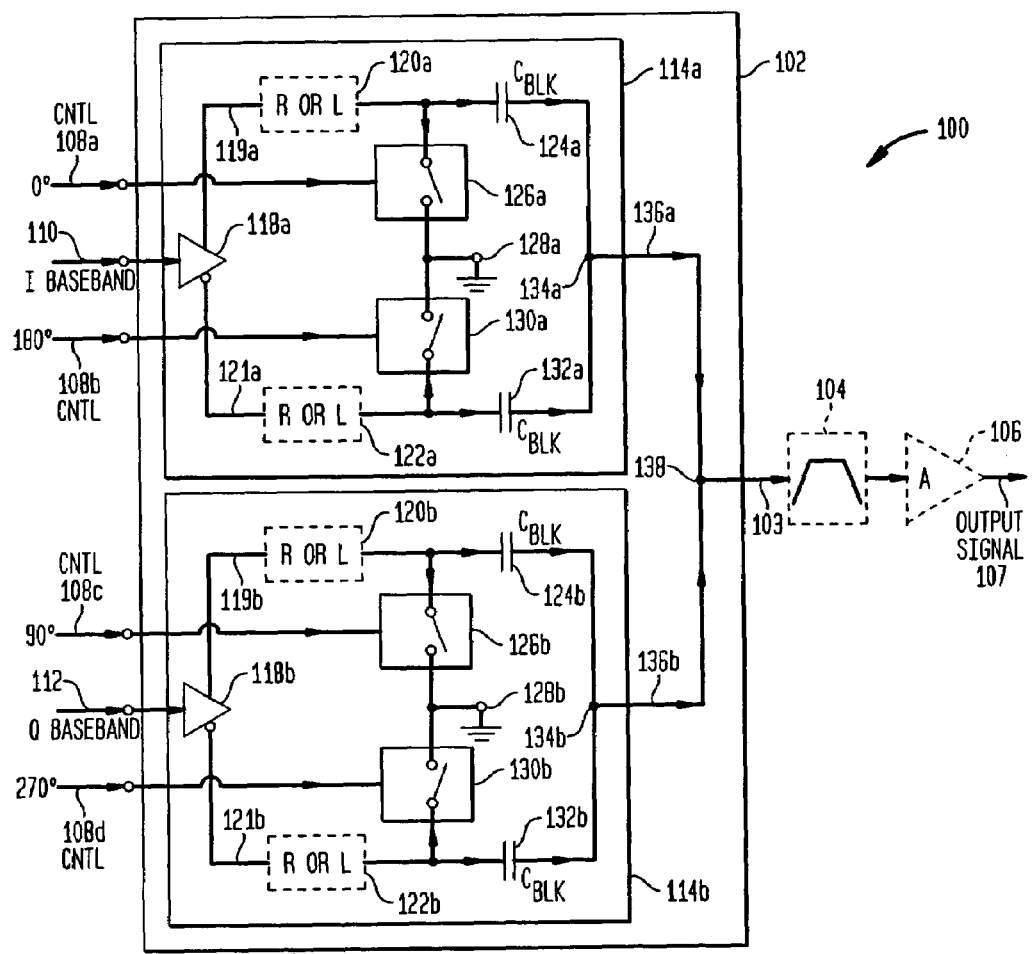
FIG. 1 illustrates an example IQ transmitter 100 configured to transmit complex IQ waveforms in a balanced manner using quadrature control signals.

FIG. 1 illustrates an IQ transmitter 100 that is useful for transmitting complex IQ waveforms and does so in a balanced manner to control DC offset and carrier insertion. The IQ transmitter 100 includes an IQ balanced modulator 102, an optional filter 104, and an optional amplifier 106. In doing so, the modulator 102 receives an I baseband signal 110 and a Q baseband signal 112 and up-converts these signals to generate a combined harmonically rich signal 103. The harmonically rich signal 103 includes multiple harmonics images, where each image contains the baseband information in the I signal 110 and the Q signal 112. The optional bandpass filter 104 may be included to select a harmonic of interest (or subset of harmonics) from the signal 103 for transmission. The optional amplifier 106 may be included to amplify the selected harmonic prior to transmission, to generate the IQ output signal 107.

As stated above, the balanced IQ modulator 102 up-converts the I baseband signal 110 and the Q baseband signal 112 in a balanced manner to generate the combined harmonically rich signal 103 that carries the I and Q baseband information. To do so, the modulator 102 utilizes two balanced modulators 114a and 114b that have a common output node 138. The balanced modulator 114a receives the I baseband signal 110 and shunts the baseband signal 110 to ground in a differential and balanced fashion to generate a harmonically rich signal 136a. The harmonically rich signal 136a includes multiple harmonic images, where each image contains the baseband information in the baseband signal 110. In other words, each harmonic image includes the necessary amplitude, frequency, and phase information to reconstruct the baseband signal 110. Similarly, the balanced modulator 114b receives the Q baseband signal 112 and shunts the baseband signal 112 to ground in a differential and balanced fashion to generate a harmonically rich signal 136b. The harmonically rich signal 136b includes multiple harmonic images, where each image contains the baseband information in the baseband signal 112. In other words, each harmonic image includes the necessary amplitude, frequency, and phase information to reconstruct the Q baseband signal 112. The harmonically rich signal 136a and the harmonically rich signal 136b are then combined at the node 138 to generate the harmonically rich signal 103.

Each balanced modulator 114 includes the following components: a buffer/inverter 118; optional impedances 120, 122; controlled switches 126 and 130; blocking capacitors 124 and 132; and a terminal 128 that is tied to ground. During operation of the modulator 114a, the buffer/inverter 118a receives the I baseband signal 110 and generates I signal 119 and inverted I signal 121. I signal 119 is substantially similar to the baseband signal 110, and the inverted I signal 121 is an inverted version of signal 110. As such, the buffer/inverter 118 converts the (single-ended) baseband signal 110 into differential signals 119 and 121. The controlled switch 126a shunts the I signal 119a to the terminal 128a according to the control signal 108a, and the controlled switch 130a shunts the inverted I signal 121a to ground according to the control signal 108b. The control signals 108a and 108b are pulse trains that are 180 degrees out-of-phase so that only one of the switches 126a or 130a is closed at any given time. The periodic sampling of the I signal 119 and the inverted I signal 121 generates the I harmonically rich signal 136a. As shown, the terminal 128a is tied to ground and ties together the switches 126a and 128a. This prevents any DC offset voltages from developing between the switches 126a and 130a, which can lead to undesired carrier insertion in the harmonically rich signal 136a.

In the modulator 114b, the buffer/inverter 118b receives the Q baseband signal 112 and generates Q signal 119b and inverted Q signal 121b. Q signal 119b is substantially similar to the Q baseband signal 112, and the inverted Q signal 121b is an inverted version of signal 110. As such, the buffer/inverter 118b converts the (single-ended) baseband signal 112 into differential signals 119b and 121b. The controlled switch 126b shunts the Q signal 119b to the ground terminal 128b according to the control signal 108c, and the controlled switch 130b shunts the inverted Q signal 121b to ground terminal 128b according to the control signal 108d. The control signals 108c and 108d are pulse trains that are 180 degrees out-of-phase so that only one of the switches 126b or 130b is closed at any given time. Furthermore, the control signals 108c and 108d are phase shifted by 90 relative to the control signals 108a and 108b. The periodic sampling of the Q signal 119b and the inverted Q signal 121b generates the Q harmonically rich signal 136b. The terminal 128b is tied to ground and prevents any DC offset voltages from developing between the switches 126b and 130b, which can lead to undesired carrier insertion in the harmonically rich signal 136b.

Figure 2C:
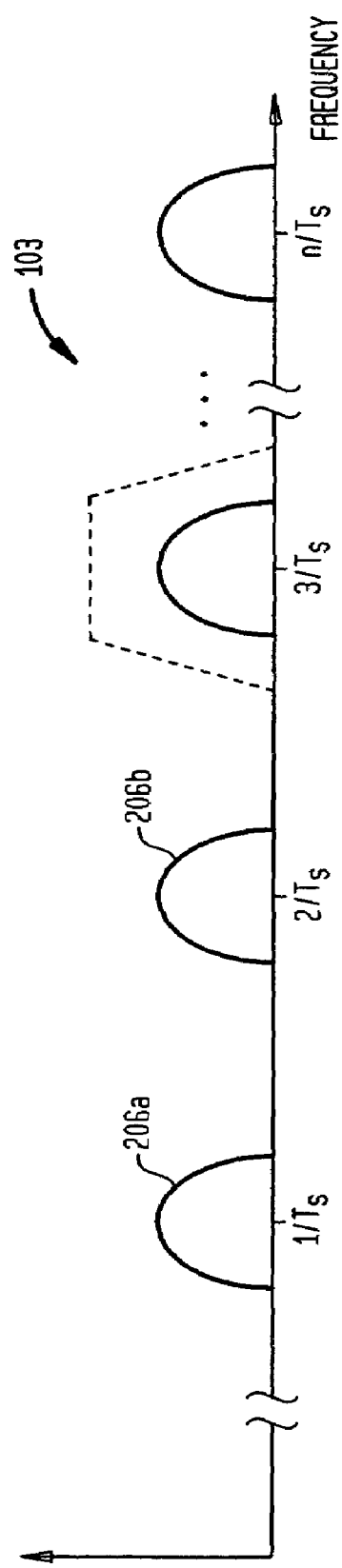
FIG. 2C illustrates an exemplary frequency spectrum for an IQ harmonically rich signal, where a single IQ harmonic is selected from a number of IQ harmonics.

FIG. 2A illustrates an exemplary frequency spectrum for the harmonically rich signal 136a having harmonic images 202a-n. The images 202 repeat at harmonics of the sampling frequency $1/T_s$, at infinitum, where each image 202 contains the necessary amplitude, frequency, and phase information to reconstruct the baseband signal 110. Similarly, FIG. 2B illustrates an exemplary frequency spectrum for the harmonically rich signal 136b having harmonic images 204a-n. Each image 204 contains the necessary amplitude, frequency, and phase information to reconstruct the Q baseband signal 112. FIG. 2C illustrates an exemplary frequency spectrum for the IQ harmonically rich signal 103 having images 206a-n. Each image 206 carries the I baseband information and the Q baseband information from the corresponding images 202 and 204, respectively, without substantially increasing the frequency bandwidth occupied by each image 206.

As stated above, the control signals 108a and 108b are phased by 180 degrees relative to each other. Likewise, the control signals 108c and 108d are phase-shifted by 180 degrees relative to each other, and are phase-shifted by 90 degrees relative to the control signals 108a and 108b, respectively. As a result the control signals 108a-d have a relative phase relationship of 0, 180, 90, and 270 degrees, respectively.

2. Quadrature Signal Generation

Figure 3:
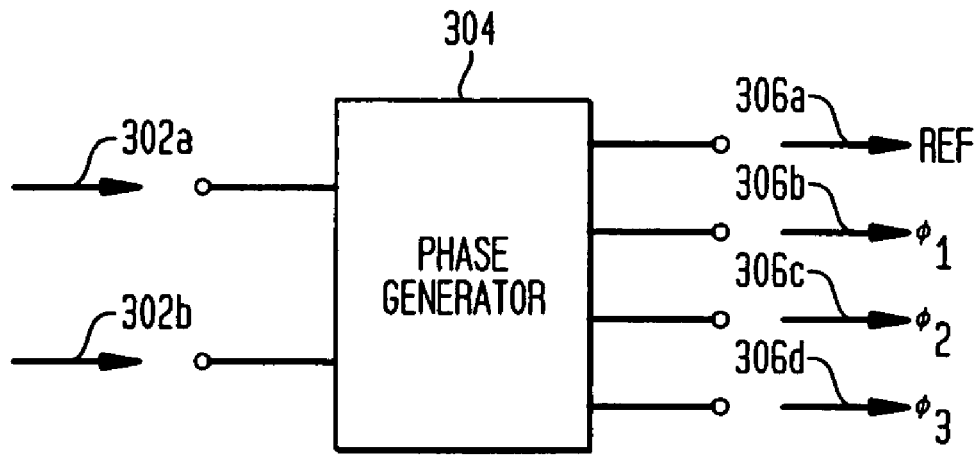
FIG. 3 illustrates the function of an exemplary generic phase generator.

FIG. 3 illustrates the function of a generalized phase generator 304. Phase generator 304 generates output signals 306a-d based on input signals 302a and 302b. The output signal 306a is arbitrarily chosen as a reference signal and the output signals 306b-306d are phase-shifted relative to signal 306a. In other words, the signal 306b is phase-shifted by ϕ1 degrees relative to signal 306a, the signal 306c is phase-shifted by ϕ2 degrees relative to signal 306a, and signal 306d is phase shifted by ϕ3 degrees relative to signal 306c. The phase shift angles ϕ are arbitrary in FIG. 3 and can be determined as desired.

Figure 4:
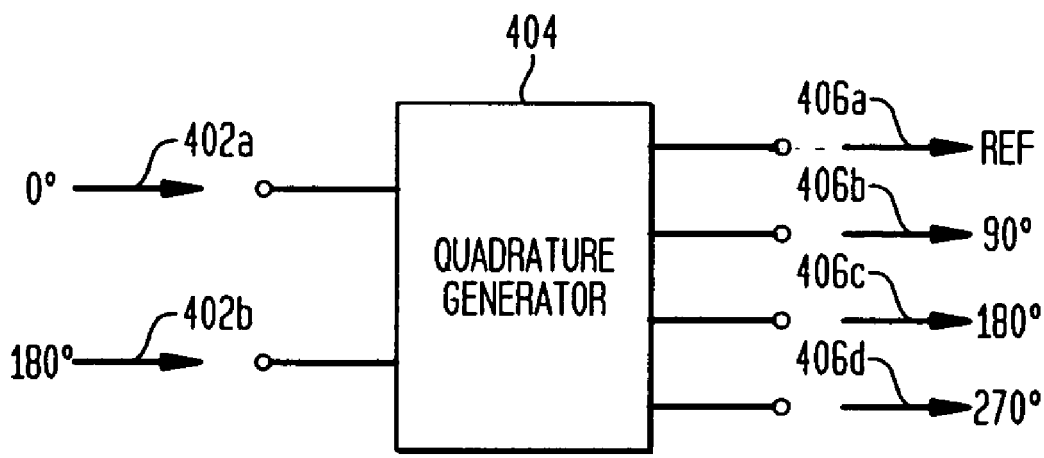
FIG. 4 illustrates the function of an exemplary quadrature phase generator.

FIG. 4 illustrates a quadrature generator 404 that generates signals 406a-d based on input signals 402a-b. Signal 406a is arbitrarily chosen as a reference signal and signals 406b-406d are phase shifted relative to signal 406a by increments of 90 degrees. In other words, signal 406b is phase-shifted by 90 relative to signal 406a. Signal 406c is phase-shifted by 180 degrees relative to signal 406a. Signal 406d is phase-shifted 270 degrees relative to signal 406a.

The invention is directed to the quasi phase generator 304 of FIG. 3, and the specific quadrature generator 404 of FIG. 4.

3. Conventional Quadrature Generator

Figure 5:
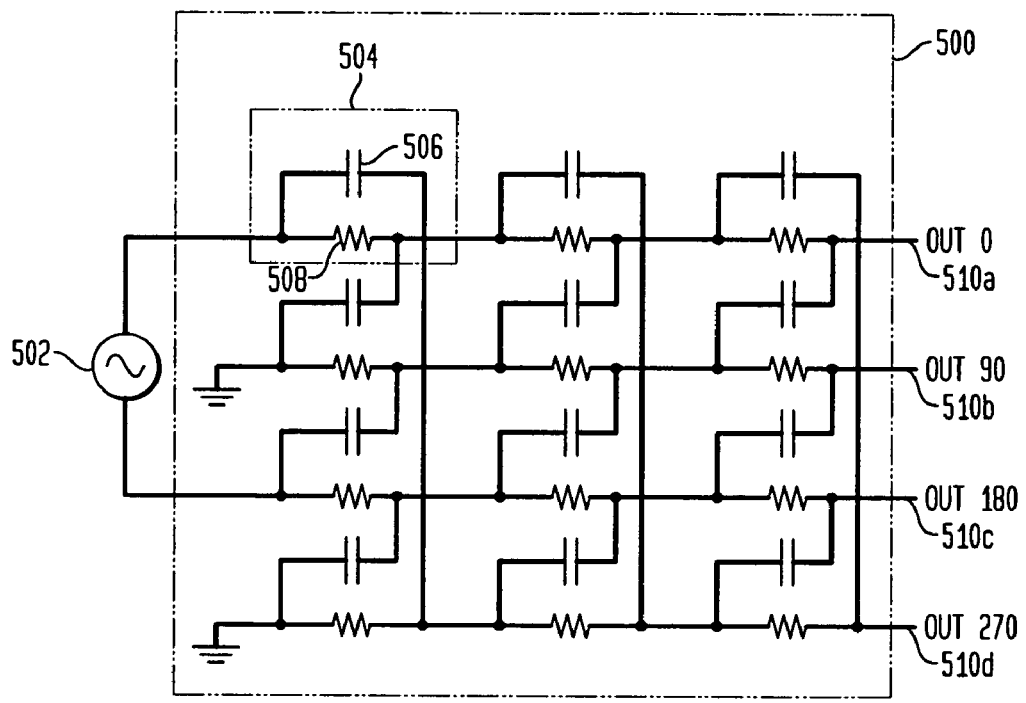
FIG. 5 illustrates a conventional polyphase filter configured using passive resistors and capacitors.

FIG. 5 illustrates a conventional quadarature generator 500 that is driven by a source 502. Quadrature generator 500 includes multiple parallel RC circuits 504, where each RC circuit 504 includes a capacitor 506 and a resistor 508. The quadrature generator 500 receives a sinusoidal signal from the source 502, and generates output signals 510a-d that have approximately a 90 degree phase relationship between the signals. In other words, the output signal 510b is phase shifted by 90 degrees relative to signal 510a, signal 510c is phase-shifted by 180 degrees relative to output signal 510a, and signal 510d is phase-shifted by 270 degrees relative to output signal 510a.

As illustrated, the quadrature generator 500 includes multiple capacitors 506. More specifically, the quadrature generator 500 includes 12 capacitors 506. Capacitors in integrated circuit occupy substrate area that is proportional to the amount of capacitance. Therefore, the 12 capacitors 506 occupy significant substrate area, which increases the size and of an individual IC and reduces overall yield.

4. Quadrature Generator According to the Present Invention

Figure 6:
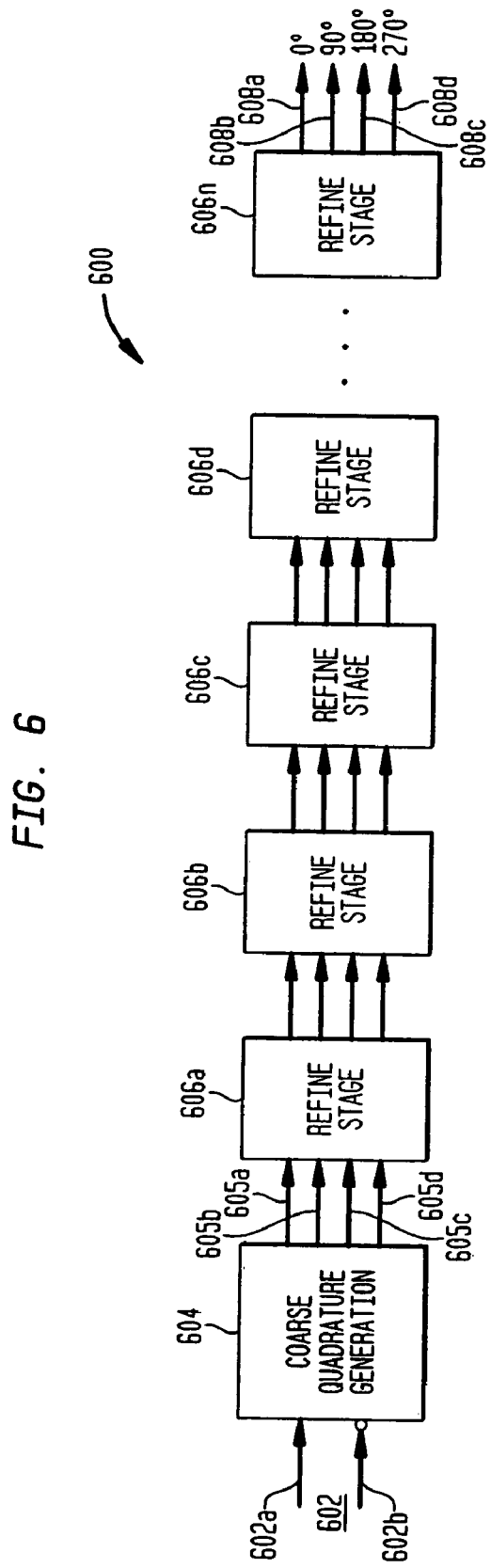
FIG. 6 illustrates a quadrature phase generator according to embodiments of the present invention.

FIG. 6 illustrates a quadrature generator 600 according to embodiments of the present invention. The quadrature generator 600 receives a differential signal 602 (having components 602a and 602b) and generates output signals 608a-d that have the desired 90 degree phase relationship between the output signals 406a-406d, with minimal phase error.

The quadrature generator 600 includes a coarse stage 604, and refinement stages 606a-n. The coarse stage 604 generates signals 605a-d that substantially have the desired quadratrure relationship, but which may not be in exact quadrature with each other. For instance, the signal 605b can be delayed relative to the signal 605a by 90 degrees +/− an error ($E_1$). Likewise, the signal 605c can be delayed relative to the signal 605a by 180 degrees +/− an error ($E_2$). Finally, the signal 605a can be delayed relative to the signal 605c by 270 degrees +/− an error ($E_3$). The mentioned phase errors can result from component and/or process variations, or can result from noise voltage, including thermal noise. The error signals $E_1$, $E_2$, and $E_3$ can be identical or they can be different from each other.

The refinement stages 606a receive the signals 605a-d and refine the quadrature relationship between the signals 605a-d so as to reduce the phase errors $E_1$, $E_2$, and $E_3$. There can be any number of refinement stages 606, and the quadrature accuracy increases with the number of stages 606, up to a point. As a result, the output signals 608a-d have a more accurate quadrature relationship between them. In one embodiment of the invention, the number of refinement stages 606 is chosen so that the quadrature accuracy is equal to or less than 1 degree between the output signals 608. In other words, the signal 608b is delayed relative to signal 608a by 90 degrees +/−1 degree, the signal 608c is delayed relative to the signal 608a by 180 degree +/−1 degree, and the signal 608d is delayed relative to the signal 608a by 270+/−1 degree.

Figure 11:
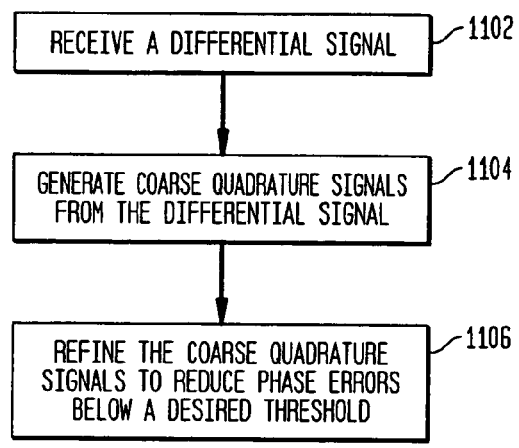
FIG. 11 illustrates a flowchart related to the quadrature generator according to embodiments of the present invention.

FIG. 11 illustrates a flowchart 1100 that further describes the operation of the quadrature generator 600, according to embodiments of the present invention.

Referring to flowchart 1100, in step 1102 a differential signal is received. For example, a differential signal 602 is received by the quadrature generator 600 having components 602a and 602b that are 180 degrees out-of-phase.

In step 1104, coarse quadrature signals are generated having an approximately 90 degree relationship relative to each and offset by some error. For example, the coarse stage 604 generates signals 605a-d that substantially have the desired quadratrure relationship, but have phase errors that offset the respective signals from perfect quadrature.

In step 1106, the coarse quadrature signals are refined to reduce the phase errors between the quadrature signals. For example, the output signals 605a-d are refined using the refinement stages 606 to reduce the phase error between the quadrature relationship. Step 1104 is repeated until the phase error is reduced below some desired threshold. For example, the refinement stages 606 can be added until the quadrature phase error falls below some threshold, for example +/−1 degree.

An advantage of the architecture for the quadrature generator 600 is that it is an open-loop architecture, which relies on component matching to achieve low phase error between signals. An open loop architecture is not prone to oscillation because there is no feedback signal to cause an unwanted oscillation. Whereas, conventional closed-loop architectures utilize at least one feedback signal that can result in unwanted signal oscillation.

Figure 7:
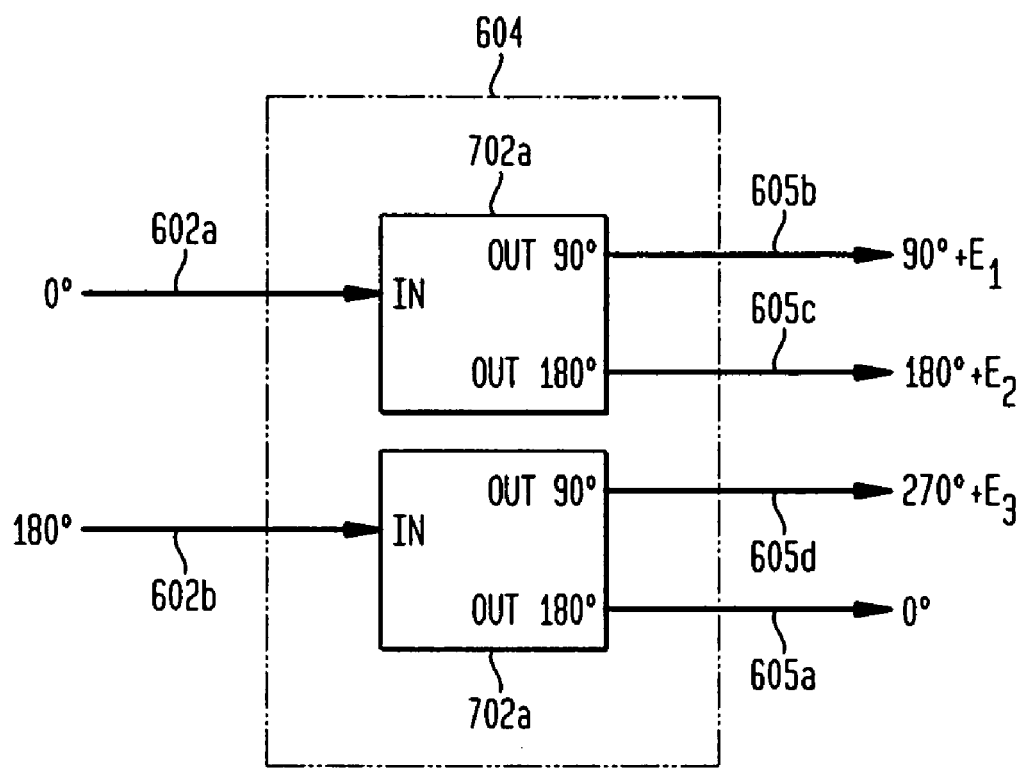
FIG. 7 illustrates a coarse stage according to embodiments of the present invention.

FIG. 7 further illustrates the coarse stage 604 that generates the coarse quadrature signals 605a-d. As stated above, the coarse stage 604 receives differential input signals 602a and 602b that are 0 and 180 degrees out-of-phase, and generates quadrature output signals 605a-d. The coarse stage includes a first 90/180 delay circuit 702a and a second 90/180 delay circuit 702b. The first 90/180 delay circuit 702a receives the 0-degree signal 602a and generates output signals 605b and 605d. The second 90/180 delay circuit 702b receives the 180 degree signal 602b and generates output signals 605b and 605d. The signal 605a is arbitrarily chosen as a reference output signal at 0 degrees. The output signal 605b is phase shifted by 90 degrees relative to the reference signal 605a, plus some error signal $E_1$. The output signal 605c is phase-shifted by 180 degrees relative to the reference signal 605a, plus some error signal $E_2$. Finally, the output signal 605d is phase-shifted by 270 degrees relative to the reference signal 605a, plus some error signal $E_3$.

Figure 18:
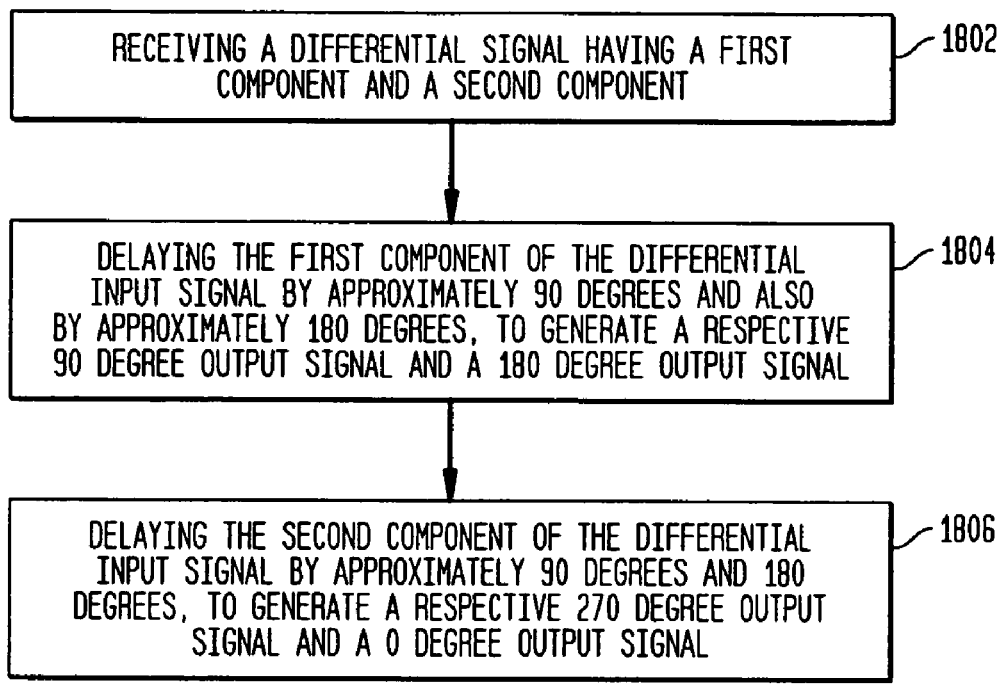
FIG. 18 illustrates a flowchart related to coarse quadrature signal generation according to embodiments of the present invention.

FIG. 18 illustrates a flowchart 1800 that further describes coarse quadrature signal generation according to embodiments of the present invention. For instance, flowchart 1800 describes the operation of the coarse stage 604 in the generation of the coarse quadrature signals 605a-605d.

In step 1802, a differential signal is received having a first component and a second component, where the second component is 180 degrees out-of-phase from the first component. The first component can be referred to as the positive component of a differential signal, and the second component can be referred to as the negative component of a differential signal. For example, referring to FIG. 7, the first component can be the 0-degree component 602a and the second component can be the 180-degree component 602b, as shown in FIG. 7.

In step 1804, the first component of the differential input signal is delayed by approximately 90 degrees and also by 180 degrees, to generate a 90 degree output signal and a 180 degree output signal, respectively. The 90 degree output signal is phase-shifted by 90 degrees relative to the first component of the differential input signal, plus some error signal. The 180 degree output signal is phase-shifted by 180 degrees relative to the first component of the differential input signal, plus some error signal. For example, in FIG. 7, the output signal 605b is phase-shifted by approximately 90 degrees relative to the input signal 602a, plus an error signal $E_1$. The output signal 605c is phase-shifted by 180 degrees relative to the input signal 602a, plus an error signal $E_2$.

In step 1806, the second component of the differential input signal is delayed by approximately 90 degrees and 180 degrees, to generate a 270 degree output signal and a 0 degree output signal, respectively. The 270 degree output signal is phase-shifted by approximately 270 degrees relative to the first component of the differential input signal, plus some error signal. The 0 degree output signal is phase shifted by approximately 0 degrees relative to the first component of the differential input signal, plus some error signal. For example, in FIG. 7, the output signal 605d is phase-shifted by approximately 270 degrees relative to the input signal 602a, plus an error signal $E_3$. The output signal 605a is phase-shifted by 0 degrees relative to the input signal 602a. As mentioned above, the output signal 605a is arbitrarily chosen as the reference for the output signals 605a-d, so there is no error signal for the output signal 605a.

Figure 8:
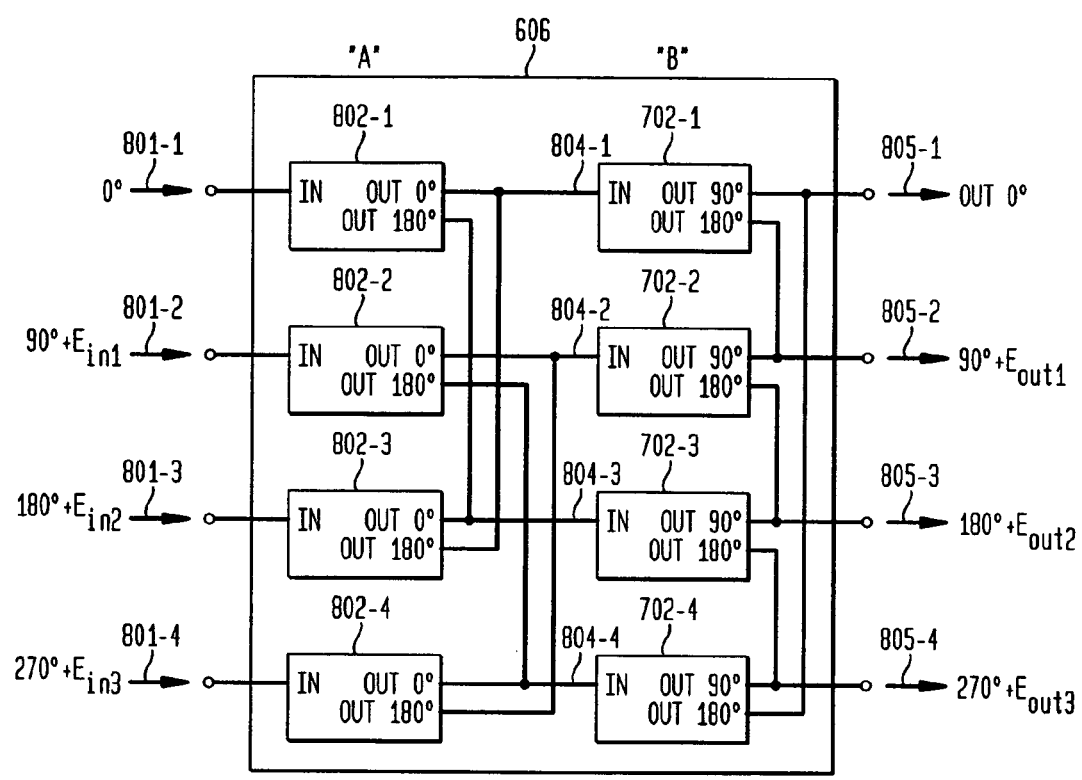
FIG. 8 illustrates a refinement stage according to embodiments of the present invention.

FIG. 8 illustrates a refinement stage 606 that receives input signals 801-1 to 801-4 from a prior stage (e.g. the coarse stage 604 or another refinement stage 606), and generates output signals 805-1 to 805-4. The input signals 801-1 to 801-4 have a quadrature relationship, but have some input phase error $E_{IN}$. For example, the signal 801-2 is phase-shifted relative to the signal 801-1 by 90 degrees +/− an error ($E_{IN1}$). The signal 801-3 is phase-shifted relative to the signal 801-1 by 180 degrees +/− an error ($E_{IN2}$). The signal 801-3 is phase-shifted relative to the signal 801-1 by 270 degrees +/− an error ($E_{IN3}$). The output signals 805 also have a quadrature relationship, but have some output phase error $E_{OUT}$. For example, the signal 801-2 is phase-shifted relative to the signal 801-1 by 90 degrees +/− an error ($E_{OUT1}$). The signal 801-3 is phase-shifted relative to the signal 801-1 to by 180 degrees +/− an error ($E_{OUT2}$). The output signal 801-4 is phase-shifted relative to the signal 801-1 by 270 degrees +/− an error ($E_{OUT3}$). Preferably, $E_{OUT}$ for each output signal 805 is less than the $E_{IN}$ for each corresponding signal 801, so that the output of the refinement stage 606 has a more accurate quadrature relationship than the input signals 801. For example, preferably, $E_{OUT1}$ is less than $E_{IN}$, $E_{OUT2}$ is less than $E_{IN2}$, and $E_{OUT3}$ is less than $E_{IN3}$. Thus, as more and more refinement stages 606 are added, the quadrature phase error continues to reduce toward zero degrees.

The refinement stage 606 in FIG. 8 includes four 0/180 delay circuits 802-1 to 802-4, and four 90/180 delay circuits 702-1 to 702-4. The number of delay circuits 802 and 702 are determined by the number of input signals 801a-d, which is four in this case.

Each delay circuit 802 receives a corresponding input signal 801, and has a 0 degree output and a 180 degree output. The 0 degree output of the first delay circuit 802-1 is connected to the 180 degree output of the delay circuit 802-3. The 180 degree output of the delay circuit 801-1 is connected to the 0 degree output of the delay circuit 801-3. Similarly, the 0 degree output of the delay circuit 802-2 is connected to the 180 degree output of the delay circuit 802-4, and the 180 degree output of the delay circuit 802-2 is connected to the 0 degree output of the delay circuit 802-4. Stated another way, each odd numbered delay circuit 802 has its outputs connected together, but 180 degrees out-of-phase with each other. Likewise, each even-numbered delay circuit 801 has its outputs connected together, but is 180-degrees out-of-phase with each other.

The input of 90/180 delay circuits 702 receives the 0-degree output of the corresponding delay circuit 802. For example, the input of the delay circuit 702-1 is connected to the 0-degree output of the delay circuit 802-1, and the input of the delay circuit 702-2 is connected to the 0-degree output of the delay circuit 802-2, and so on.

Still referring to the delay circuits 702, the 180-degree output of the first delay circuit 702-1 is connected to the 90 degree output of the delay circuit 702-2. The 180-degree output of the delay circuit 702-2 is connected to the 90-degree output of the delay circuit 702-3. Similarly, 180-degree output of the delay circuit 702-3 is connected to the 90-degree output of the delay circuit 702-4. Stated another way, the 180-degree output of the $n^{th}$ delay circuit 702 is connected to the 90-degree output of the $(n+1)^{th}$ delay circuit 702. The 180-degree output of the $4^{th}$ delay circuit 702-4 is connected back to the 90 degree output of the first delay circuit 702-1, as it is the last delay circuit 702 in the set.

Figure 9:
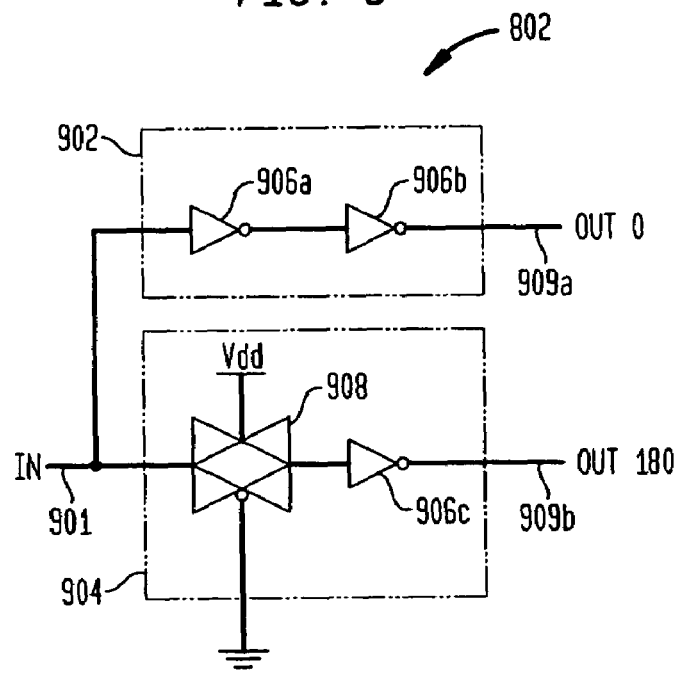
FIG. 9 illustrates 0/180 delay circuit according to embodiments of the present invention.

FIG. 9 further illustrates the 0/180 degree delay circuit 802 that is utilized in the refinement stages 606, according to an embodiment of the invention. The 0/180 degree delay circuit 802 includes a first signal path 902 and a second signal path 904 that receive an input signal 901. The first signal path 902 includes inverters 906a and 906b. The inverters 906a and 906b receive the input signal 901, invert the signal twice, so that the output signal 909a is in-phase with the input signal 901. In other words, the signal 909a is phase-shifted by 0 degrees with respect to the input signal 901, except for the parasitic delay of the inverters 906a and 906b. Herein, parasitic delay or parasitic phase shift is the unintentional signal delay caused by the physical parameters of a semiconductor device(s) that make-up the inverter 906. For example, larger field effect transistors (FETs) are known to have a larger parasitic delay than smaller devices because they have a larger parasitic reactance, and because they have a longer channel that the signal must travel through.

The second signal path 904 includes a transmission gate 908 and an inverter 906c. The transmission gate 908 is a 0-degree phase-shifter, but is designed to have the same parasitic delay as an inverter 906. Therefore, the input signal 901 is phase shifted by 0 degrees and then is phase-shifted by 180 degrees to produce an output signal 909b that is delayed 180 degrees with respect to the output signal 909a. The transmission gate 908 replicates and copies the parasitic delay of the inverter 906a into the signal path 904. Without the transmission gate 908, the output signal 909b would be skewed-off the desired 180 degree phase shift by the parasitic delay of the inverter 906a.

Figure 10:
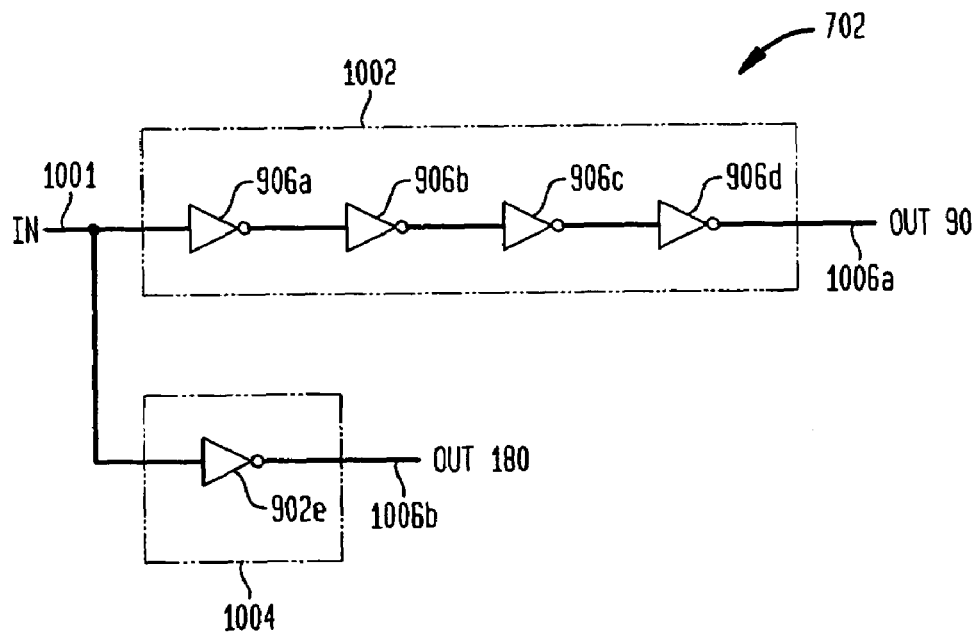
FIG. 10 illustrates 90/180 delay circuit according to embodiments of the present invention.

FIG. 10 further illustrates the 90/180 degree delay 702 according to an embodiment of the invention, which is used in both the coarse stage 604 and the fine stage 606. The 90/180 degree delay includes a first path 1002 that includes inverters 906a-906d, and a second path 1004 that only includes the inverter 906e. Ignoring any parasitic delay for the moment, the first path 1002 inverts the input signal 1001 four times, so that the output signal 1006a is in-phase with the input signal 1001. Likewise, the second path 1004 includes a single inverter 906e, so that the output signal 1006b is 180 degrees out-of-phase with the input signal 1001. Therefore, absent any parasitic delay, the output signal 1006b would be phase-shifted by 180 degrees relative to the output signal 1006a. However, the desired result is that the output signal 1006b should be delayed by only 90 degrees relative to the output signal 1006a.

Now considering the parasitic delay of the inverters 906, the first path 1002 has 3 more inverters 906 than the second path 1004. Therefore, the inverters 906 are sized so that the parasitic delay of the 3 inverters 906 is equal to 90 degrees at the frequency of interest. In other words, the parasitic delay of the 3 additional inverters 906 in path 1002 causes an additional 90 degrees worth of phase shift at the frequency of interest, so that the output 1006b only lags the output 1006a by 90 degrees, as is desired.

In one embodiment, the frequency-of-interest for the input signal 1001 is 800 MHz, which has a period of 1250 pS. Therefore, 90 degrees of phase-shift equates to about 1250 pS/4, or 312 pS. Therefore, each of the three inverters 906 should provide approximately 104 pS of delay at 800 MHz, for this example.

The time delay for an inverter 906 can be shown to be equal to $$t_{DELAY} = R_{eq} C_{LOAD}$$

where $R_{eq}$ and $C_{LOAD}$ are the equivalent resistance and capacitance for a digital FET. The equivalent resistance of a digital FET can be shown to be:

$$R_{eq} = \frac{V_{DD}}{\frac{K'}{2}\frac{W}{L}(V_{DD}-V_{TH})^2} = R'_{eq}\frac{L}{W} \quad (1a)$$

$$R_{on} = \frac{L}{K'W(V_{gs}-V_T)} \quad (1b)$$

wherein,
L=FET channel length,
W=FET channel width,
$R'_{eq}$=is a constant dependent on the particular semiconductor process that is utilized.

The equivalent capacitance for a digital FET can be shown to be:

$$C_{LOAD} = \quad (2)$$
$$C_{IN} + C_{OUT} = \frac{3}{2}C'_{OX}((WL)_N+(WL)_P)+C'_{OX}((WL)_N+(WL)_P)$$

wherein,
$C_{ox}$ is dependent on the gate oxide thickness of the digital FET.

By substituting the expression for $R_{eq}$ and $C_{Load}$ for the $t_{DELAY}$ equation:

$$t_{DELAY} = R_{eq}C_{LOAD} = \quad (3)$$
$$R'_{eqP}\left(\frac{L}{W}\right)_P \cdot \frac{5}{2}C'_{OX}(WL)_P\left(1+\frac{K'_P}{K'_N}\right) = \frac{5}{2}R'_{eqP}C'_{OX}\left(1+\frac{K'_P}{K'_N}\right)L_P^2$$

Equation 3 can be solved for channel length to achieve a desired delay. Solving for a 104 pS delay results in channel length of L=0.62 um. Additionally, devices with a given length can be used in conjunction with a variable capacitive load to achieve a desired delay for a specific application. This will permit tuning of the filter.

As shown in Equation (3), the device width W is canceled out, and the device delay is largely independent of device width. Since the device delay is largely independent of device width, it is tempting to select minimum width devices to reduce layout area. Minimum width devices also result in lower power consumption due to a lower transconductance and lower current draw during moments of paralleled inverter output averaging. However, the quadrature generator 600 relies on stage-to-stage matching to achieve high phase accuracy. The CMOS process can be characterized for device-to-device variations in threshold voltage, transconductance, and other parameters. In most cases improved parameter matching is achieved by increasing the device area. As a result, the FET channel width is increased to achieve the necessary device-to-device uniformity required to meet the phase imbalance specification. Larger devices require more layout area and also more power, as will be understood by those skilled in the arts. As a result, power consumption and layout area are being traded for phase accuracy.

Figure 17:
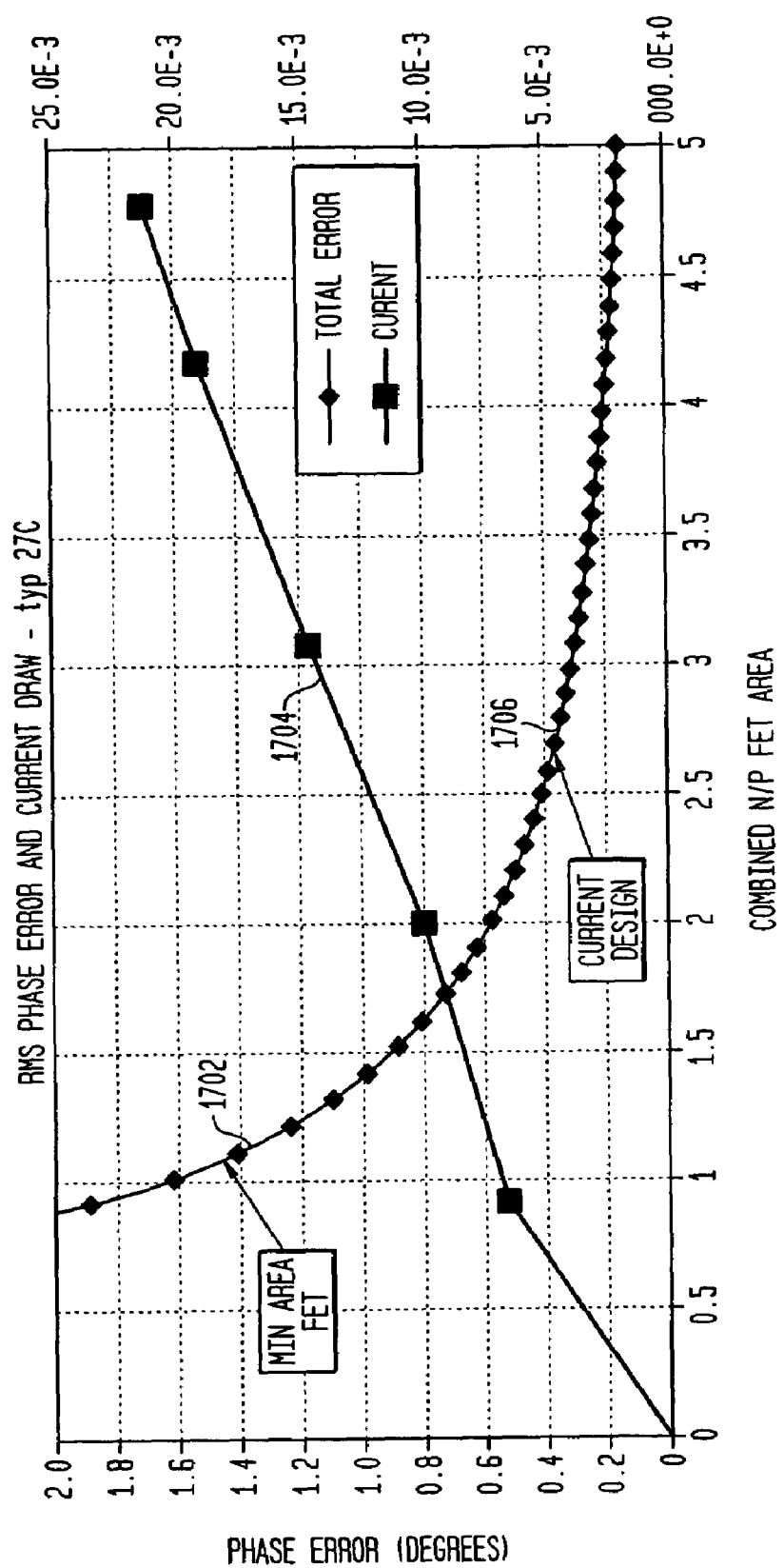
FIG. 17 illustrates phase error verses FET area for a representative 815 MHz application.

FIG. 17 illustrates the tradeoff between phase error and FET size and current. Curve 1702 depicts phase error vs.

FET size, and illustrates that the phase error decreases as the FET size increases. Curve 1704 depicts drain current vs. FET size and illustrates that drain current increases with FET size. Therefore, in one embodiment, the FET size at 1706 is chosen as a compromise between low phase error and moderate power consumption.

It can be shown that a threshold voltage standard deviation/mean of about 1.8% would produce phase errors of less than 1 degree RMS. While a threshold voltage ($V_{TH0}$) deviation can be assigned directly to the PSpice model, beta variations were included by allowing gate oxide thickness ($t_{ox}$) to vary. The variation of $t_{ox}$ affects several parameters besides the transconductance (including threshold voltage), but provides a likely worst case analysis for phase sensitivity. A standard deviation/mean of 2% was assigned to $t_{OX}$.

The course quadrature signals are further refined with each correction stage. However, at some point the phase error will be limited by the component matching of the final stage, and additional stages provide little or no improvement in phase error. For example, the quadrature generator in FIG. 6 includes 4 refinement stages. The phase error is rapidly reduced to less than 2 degrees (from an initial 15-20 degrees) by the first two stages 606a and 606b. The third stage 606c drops phase error to about 1.5 degrees, and the fourth stage provides enough improvement to the reduce phase error +/−1 degree, which is desired for one embodiment of the invention.

As discussed herein, the delay circuits 802 and 702 are implemented using active inverter circuits, which can be implemented in standard semiconductor processes, such as CMOS. CMOS inverters on a common substrate have similar semiconductor characteristics that are repeatable from inverter-to-inverter, which improves the phase accuracy of the quadrature output signals. Furthermore, CMOS inverters are more area efficient than passive capacitors and passive resistors. Therefore, the entire quadrature generator 600 is more area efficient than the conventional delay circuit 500, which increases overall chip-yield. Similar concepts can be applied using ECL (emitter coupled logic) for the inverters with improved matching and accuracy.

Figure 12:
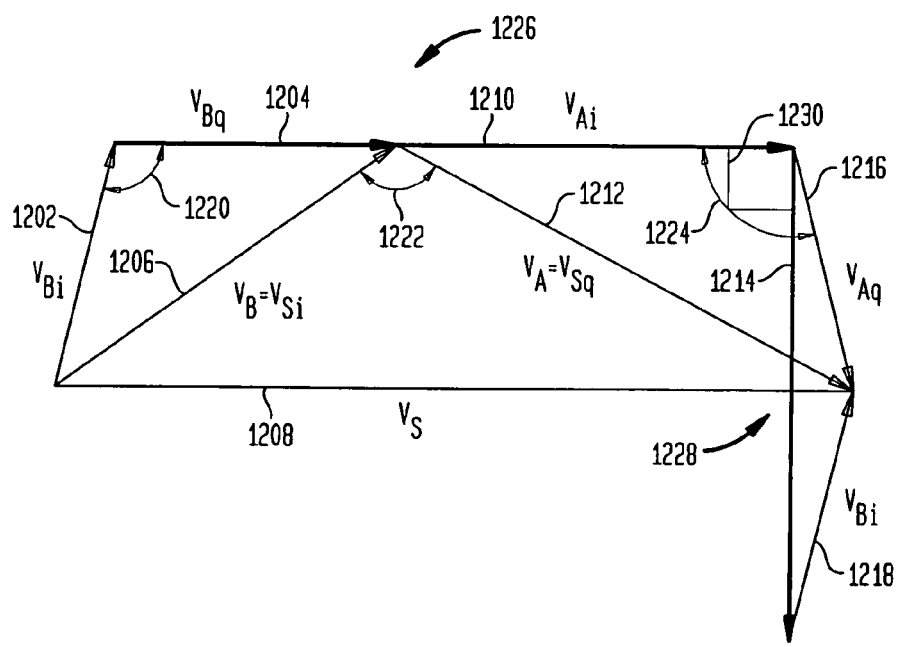
FIG. 12 illustrates the functional operation of refinement stages according to embodiments of the present invention.

FIG. 12 further illustrates the operation of refinement stage 606. More specifically, FIG. 12 depicts a functional description of the refinement stage 606. Referring to FIG. 12, an input signal $V_s$ 1208 is sub-divided into an in-phase signal 1206 and a quadrature signal 1212, producing an angle 1222 between the in-phase signal 1206 and the quadrature 1212. Due to the component inaccuracies in the refinement stage 606, the angle 1222 between the in-phase signal 1206 and the quadarature signal 1212 is not exactly 90 degrees, but is 90 degrees +/− some error. The in-phase signal 1206 is further sub-divided into an in-phase signal 1202 and a quadrature signal 1204, producing an angle 1220 between the signals 1202 and 1204. The quadrature signal 1212 is also further sub-divided into in-phase signal 1210 and quadrature signal 1216, producing an angle 1224 between the signals 1210 and 1216. The angles 1220 and 1224 are also not exactly 90, and have substantially the same error as the angle 1222. The error is substantially the same because component inaccuracies are substantially the same in the refinement stage 606, due to the repeated use of inverters 906.

The in-phase signals 1204 and 1210 are substantially in-phase with each other and are added together to produce a combined in-phase signal 1226. Likewise, the signal 1218 is subtracted from the signal 1216 to produce a combined quadrature signal 1228. The combined in-phase signal 1226 is substantially in quadrature with the combined quadrature signal 1228, so that the resulting angle 1230 is substantially 90 degrees, or at least has a final error component that is less than the error associated with the angles 1220 and 1224. The final error component is less because the corresponding inverters 906 in the 0/180 delay circuits are connected together. Therefore, any phase error signal at the output of the 0/180 delay circuits 802 is averaged together and reduced. For example, the 0-degree output of the delay circuit 802-1 is connected together with the 180 degree output of the delay circuit 802-3. Since the delay circuit 802-3 has a 180 degree input 801-3, the 180 degree output of the delay circuit 802-3 should be at 0 degree, and in-phase with the 0-degree output of the 0/180 delay circuit 802-1. Likewise, the 180 degree output of the delay circuit 802-1 is connected to the 0-degree output of the delay circuit 802-3, to average any phase error at these outputs. The outputs of the delay circuits 802-2 and 802-4 are connected together in a similar manner, to average any phase error at their outputs. Likewise, the corresponding outputs of the 90/180 delay circuits 702 are also connected together to average any phase error at their respective outputs.

Figure 13A:
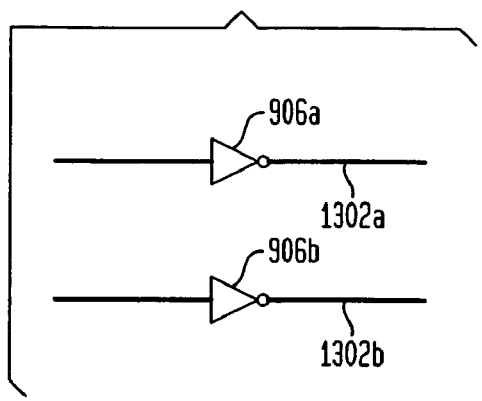
FIGS. 13A-13D illustrate the effect of averaging inverter outputs together according to embodiments of the present invention.
Figure 13B:
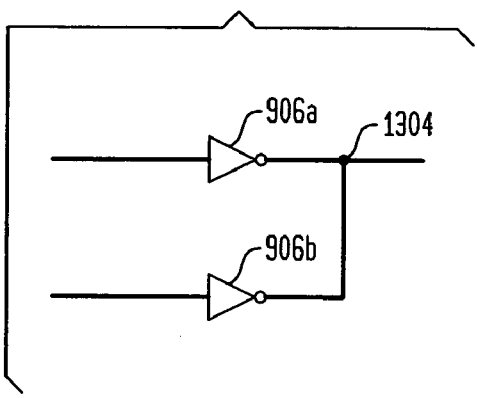
Figure 13C:
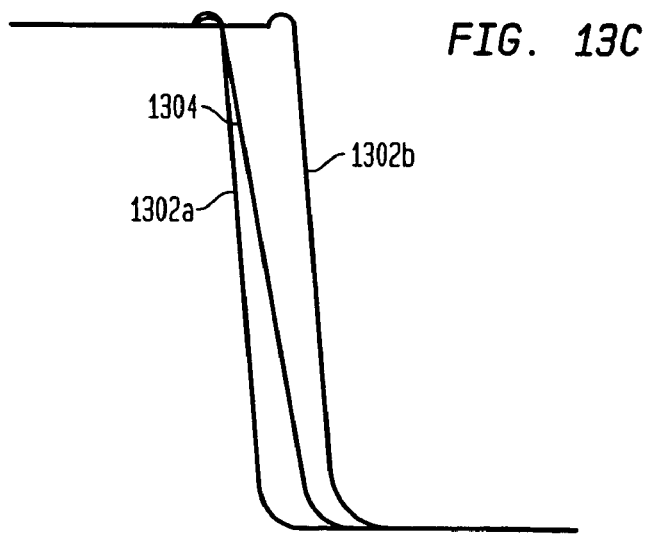

FIGS. 13A-C further describe the signal averaging performed by the connecting the outputs of the inverters 906 together. FIG. 13A illustrates substantially identical inverters 906a and 906b that are output inverters of either a 0/180 delay circuit 802, or are the output of a 90/180 delay circuit 702. For example, the inverter 906a can be the output inverter 906 of the 0/180 degree delay circuit 802-1, and the inverter 906b can be the output inverter 906 of the 0/180 degree delay circuit 802-3. Inverter 906a has an output 1302a and the inverter 906b has an output 1302b. Referring to FIG. 13C, each output 1302a and 1302b has some phase error, but the output 1302a leads the output 1302b.

FIG. 13B illustrates the inverters 906a and 906b having their outputs connected together at an output 1304. Referring again to FIG. 13C, the output 1304 is substantially an average of the signals 1302a and 1302b, which reduces the phase error compared with the outputs 1302a and 1302b.

Figure 13D:
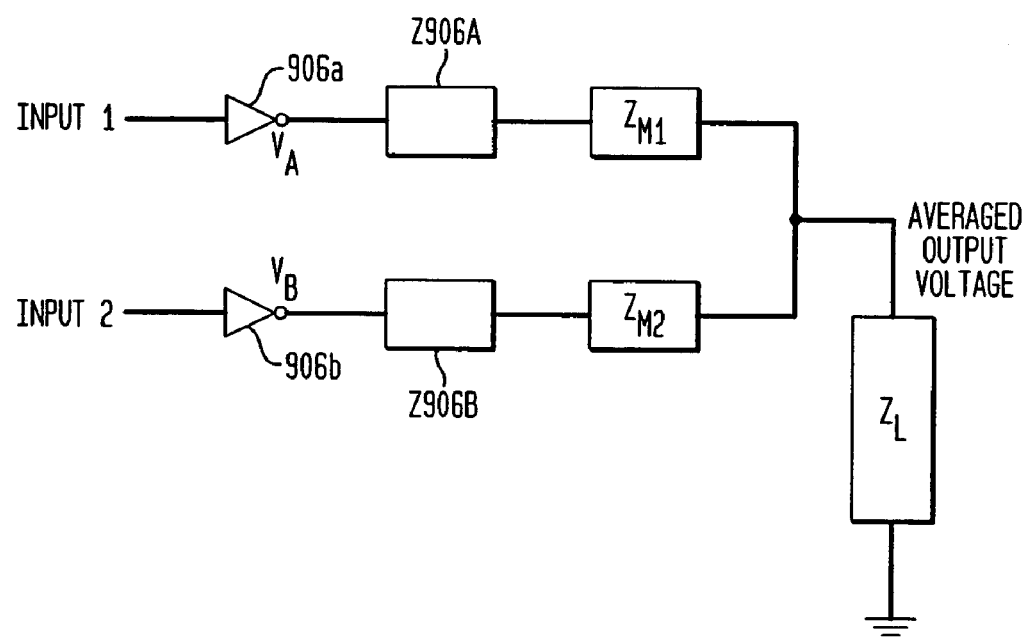

Still referring to FIG. 13B, the inverters 906a and 906b with corresponding outputs 1302a and 1302b produce the averaged output 1304 when their respective outputs are tied together because of the source impedance and the load impedance of the inverters. Referring to FIG. 13D, each inverter 906a possesses a finite source impedance and it can be viewed that each inverter 906 drives a load impedance. Accordingly,

| | | |
|---|---|---|
| $V_{A,B}$ | $\Delta$ | voltage at inverter outputs |
| $Z_{906A}$ | $\Delta$ | output impedance of 906A inverter |
| $Z_{906B}$ | $\Delta$ | output impedance of 906B inverter |
| $Z_{M1}$ | $\Delta$ | branch impedance which may be distributed or lumped and may be related to passive or active circuitry associated with the load or matching networks |
| $Z_{M2}$ | | branch impedance which may be distributed or lumped and may be related to passive or active circuitry associated with the load or matching networks |
| $Z_L$ | $\Delta$ | load impedance |

The effective load from the perspective of inverter 906a is therefore;

$$Z_{LOAD\text{-}906A} \Delta Z_{M1} + Z_L // Z_{M2}$$

Likewise, the effective load from the perspective of inverter 906b is $$Z_{LOAD-906B} \Delta Z_{M2} + Z_L // Z_{M1}$$

Now the voltages across $Z_L$ and the currents through $Z_L$ are proportioned to the outputs of the inverters and the values for $Z_{906A,B}$ and $Z_{LOAD-906A,B}$. Therefore:

$$V_{O(s)} = V_{A(s)} \frac{Z_L}{Z_{906A} + Z_{LOAD-906A}} + V_{B(s)} \frac{Z_L}{Z_{906B} + Z_{LOAD-906B}} \quad (3a)$$

This equation (3a) indicates the transfer function in the frequency domain using Laplace transforms. The transient response my be obtained from the inverse Laplace transform. It is evident that $V_O$ can be manipulated by tailoring a number of items such as:
   a) voltage swing of each inverter which could be accomplished via varying the power supply and a host of other techniques,
   b) changing the inverter source impedances,
   c) changing branch impedances $Z_{M1}$, $Z_{M2}$,
   d) altering the load impedance.

In summary, the averaging of the inverters 906 could be weighted equally or in an arbitrary manner. Furthermore, this weighting could be altered in situations to compensate for differing phase alignments. Moreover, N such circuits could be combined in parallel using the super position principles illustrated for the two branch circuit.

Figure 14:
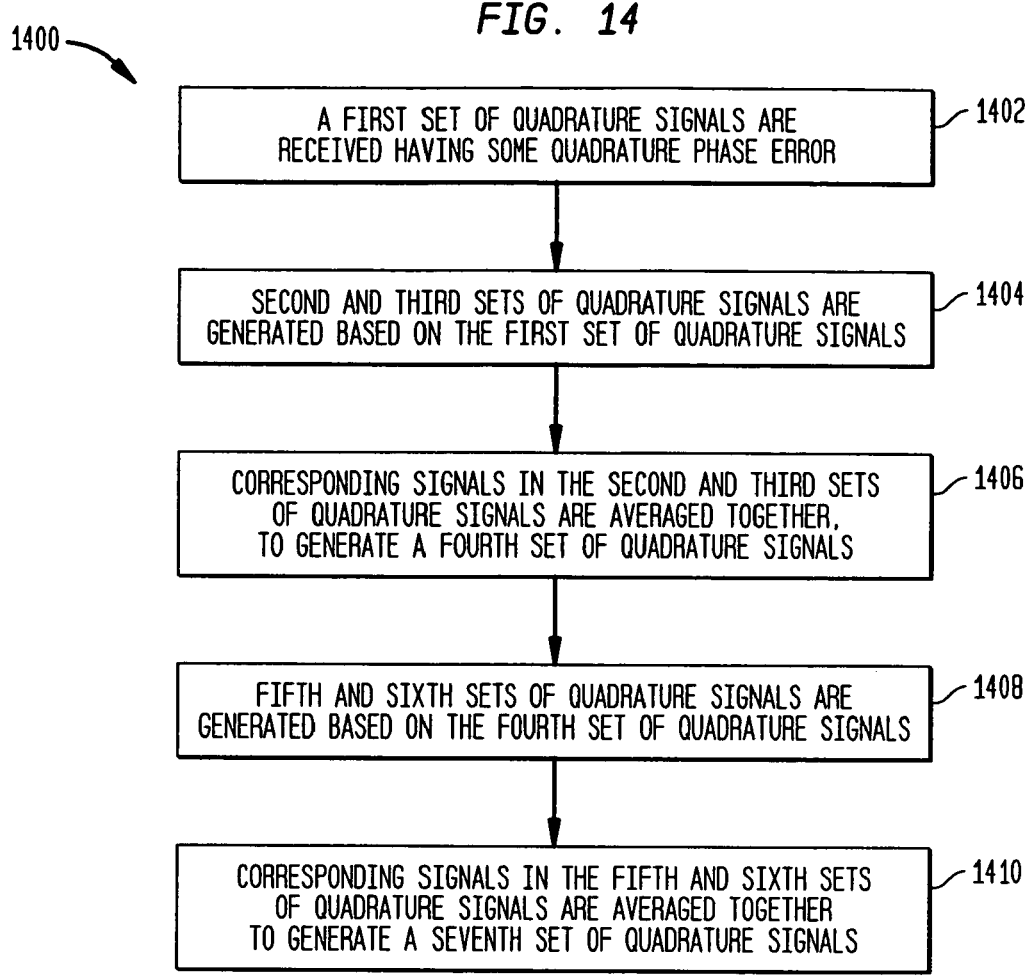
FIG. 14 illustrates an operational flowchart for the refinement stages according to embodiments of the present invention.

FIG. 14 illustrates a flowchart 1400 that further describes the operation of the refinement stages 606, and the phase error averaging performed by the refinement stages 606.

In step 1402, a first set of quadrature signals are received having some quadrature phase error. For example, referring to FIG. 8, input quadrature signals 801a-801d are received that have some quadrature phase error $E_{IN}$.

In step 1404, a second set and a third set of quadrature signals are generated based on the first set of quadrature signals using inverters. The second set of quadrature signals are substantially in-phase with the first set of quadrature signals, and the third set of quadrature signals are substantially delayed by 180 degrees relative to the first set of quadrature signals. For example, 0-degree outputs of the 0/180 delay circuits 802 are generated based on the first set of signals 801, and represent the second set of quadrature signals. The 0-degree outputs of the delay circuit 802 are substantially in-phase with the inputs 801, and have a quadrature relationship with each other because the quadrature signals 801 have a quadrature relationship with each other. The 180 degree outputs of the 0/180 delay circuits 802 are based on the first set of quadrature signals, and represent the third set of quadrature signals. The 180 degree outputs of the 0/180 delay circuits 802 are substantially 180 degrees out of phase with the corresponding inputs 801.

In step 1406, the second set of quadrature signals and the third set of quadrature signals are averaged together, to generate a fourth set of quadrature signals that have less phase error than the first set of quadrature signals. More specifically, corresponding signals of the second set of quadrature signals and the third set of quadrature signals are averaged together, to reduce the phase error in the fourth set of quadrature signals. For example, the 0-degree outputs of the 0/180 delay circuits 802 are averaged with the corresponding 180 degree outputs of the delay circuit 802 to generate averaged signals 804. For example, the 0 degree output of the 0/180 delay circuit 802-1 is averaged with the 180 degree output of the delay circuit 802-3, to generate an averaged signal 804-1 that is the input to the 90/180 degree delay circuit 702-1. Likewise, the 0-degree output of the delay circuit 802-2 is averaged with the 180 degree output of the delay circuit 802-4, to generate an averaged signal 804-2. Likewise, the 0-degree output of the delay circuit 802-3 is averaged with the 180 degree output of the delay circuit 802-1, to generate an averaged signal 804-3. Likewise, the 0-degree output of the delay circuit 802-4 is averaged with the 180 degree output of the delay circuit 802-2, to generate an averaged signal 804-4.

In step 1408, a fifth set and a sixth set of quadrature signals is generated based on the fourth set of quadrature signals. The fifth set of quadrature signals is delayed by 90 degrees relative to the fourth set of quadrature signals. The sixth set of quadrature signals is delayed by 180 degrees relative to the fourth set of quadrature signals, and therefore is delayed by 90 degrees relative to the fifth set of quadrature signals. For example, 90-degree outputs of the 90/180 delay circuits 702 represent the fifth set of quadrature signals, and are delayed by 90 degrees relative to the corresponding averaged signals 804-1 to 804-4. The 180 degree outputs of the 90/180 delay circuits 702 are also based on the fourth set of quadrature signals, and are delayed by 180 degrees relative to the corresponding averaged signals 804-1 to 804-4.

In step 1410, the fifth set of quadrature signals and the sixth set of quadrature signals are averaged together, to generate a seventh set of quadrature signals that have less phase error than the fourth set of quadrature signals. More specifically, corresponding signals of the fifth set of quadrature signals and the sixth set of quadrature signals are averaged together, to reduce the phase error in the seventh set of quadrature signals. For example, the 0-degree outputs of the 90/180 delay circuits 702 are averaged with the corresponding 180 degree outputs of the delay circuits 702, to generate averaged output signals 805. For example, the 90 degree output of the 90/180 delay circuit 702-1 is averaged with the 180 degree output of the delay circuit 702-3, to generate the quadrature output signal 805-1. Likewise, the 90-degree output of the delay circuit 702-2 is averaged with the 180 degree output of the delay circuit 702-1, to generate the quadrature output signal 805-2. Likewise, the 90-degree output of the delay circuit 702-3 is averaged with the 180 degree output of the delay circuit 702-4, to generate the quadrature output signal 804-3. Likewise, the 90-degree output of the delay circuit 702-4 is averaged with the 180 degree output of the delay circuit 702-3, to generate the quadrature output signal 805-4.

The phase error of the quadrature output signals 805 is less than the phase error of the quadrature input signals 801, due to the averaging performed by steps 1406 and 1408. In embodiments, phase error is less than 1 degree at the frequency of interest.

5. Mathematical Description

A system level mathematical description of the operation of the refinement stage 606 is given as follows. In order to facilitate the equation manipulation in the following description, the delay circuits 802-1 to 802-4 in FIG. 8 will be referred to as delay circuits A-1 to A-n, respectively. Likewise, the delay circuits 702-1 to 702-4 in FIG. 8 will be referred to as delay circuits B-1 to B-n. This is in accordance with the "A" placed over the row of delay circuit 802, and the "B" placed over the row of delay circuits 702 in FIG. 8. Furthermore, the input signals 801-1 to 801-4 will be referred to as in0, in90, in180, and in 270, respectively. Furthermore, the output signals 805-1 through 805-4 will be referred to as out0, out90, out180, and out270.

The four input and output waveforms of the refinement stage 606 can be approximately modeled as square waves although this is not strictly required. A Fourier decomposition can also be used to compare spectral components and their relative phases. The phase accuracy of the refinement stage 606 is measured by the relative time delay between rising or falling edges of each of the four output waveforms 805. Timing uncertainties result from input phase error and variability of propagation delay through each of the delay circuit 802 and 702 of the refinement stages 606. A mathematical model is constructed and described below that preserves the individual timing errors and demonstrates the self-regulating nature of the refinement stage 606.

A unit rectangular pulse is defined as:

$$\prod(t) = \left\{1, |t| < \frac{1}{2}; 0 \text{ otherwise}\right. \quad (4)$$

Figure 15:
FIG. 15 illustrates pulsed signals according to embodiments of the present invention.

Each of the input waveforms can be described by periodic rectangular pulse functions of fixed amplitude, A, and distinct timing with a periodicity of T, a pulse width of T/2, and first rising edge occurring at time $t_0$, as shown in FIG. 15. The equations for the input waveforms 801 based on this unit pulse description are as follows:

$$in0 = \sum_{n=0}^{\infty} A \prod \left(\frac{2(t - nT - t_0)}{T}\right) \quad (5)$$

$$in90 = \sum_{n=0}^{\infty} A \prod \left(\frac{2(t - nT - t_{90})}{T}\right) \quad (6)$$

$$in180 = \sum_{n=0}^{\infty} A \prod \left(\frac{2(t - nT - t_{180})}{T}\right) \quad (7)$$

$$in270 = \sum_{n=0}^{\infty} A \prod \left(\frac{2(t - nT - t_{270})}{T}\right) \quad (8)$$

wherein, in0 represents the 0 degree waveform 801-1, in90 represents the 90 degree waveform 801-2, in180 represents the 180 degree waveform 801-3, and in270 represents the 270 degree waveform 801-4.

The primary function of each of the individual delay circuits A1-AN and B1-BN in FIG. 8 is to provide an approximate delay to each signal and combine the two hard-wired outputs, creating timing characteristics which are an average of the individual waveforms, where the averaging effect is shown in FIG. 13B. For example, the input to the delay circuit B-1 comes from two hardwired outputs with inputs of in0 and in180 from the delay circuits A-1 and A-3, respectively. Assuming that in0 is defined as the zero degree reference, the timing of inB1 will be determined by the following:

in-to-out0 propagation delay of the delay circuit A-1 (where the delay is referenced as DA1:0 in the equations below)

Timing uncertainties associated with in180 (where the timing is represented in $t_{180}$ in the equations below)

in-to-out180 propagation delay of delay circuit A3 (where the delay is referenced as DA3:180 in the equations below)

The input signals and delays are viewed as random variables whose probability density functions (PDF) are uniformily distributed (in a worst case) over some range about their expected values or means. In some applications, the PDFs may be much more complex but the uniform assumption contemplates a worst case scenario of practical concern. Since components of the delays and waveforms are random variables, we may employ ideas from probability and statistics to address the method by which averaged phase values are obtained at the circuit output. For arbitrary PDFs associated with sums of random variables, the central limit theorm may be invoked to facilitate an understanding of how final averages or expected values of phases can be extracted.

Understanding the periodic nature of the rectangular pulse function where a delay of integer periods (T) produces like timing and amplitudes, and dropping the amplitude (A), the out0 rising edge of the delay circuit A-3 in FIG. 8 can be described in a modified notation as:

$$A1\text{out}0 = \prod_{RE}(in0 + DA1:0) \quad (9)$$

This represents a unity amplitude pulse whose rising edge occurs at a time determined by the input timing (i0) and the effective delay through delay circuit A1(DA1:0), which in turn is related to the driving point and load impedances as well as the branch impedances of the circuit. Likewise, the other component of inB1 is derived from in180:

$$A3\text{out}180 = \prod_{RE}(in180 + DA3:180) \quad (10)$$

The hard-wired combination of these two signals is a unity amplitude pulse whose rising edge occurs at the average time of the two components. Also, since this is actually a periodic pulse with period T, the subtraction or addition of integer periods will not alter the edge timing, but assists in the analysis using the modified pulse notation. One period is subtracted from any single delay path which produces an approximate delay of 1 period (360 degrees) or more. The following expressions are therefore equivalent:

$$A3\text{out}180 = \prod_{RE}(in180 + DA3:180) = \prod_{RE}(in180 + DA3:180 - T) \quad (11)$$

The input to the delay circuit B1 can now be described as averaging A1out0 with A3out 180:

$$inB1 = \prod_{RE} \frac{((in0 + DA1:0) + (in180 + DA3:180 - T))}{2} \quad (12)$$

This is a unit amplitude pulse whose rising edge occurs at a time:

$$t = \frac{((in0 + DA1:0) + (in180 + DA3:180 - T))}{2} \quad (13)$$

where:

in0, in180=edge timing of the inputs in0 and in180

DA1:0, DA3:180=propagation delay through the blocks A1 and A3

T=period of the input waveforms

The timing associated with in180 would ideally be shifted by 180 degrees (T/2) from in0. If in0 were defined as zero for an 800 MHz system:

$$in180 = in0 + \frac{T}{2} = 0 + \frac{1.25nS}{2} = 625pS \quad (14)$$

The actual timing of in180 will vary due to timing inaccuracies, noise, and temperature/process variations. Referring to FIG. 8, the inputs to each of the delay circuits in column B can be defined:

$$inB1 = \prod_{RE} \frac{((in0 + DA1:0) + (in180 + DA3:180 - T))}{2} \quad (15)$$

$$inB2 = \prod_{RE} \frac{((in90 + DA2:0) + (in270 + DA4:180 - T))}{2} \quad (16)$$

$$inB3 = \prod_{RE} \frac{((in180 + DA3:0) + (in0 + DA1:180))}{2} \quad (17)$$

$$inB4 = \prod_{RE} \frac{((in270 + DA4:0) + (in90 + DA2:180))}{2} \quad (18)$$

Hard-wiring the appropriate outputs of the blocks in column B and time averaging the edge transitions produces the final outputs of the refinement stage, out0, out90, out180, and out270:

$$out90 = \frac{\prod_{RE}\left\{\frac{((i0+DA1:0)+(i180+DA3:180-T))}{2} + DB1:90 + \frac{((i270+DA4:0)+(i90+DA2:180-T))}{2} + DB4:180-T\right\}}{2}$$

$$out180 = \frac{\prod_{RE}\left\{\frac{((i90+DA2:0)+(i270+DA4:180-T))}{2} + \frac{((i90+DA2:0)+(i270+DA4:180-T))}{2}\right\}}{2}$$

In one embodiment, the out90 and out180 are random variables also since their components can be viewed as random variables. A significant number of processing stages will result in the observable possessing a Gaussian-like random variable which implies that the expected value is easily extracted by averaging, which also reduces the variance of the final estimate.

Ideally, the time difference between rising edges of these two signals should be one fourth the period or 90 degrees. Subtracting the time difference between the 180 and 90 degree output results in:

$$\Delta t = \frac{\frac{((i0+DA1:0)+(i180+DA3:180-T))}{2} + DB1:90 + \frac{((i270+DA4:0)+(i90+DA2:180))}{2} + DB4:180-T}{2} - $$

$$\frac{\frac{((i90+DA2:0)+(i270+DA4:180-T))}{2} + \frac{((i90+DA2:0)+(i270+DB4:180-T))}{2}}{2}$$

Assuming the delay circuits in column and column B are well matched (DA1:0=DA2:0=DA3:0=DA4:0 and DB1:0=DB2:0=DB3:0=DB4:0) and simplifying:

$$\Delta t = -\frac{T}{4}. \quad (22)$$

Equation 22 indicates the relative phase between output signals 805 is substantially close to 90 degrees. The statistical mean of the result is a weak function of the initial phase error at the inputs 801. Furthermore, the result is also a statistical mean of individual delays through the delay circuits 802 and 702 in FIG. 8. Whereas, conventional quadrature generators need to have identical delay circuits in order to produce perfect phase. From the equations above, it is seen that the timing imperfections (all inputs and delay blocks) that form the outputs are summed and averaged and applied equally to each output. Although the absolute delay from the input to the output of the refinement stage will still vary with temperature, process, etc., the difference in delays between adjacent outputs is forced to T/4 by the circuit architecture.

Furthermore, the refinement stage 606 has a wide bandwidth since any of the individual delays (802 or 702) are not significant unless it affects the systems ability to perform waveform averaging. The ability to accurately perform averaging breaks down if the delay circuits are not in the neighborhood of the ideal delay. In one embodiment, for example, the bandwidth of a 4 stage 800 MHz quadrature generator was found to be over 500 MHz. Additional refinement stages can provide additional bandwidth.

Figure 16:
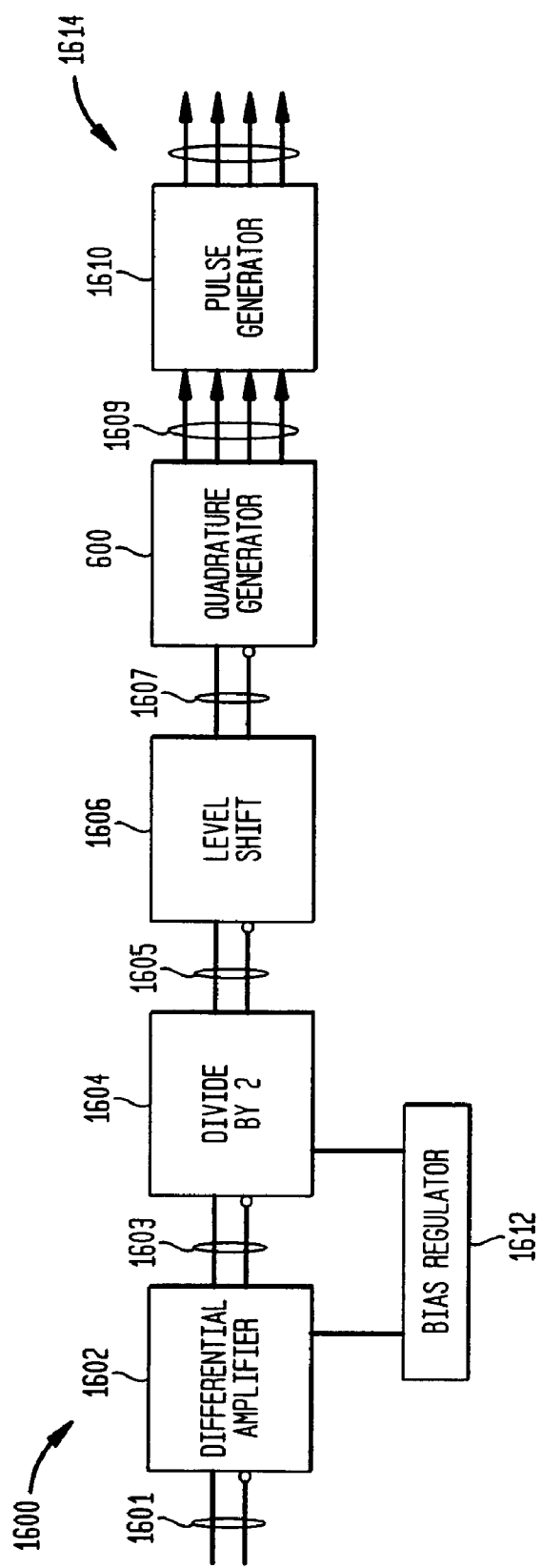
FIG. 16 illustrates an example LO generation circuit that generates quadrature pulsed control signals based on a differential input signal.

FIG. 16 illustrates an example LO generation circuit 1600, capable of generating quadrature pulsed control signals 1614, based a differential input signal 1601. A differential amplifier 1602 receives the input signal 1601 and amplifies the input signal 1601, to generate an amplified signal 1603. The differential amplifier 1602 is included because the differential input signal 1601 can have a variable amplitude, and it is desirable to have a constant amplitude signal 1603 during quadrature signal generation. A divideby-two circuit 1604 frequency divides the differential amplified signal 1603 by two, to generate a frequency divided signal 1605. For example, in one embodiment, the differential input signal has a frequency of 1.6 GHz, and the divide by two circuit divides the frequency down to 800 MHz. A level-shift circuit 1606 DC level shifts the signal 1605 to generate a level-shifted output signal 1607 that is appropriate for the quadrature generator 600. The quadrature generator 600 generates quadrature signals 1609 based on the level-shifted signal 1607. The pulse generator 1610 receives the signals 1609, and generates output pulses 1614 that have a quadrature relationship and have a desired pulse width. The differential amplifier 1602 and the divide-by-two circuit 1604 are biased using the bias regulator 1612.

The output pulses 1614 can be used as the control signals 108*a-d* that control the switches 126 in the balanced modulator 100 of FIG. 1. The pulse width of the output pulses 1614 can be set to provide a desired sampling period for the switches 126 in the balanced modulator 100 to improve energy transfer to a desired harmonic in the harmonically rich signal 103.

6. Performance

Operating on 800 MHz signals, the quadrature signal generator in FIG. 6 has shown to produce quadrature signals with less than +/−1 degree of phase error. Furthermore, the quadrature generator 600 is also resistant to input phase error. Experiments have shown that the phase error can vary from +/−12 degrees, and the output phase error only varies from +/−150 milli-degree. Still further, the quadrature generator 600 is also resistant to input frequency error. Experiments have shown that the input frequency can vary can vary 1.2 GHz to 2.2 GHz, and the output phase error varies minimally.

7. Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A quadrature signal generator, comprising:
a coarse stage for generating output signals that have substantially a quadrature phase relationship, said coarse stage having at least one 90/180 delay circuit having a first set of inverters and a second set of inverters, said second set of inverters having an approximate delay of 90 degrees relative to said first set of inverters; and
at least one refinement stage for refining said quadrature phase relationship of said output signals from said coarse stage, said refinement stage having at least one 0/180 delay circuit, said 0/180 delay circuit having a third series of inverters and a fourth series of inverters, said fourth series of inverters having an approximate delay of 180 degrees relative to said third series of inverters.

2. The quadrature signal generator of claim 1, wherein said at least one refinement stage comprises four refinement stages, each of said four refinement stages further refining said 90 degree phase relationship between said output signals.

3. The quadrature signal generator of claim 1, wherein said at least one refinement stage includes a second 90/180 delay circuit.

4. The quadrature signal generator of claim 1, wherein at least one of said first, second, third, and fourth series of inverters are CMOS inverters.

5. A quadrature signal generator, comprising:
a coarse stage capable of generating quadrature output signals that have substantially a 90-degree phase relationship based on a differential input signal; and
at least one refinement stage for refining said 90 degree phase relationship of said output signals from said coarse stage, said refinement stage having,
a plurality of 0/180 delay circuits each receiving a corresponding quadrature output signal and having a 0-degree output and a 180-degree output, wherein a 0-degree output of a first 0/180 delay circuit is coupled to a 180 degree output of a second 0/180 delay circuit, and
a plurality of 90/180 delay circuits having inputs coupled to corresponding 0-degree outputs of said plurality of 0/180 delay circuits, wherein a 90-degree output of a first 90/180 delay circuit is coupled to a 180 degree output of a second 90/180 delay circuit.

6. The quadrature signal generator of claim 5, wherein said first 0/180 delay circuit and said second 0/180 delay circuit are separated by a third 0/180 delay circuit.

7. The quadrature signal generator of claim 5, wherein said first 0/180 delay circuit is a $m^{th}$ delay circuit in said plurality of 0/180 delay circuits, and wherein said second 0/180 delay circuit is a $(m+2)^{th}$ delay circuit in said plurality of 0/180 delay circuits.

8. The quadrature signal generator of claim 5, wherein said first 90/180 delay circuit is adjacent to said second 90/180 delay circuit.

9. The quadrature signal generator of claim 5, wherein said first 90/180 delay circuit is a $m^{th}$ delay circuit in said plurality of 90/180 delay circuits, and wherein said second 90/180 delay circuit is a $(m+1)^{th}$ delay circuit in said plurality of 90/180 delay circuits.

10. The quadrature signal generator of claim 5, wherein each 0/180 delay circuit includes:
a first set of inverters, that have an input that receives said corresponding quadrature output signal and an output connected to said 0 degree output of said 0/180 delay circuit; and
a second set of inverters, that have an input that receives said corresponding quadrature output signal and an output connected to said 180 degree output of said 0/180 delay circuit;
wherein second set of inverters have an approximate delay of 180 degrees relative said first set of inverters.

11. The quadrature signal generator of claim 5, wherein said 0-degree output of said first 0/180 delay circuit is averaged with said 180 degree output of said second 0/180 delay circuit.

12. The quadrature signal generator of claim 5, wherein said 180-degree output of said first 0/180 delay circuit is averaged with said 0 degree output of said second 0/180 delay circuit.

13. The quadrature signal generator of claim 5, wherein said 90-degree output of a first 90/180 delay circuit is averaged with said 180 degree output of a second 90/180 delay circuit.

14. A quadrature signal generator, comprising:
a coarse stage capable generating quadrature output signals that have substantially a 90 degree phase relationship; and
at least one refinement stage for refining said 90 degree phase relationship of said output signals, said at least one refinement stage including,
a first 0/180 delay circuit having an input that receives a first output signal of said quadrature output signals, and having a 0 degree output and an 180 degree output,
a second 0/180 delay circuit having an input that receives a second output signal of said quadrature output signals, and having a 0 degree output and an 180 degree output,
a third 0/180 delay circuit having an input that receives a third output signal of said quadrature output signals, and having a 0 degree output and an 180 degree output,
a fourth 0/180 delay circuit having an input that receives a fourth output signal of said quadrature output signals, and having a 0 degree output and an 180 degree output,
a first 90/180 delay circuit having an input coupled to said 0 degree output of said first 0/180 delay circuit, and having a 90 degree output and a 180 degree output,
a second 90/180 delay circuit having an input coupled to said 0 degree output of said second 0/180 delay circuit, and having a 90 degree output and a 180 degree output,
a third 90/180 delay circuit having an input coupled to said 0 degree output of said third 0/180 delay circuit, and having a 90 degree output and a 180 degree output,
a fourth 90/180 delay circuit having an input coupled to said 0 degree output of said fourth 0/180 delay circuit, and having a 90 degree output and a 180 degree output,
wherein said 0 degree output of said first 0/180 delay circuit is coupled to said 180 degree output of said third 0/180 delay circuit,
wherein said 180 degree output of said first 0/180 delay circuit is coupled to a 0 degree output of said third 0/180 delay circuit,
wherein said 0 degree output of said second 0/180 delay circuit is coupled to said 180 output of said fourth 0/180 delay circuit,
wherein a 180 degree output of said second 0/180 delay circuit is coupled to a 0 degree output of said fourth 0/180 delay circuit,
wherein said 90 degree output of said first 90/180 delay circuit is coupled to said 180 degree output of said fourth 0/180 delay circuit,
wherein said 180 degree output of said first 90/180 delay circuit is coupled to said 90 degree output of said second 90/180 delay circuit,
wherein a 180 degree output of said second 90/180 delay circuit is coupled to said 90 degree output of said third 0/180 delay circuit, and
wherein a 180 degree output of said third 90/180 delay circuit is coupled to said 90 degree output of said fourth 0/180 delay circuit.

15. A quadrature signal generator, comprising:
a coarse stage capable of generating quadrature output signals that have substantially a 90-degree phase relationship based on a differential input signal; and
at least one refinement stage for refining said quadrature phase relationship of said output signals from said coarse stage, said refinement stage having,
a plurality of 0/180 delay circuits each receiving a corresponding quadrature output signal and having a 0-degree output and a 180-degree output, wherein a 0-degree output of a first 0/180 delay circuit is averaged with a 180 degree output of a second 0/180 delay circuit, said first 0/180 delay circuit and said second 0/180 delay circuit separated by a third 0/180 delay circuit,
a plurality of 90/180 delay circuits having inputs coupled to corresponding 0-degree outputs of said plurality of 0/180 delay circuits, wherein a 90-degree output of a first 90/180 delay circuit is averaged with a 180 degree output of a second 90/180 delay circuit, said first 90/180 delay circuit adjacent to said second 90/180 delay circuit.

16. A method of quadrature signal generation, comprising:
receiving a differential input signal;
delaying first and second components of said differential input signal to produce a first set of quadrature signals; and
refining said first set of quadrature signals to reduce phase errors, including
generating second and third sets of quadrature signals based on said first set of quadrature signals, said second set of quadrature signals substantially in-phase with said first set of quadrature signals, said third set of quadrature signals substantially delayed by 180 degrees relative to said first set of quadrature signals,
averaging said second set of quadrature signals with corresponding signals in said third set of quadrature signals, so as to produce a fourth set of quadrature signals,
generating fifth and six sets of quadrature signals based on said fourth set of quadrature signals, said fifth set of quadrature signals delayed by approximately 90 degrees relative to said fourth set of quadrature signals, and said six set of quadrature signals delayed by approximately 180 degrees relative to said first set of quadrature signals,
averaging said fifth set of quadrature signals with corresponding signals in said six set of quadrature signals, so as to produce a seventh set of quadrature signals, whereby said seventh set of quadrature signals has less phase error than said first set of quadrature signals.

17. The method of claim 16, further comprising the step of converting said seventh set of quadrature signals to a set of pulse signals having a quadrature relationship.

18. The method of claim 16, further comprising the step of dividing the frequency of said differential signal by a factor of 2.

19. The method of claim 18, further comprising the step of level shifting said differential signal so as adjust a DC level of said differential signal.

20. The method of claim 16, wherein said step of generating said second and third sets of quadrature signals includes the steps of:
delaying said first set of quadrature signals by approximately 0 degrees to produce said second set of quadrature signals; and
delaying said second set of quadrature signals by approximately 180 degrees to produce said third set of quadrature signals.

21. The method of claim 16, wherein said step of generating said fifth and six sets of quadrature signals includes the steps of:
delaying said fourth set of quadrature signals by approximately 90 degrees to produce said fifth set of quadrature signals; and
delaying said fourth set of quadrature signals by approximately 180 degrees to produce said sixth set of quadrature signals.

22. A quadrature signal generator, comprising:
a differential input having a first and second terminals;
a coarse stage including a first 90/180 delay circuit coupled to said first terminal of said differential input, and a second 90/180 degree delay circuit coupled to said second terminal of said differential input; and
a refinement stage coupled to an output of said coarse stage including,
a plurality of 0/180 delay circuits having inputs coupled to corresponding outputs of said first and second 90/180 delay circuits, each 0/180 delay circuit having a 0 degree output and a 180 degree output, said 0 degree output of each delay circuit connected with said 180 degree output of another 0/180 delay circuit that is substantially in-phase with said 0 degree output, and
a plurality of 90/180 delay circuits having inputs coupled to corresponding outputs of said 0/180 delay circuits, each 90/180 degree delay circuit having a 90 degree output and a 180 degree output, said 90 degree output of each delay circuit connected with said 180 degree output of another 0/180 delay circuit that is substantially in-phase with said 90 degree output.

* * * * *